US008730319B2

(12) United States Patent
Sekine et al.

(10) Patent No.: US 8,730,319 B2
(45) Date of Patent: May 20, 2014

(54) DISPLAY DEVICE, IMAGE DATA GENERATING DEVICE, IMAGE DATA GENERATING PROGRAM, AND DISPLAY METHOD

(75) Inventors: Masahiro Sekine, Tokyo (JP); Takashi Sasaki, Kanagawa-ken (JP); Tsuyoshi Tasaki, Kanagawa-ken (JP); Haruhiko Okumura, Kanagawa-ken (JP); Noriko Odate, Fukishima-ken (JP); Shigeo Morimoto, Tokyo (JP); Takahisa Yoneyama, Kanagawa-ken (JP); Yugo Kuwabara, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 376 days.

(21) Appl. No.: 13/178,700

(22) Filed: Jul. 8, 2011

(65) Prior Publication Data
US 2012/0008048 A1 Jan. 12, 2012

(30) Foreign Application Priority Data
Jul. 9, 2010 (JP) ................................. 2010-157098

(51) Int. Cl.
H04N 7/00 (2011.01)
H04N 7/18 (2006.01)
H04N 5/445 (2011.01)
H04N 5/225 (2006.01)

(52) U.S. Cl.
USPC ........... 348/115; 348/148; 348/566; 348/171; 348/172; 382/103

(58) Field of Classification Search
USPC .................. 348/148; 382/100, 102, 103, 104; 340/425.5, 436, 435; 463/33; 455/456.1; 386/291; 709/202
See application file for complete search history.

(56) References Cited

U.S. PATENT DOCUMENTS

2012/0062743 A1* 3/2012 Lynam et al. ................. 348/148

FOREIGN PATENT DOCUMENTS

JP 2006-017626 1/2006

OTHER PUBLICATIONS

Chinese Notification of the First Office Action for Application No. 201110264983.6 Dated Feb. 21, 2013, 13 pages.

* cited by examiner

*Primary Examiner* — Joseph Ustaris
*Assistant Examiner* — Frederick Bailey
(74) *Attorney, Agent, or Firm* — Amin, Turocy & Watson, LLP

(57) ABSTRACT

According to one embodiment, a display device includes an image data generating unit and a display unit. The image data generating unit generates image data on an image. The display unit presents a video including the image data to an image viewer on a moving body to superimpose the video on an actual outside scene. The image data includes a first display object and a second display object. The first display object includes a lower part object. The lower part object has a lower part, an upper right part and an upper left part. A length of the lower part along a normal direction is longer than lengths of the upper right and upper left parts. The second display object is disposed in the image with reference to a display position of the first display object. The second display object includes information on the moving body.

20 Claims, 27 Drawing Sheets

DISPLAY DEVICE, IMAGE DATA GENERATING DEVICE, IMAGE DATA GENERATING PROGRAM, AND DISPLAY METHOD

CROSS-REFERENCE TO RELATED APPLICATIONS

This application is based upon and claims the benefit of priority from the prior Japanese Patent Application No. 2010-157098, filed on Jul. 9, 2010; the entire contents of which are incorporated herein by reference

FIELD

Embodiments described herein relate generally to a display device, an image data generating device, an image data generating program, and a display device.

BACKGROUND

A head-up display (HUD) is developed in which vehicle information on a vehicle such as the velocity and fuel of the vehicle, for example, is displayed so as to overlap with scenes ahead of the windshield equipped in the moving body for visually recognizing outside information and display information at the same time.

In this HUD, it is desired to present display information in plain with a more reduced unpleasant sensation.

DETAILED DESCRIPTION

Figure 1A:
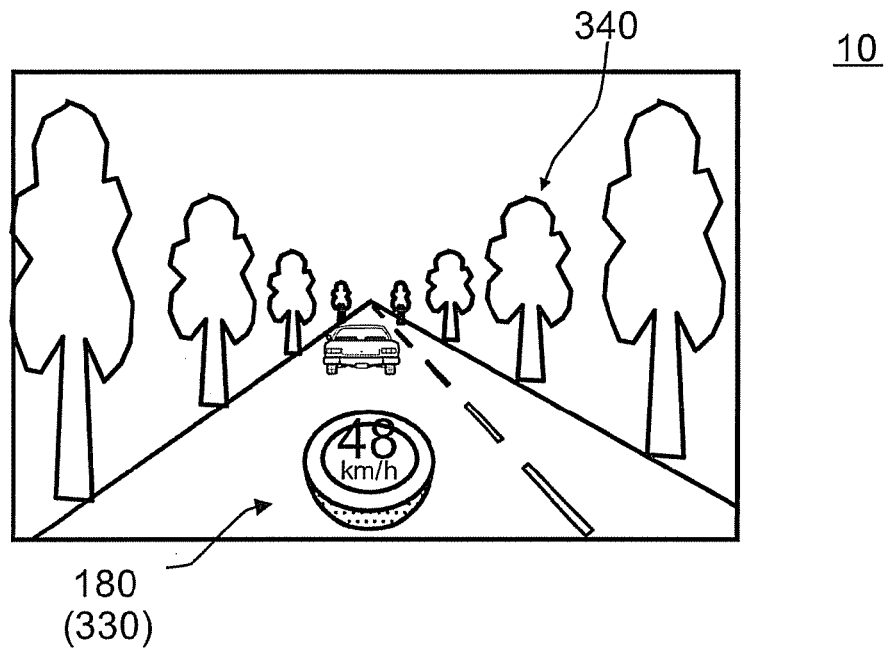
FIG. 1A and FIG. 1B are schematic views showing the operation of a display device according to a first embodiment.

In general, according to one embodiment, a display device includes an image data generating unit and a display unit. The image data generating unit is configured to generate image data on an image. The display unit is configured to present a video including the image data generated by the image data generating unit to an image viewer on a moving body to superimpose the video on an actual outside scene outside the moving body. The image data includes a first display object and a second display object. The first display object includes a lower part object. The lower part object has a lower part, an upper right part and an upper left part. The lower part is disposed in the image. The upper right part is disposed at a position on an upper and right side of the lower part in the image. The upper left part is disposed at a position on an upper and left side of the lower part in the image. A length of the lower part along a first normal line direction is longer than a length of the upper right part along a second normal line direction and a length of the upper left part along a third normal line direction. The first normal direction is perpendicular to a first extending direction of the lower part object at a position of the lower part. The second normal direction is perpendicular to a second extending direction of the lower part object at a position of the upper right part. The third normal direction is perpendicular to a third extending direction of the lower part object at a position of the upper left part. The second display object is disposed in the image with reference to a display position of the first display object in the image, the second display object including information on the moving body.

In general, according to another embodiment, an image data generating device generates image data on an image of a display video configured to be presented to an image viewer on a moving body and to be superimposed on an actual outside scene outside the moving body. The device is configured to generate a first display object, the first display object having a lower part object. The lower part object has a lower part, an upper right part and an upper left part. The lower part is disposed in the image. The upper right part is disposed at a position on an upper and right side of the lower part in the image. The upper left part is disposed at aposition on an upper and left side of the lower part in the image. A length of the lower part along a first normal line direction is longer than a length of the upper right part along a second normal line direction and a length of the upper left part along a third normal line direction. The first normal direction is perpendicular to a first extending direction of the lower part object at a position of the lower part. The second normal direction is perpendicular to a second extending direction of the lower part object at a position of the upper right part. The third normal direction is perpendicular to a third extending direction of the lower part object at a position of the upper left part. The second display object is disposed in the image with reference to a display position of the first display object in the image. The second display object includes information on the moving body. The device is configured to generate the image data based on the first display object and the second display object.

In general, according to another embodiment, an image data generating program is configured to cause a computer to generate image data on an image of a display video configured to be presented to an image viewer on a moving body and to be superimposed on an actual outside scene outside the moving body. The program includes causing the computer to generate a first display object. The first display object includes a lower part object. The lower part object has a lower part, an upper right part and an upper left part. The lower part is disposed in the image. The upper right part is disposed at a position on an upper and right side of the lower part in the image. The upper left part is disposed at a position on an upper and left side of the lower part in the image. A length of the lower part along a first normal line direction is longer than a length of the upper right part along a second normal line direction and a length of the upper left part along a third normal line direction. The first normal direction is perpendicular to a first extending direction of the lower part object at a position of the lower part. The second normal direction is perpendicular to a second extending direction of the lower part object at a position of the upper right part. The third normal direction is perpendicular to a third extending direction of the lower part object at a position of the upper left part. The program causes the computer to generate a second display object. The second display object is disposed in the image with reference to a display position of the first display object in the image. The second display object includes information on the moving body. The program causes the computer to generate the image data is based on the first display object and the second display object.

In general, according to another embodiment, a display method is disclosed. The method can include generating image data on an image. The image data includes a first display object and a second display object. The first display object includes a lower part object. The lower part object has a lower part, an upper right part and an upper left part. The lower part is disposed in the image. The upper right part is disposed at a position on an upper and right side of the lower part in the image. The upper left part is disposed at a position on an upper and left side of the lower part in the image. A length of the lower part along a first normal line direction is longer than a length of the upper right part along a second normal line direction and a length of the upper left part along a third normal line direction. The first normal direction is perpendicular to a first extending direction of the lower part object at a position of the lower part. The second normal direction is perpendicular to a second extending direction of the lower part object at a position of the upper right part. The third normal direction is perpendicular to a third extending direction of the lower part object at a position of the upper left part. The second display object is disposed in the image with reference to a display position of the first display object in the image. The second display object includes information on a moving body. In addition, the method can include presenting a display video based on the image data to an image viewer on a moving body to superimpose the display video on an actual outside scene outside the moving.

Various embodiments will be described hereinafter with reference to the accompanying drawings.

In the specification and the drawings, components similar to those described previously with reference to earlier figures are labeled with like reference numerals, and the detailed description thereof is omitted as appropriate.

First Embodiment

A display device according to the embodiment is a display device for moving bodies such as a vehicle, for example. In the following, as an example, the case will be described where the display device according to the embodiment is applied as a HUD that is a display device for moving bodies. Here, the moving body includes vehicles having wheels such as a two-wheel vehicle, three-wheel vehicle, four-wheel vehicle, and train, and all arbitrary vehicles such as a ship, aircraft, and helicopter, which people board. In the following, the case will be described where the moving body is a vehicle.

Figure 1B:
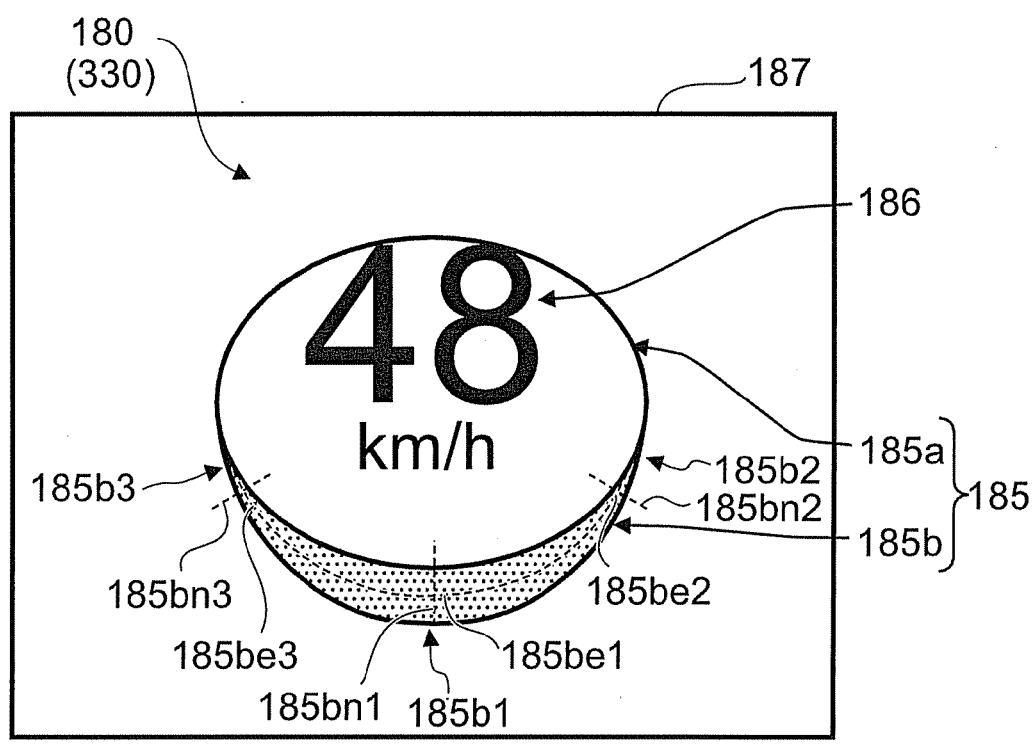

FIG. 1A and FIG. 1B are schematic views illustrating the operation of the display device according to a first embodiment.

Figure 2:
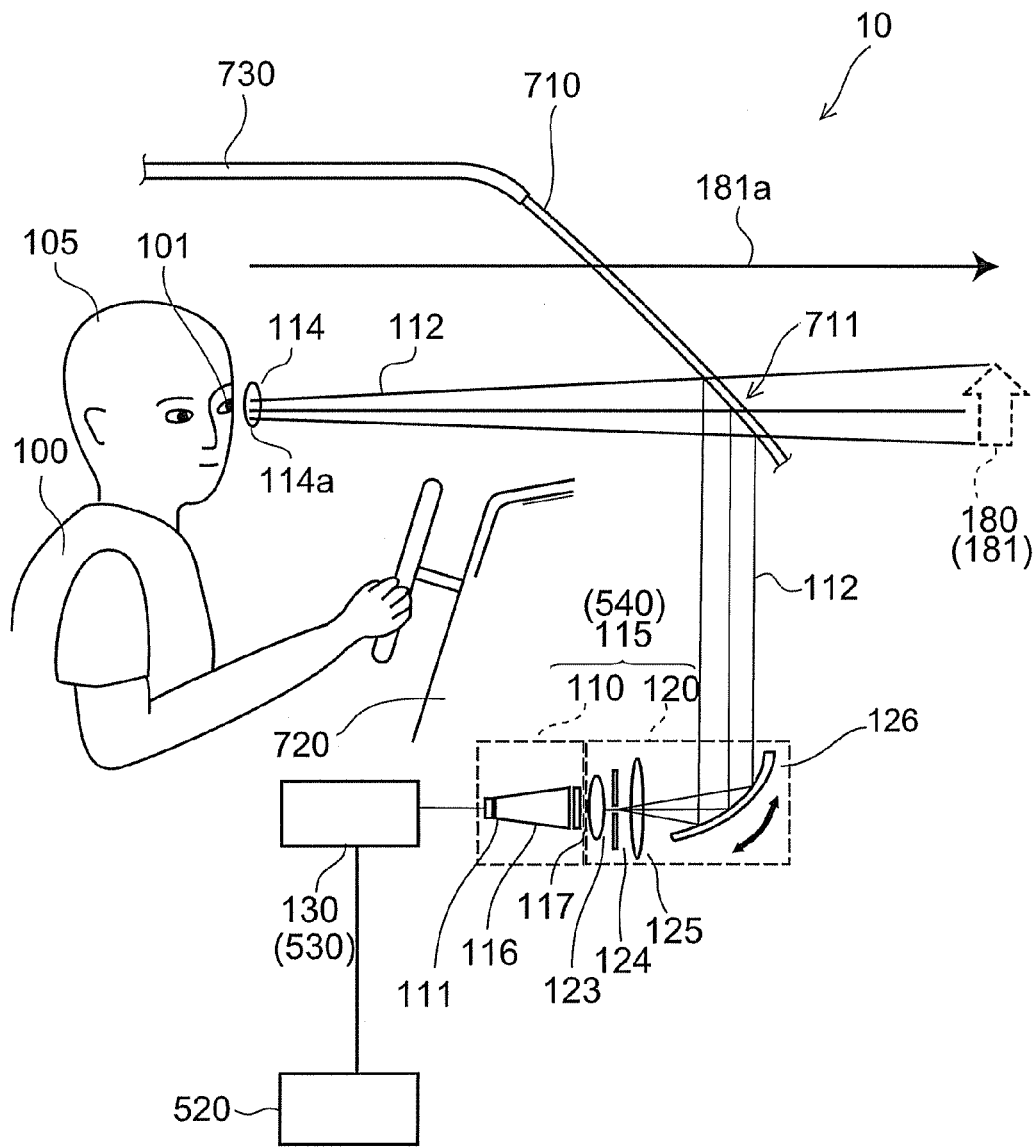
FIG. 2 is a schematic view showing the configuration of the display device according to the first embodiment.

FIG. 2 is a schematic view illustrating the configuration of the display device according to the first embodiment.

First, the outline of the configuration of a display device 10 according to the embodiment will be described with reference to FIG. 2.

As shown in FIG. 2, the display device 10 includes an image data generating device 530 (an image data generating unit 130) and a display unit 540 (a video projecting unit 115).

The image data generating unit 130 generates image data on an image. The image data generating unit 130 includes a computer, for example.

The display unit 540 presents the video including the image data generated by the image data generating device 530 to an image viewer 100 on a moving body (a vehicle 730), while the display unit 540 superimposes the video on an actual outside scene in the outside of the moving body.

In the above description, the presentation of the video superimposed on the actual outside scene can be optical see-through presentation. However, the embodiment is not limited thereto, and the presentation may be video see-through presentation.

The display device 10 of the specific example is a HUD, and the video projecting unit 115 is used for the display unit 540.

The video projecting unit 115 reflects a light beam 112 including the video based on the image data generated by the image data generating unit 130 in a windshield unit 710 (a reflection unit) of the vehicle 730, and projects the light beam 112 toward the image viewer 100 on the vehicle 730.

The windshield unit 710 includes the windshield of the vehicle 730. The windshield unit 710 may include a reflector 711 (a combiner, for example) provided on the windshield of the vehicle 730, for example. In this case, the light beam 112 is reflected by the reflector 711 provided on the windshield of the vehicle 730, and reflected, toward the image viewer 100. The reflector 711 may be provided on the indoor side of the vehicle 730 of the windshield apart from the windshield. As described above, the reflector 711, which is provided apart from the windshield, is also regarded as a part of the windshield unit 710.

The video included in the light beam 112 contains contents (a display object 180). The display object 180 is provided in the video that the display device 10 presents to the image viewer 100. In the specific example, the display object 180 includes information relating to vehicle information on the vehicle 730.

As illustrated in FIG. 2, the video projecting unit 115 of the display device 10 can be provided in the vehicle 730, for example, that is, on the back of a dashboard 720 of the vehicle 730 seen from the image viewer 100 who is an operator (a driver), for example.

The image data generating unit 130 is not always provided integrally with the video projecting unit 115, which may be installed at an arbitrary place in the vehicle 730, not in the dashboard 720, for example. The image data outputted from the image data generating unit 130 is supplied to the video projecting unit 115 by a cable or wireless scheme using electric signals, optical signals, or the like.

The light beam 112 emitted from the video projecting unit 115 is reflected on the windshield unit 710, and enters a head 105 of the image viewer 100.

At this time, the divergence angle of the light beam 112 is controlled, so that the light beam 112 can be designed so as to enter one eye 101 of the image viewer 100. Thus, the image viewer 100 can observe the video included in the light beam 112 by the one eye 101, for example. Accordingly, it is possible to solve the difficulty in viewing caused by binocular parallax when a video 181 of the display object 180 that is reflected on the windshield unit 710 is observed by both eyes.

The windshield unit 710 is provided at a position at which the distance from the image viewer 100 is 21.7 cm or more. Thus, it is possible to enhance a depth perception that the image viewer 100 perceives, and it is possible to facilitate the perception that the display object 180 is at a desired depth position.

However, the embodiment is not limited thereto. It may be possible that the light beam 112 emitted from the video projecting unit 115 enters both eyes of the image viewer 100, as the case may be.

After emitted from the display device 10, the light beam 112 is reflected on the windshield unit 710 of the vehicle 730, and reaches the eye of the image viewer 100. The image viewer 100 perceives the video 181 (a virtual image) of the display object 180 formed at the position of a video forming position 181a through the windshield unit 710. As described above, the display device 10 can be used as a HUD.

As shown in FIG. 2, the display device 10 can further include an information acquiring unit 520 that acquires information containing at least one of information on the vehicle 730, information on the image viewer 100 on the vehicle 730, and information on the outside of the vehicle 730. The information acquired at the information acquiring unit 520 is supplied to the image data generating unit 130, and the image data generating unit 130 can generate image data based on the information acquired at the information acquiring unit 520.

FIG. 1A schematically illustrates a video perceived by the image viewer 100 when the image viewer 100 views a display video 330 that is display information presented by the display device 10 and an actual outside scene 340 that is outside information at the same time. FIG. 1B illustrates the display video 330 that is enlarged.

The actual outside scene 340 is a video in the outside of the vehicle 730, which the image viewer 100 views through the windshield unit 710. The display video 330 is a video that the image viewer 100 views when the light beam 112 emitted from the video projecting unit 115 is reflected on the windshield unit 710 and projected to the image viewer 100, and the display video 330 is a video including the display object 180.

As illustrated in FIG. 1A, the image viewer 100 views the actual outside scene 340 and the display video 330 at the same time.

As shown in FIG. 1B, the display object 180 (i.e. the image data that is image contents) of the display video 330 includes a first display object 185 and a second display object 186.

The first display object 185 includes a lower part object 185b.

The lower part object 185b includes a lower part 185b1, an upper right part 185b2, and an upper left part 185b3.

The lower part 185b1 is disposed in the image 187. The upper right part 185b2 is disposed at a position on the upper side of the lower part 185b1 and on the right side of the lower part 185b1 in the image 187. The upper left part 185b3 is disposed at a position on the upper side of the lower part 185b1 and on the left side of the lower part 185b1 in the image 187. A length of the lower part 185b1 along a first normal line direction 185bn1 is longer than a length of the upper right part 185b2 along a second normal line direction 185bn2 and a length of the upper left part 185b3 along a third normal line direction 185bn3. The first normal direction 185bn1 is perpendicular to a first extending direction 185be1 of the lower part object 185b at a position of the lower part 185b1. The second normal direction 185bn2 is perpendicular to a second extending direction 185be2 of the lower part object 185b at a position of the upper right part 185b2. The third normal direction 185bn3 is perpendicular to a third extending direction 185be3 of the lower part object 185b at a position of the upper left part 185b3.

The length of the lower part 185b1 along the vertical direction in the image 187 is longer than the length of the upper right part 185b2 along the vertical direction and the length of the upper left part 185b3 along the vertical direction.

Since the lower part object 185b has this shape, the first display object 185 including the lower part object 185b enables the image viewer 100 to feel the depth perception and the thickness in the height direction.

In the specific example, the first display object 185 further includes an upper part object 185a disposed on the upper side of the lower part object 185b and separated from the lower part object 185b. Namely, the first display object 185 includes the upper part object 185a disposed in the image 187 and the lower part object 185b disposed on the lower side of the upper part object 185a in the image 187. The lower part object 185b is separated from the upper part object 185a. Namely, in the image 187, the region of the lower part object 185b and the region of the upper part object 185a can be distinguished from each other.

Here, the upper part object 185a is disposed on the upper side of the lower part object 185b in the image 187, which means that the upper part object 185*a* has a portion on the upper side of the lower part object 185*b* in the image 187. Namely, at least a part of the upper part object 185*a* is disposed on the upper side of the lower part object 185*b* in the image 187. Similarly, the lower part object 185*b* is disposed on the lower side of the upper part object 185*a* in the image 187, which means that the lower part object 185*b* has a portion on the lower side of the upper part object 185*a* in the image 187. Namely, at least a part of the lower part object 185*b* is disposed on the lower side of the upper part object 185*a* in the image 187.

As described later, the upper part object 185*a* is provided as necessary, and may be omitted as the case may be.

The second display object 186 is disposed in the image 187 with reference to the display position of the first display object 185 in the image 187. The second display object 186 includes information (moving body information, i.e. vehicle information) on the vehicle 730 (the moving body).

Although the first display object 185 has a functionality to be a reference for the position of displaying the second display object 186 as described above, the first display object 185 may include the moving body information (the vehicle information) on the vehicle 730 (the moving body).

The second display object 186 has a portion on the upper side of the first display object 185 in the image 187. Namely, the second display object 186 has a portion disposed on the upper side of the lower part object 185*b* in the image 187.

As described above, the image data generating unit 130 generates image data containing the first display object 185 and the second display object 186; the first display object 185 includes the lower part object 185*b* that is disposed in the image 187 and enables the image viewer 100 to perceive the depth perception and the thickness in the height direction, and the second display object 186 has the portion that is disposed in the image 187 with reference to the display position of the first display object 185 in the image 187 and disposed on the upper side of the first display object 185 in the image 187, the second display object 186 including information on the moving body.

In the specific example, the case is shown where the velocity of the vehicle 730 is displayed as character information for the second display object 186. The specific example is an example that the center of the second display object 186 is disposed on the upper side of the center of the upper part object 185*a* of the first display object 185 in the image 187 with reference to the display position of the first display object 185 in the image 187.

For example, a partition line is provided between the region of the lower part object 185*b* and the region of the upper part object 185*a*. For example, a color in the region of the lower part object 185*b* is different from a color in the region of the upper part object 185*a*. For example, the brightness (including a change in property in a color space, which includes a change in brightness, hue, saturation and the like) of the region of the lower part object 185*b* is different from the brightness (including a change in property in a color space, which includes a change in brightness, hue, saturation and the like) of the region of the upper part object 185*a*. Thus, the image viewer 100 can distinguish between the region of the lower part object 185*b* and the region of the upper part object 185*a* in the image 187.

The first display object 185 includes the upper part object 185*a* and the lower part object 185*b*, so that the image viewer 100 perceives the first display object 185 as a three-dimensional shape when the image viewer 100 views the first display object 185.

In the example shown in FIG. 1B, when the image viewer 100 views the first display object 185, the image viewer 100 perceives that the first display object 185 has a lower hemispherical shape, which a sphere is horizontally cut.

Namely, the first display object 185 has a three-dimensional shape in which the upper part object 185*a* includes the top surface of this three-dimensional shape and the lower part object 185*b* includes at least one of the side surface and bottom surface of this three-dimensional shape on the lower side of the top surface of this three-dimensional shape.

The combination of the first display object 185 and the second display object 186 that is displayed along with the first display object 185 is adopted, so that the second display object 186, which is presented to the image viewer 100 as vehicle information, is perceived as the second display object 186 is placed on/above the first display object 185 (a hemisphere in this example), which is perceived as a three-dimensional object.

At least a part of the second display object 186 is disposed in a space different from the surface (for example, the top surface) of the first display object 185 (a hemisphere in this example), which is perceived as a three-dimensional object.

This display object 180 (the image data) is used to reduce an unpleasant sensation when the image viewer 100 views the display video 330 and the actual outside scene 340 at the same time.

Figure 3A:
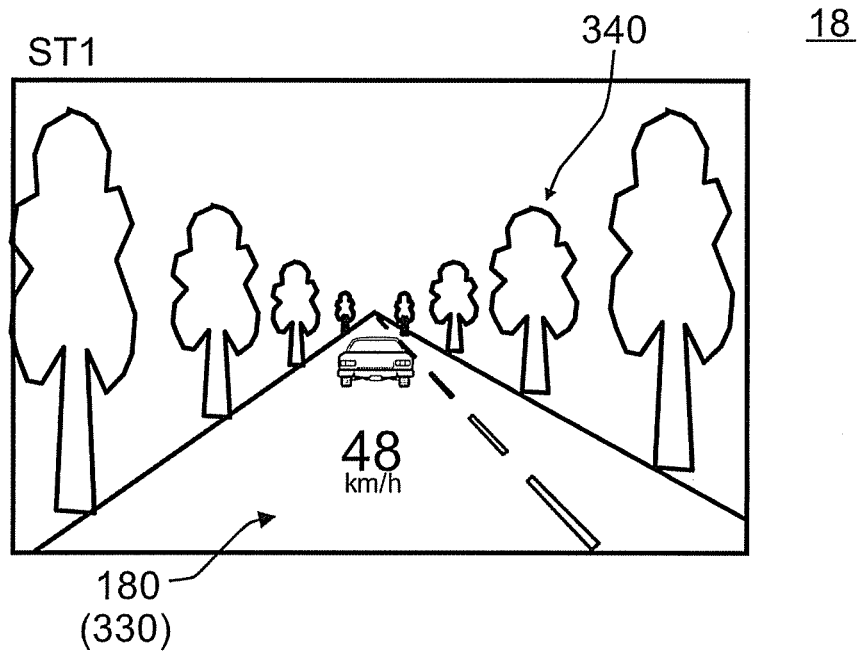
FIG. 3A and FIG. 3B are schematic views showing the operation of a display device of a reference example.
Figure 3B:
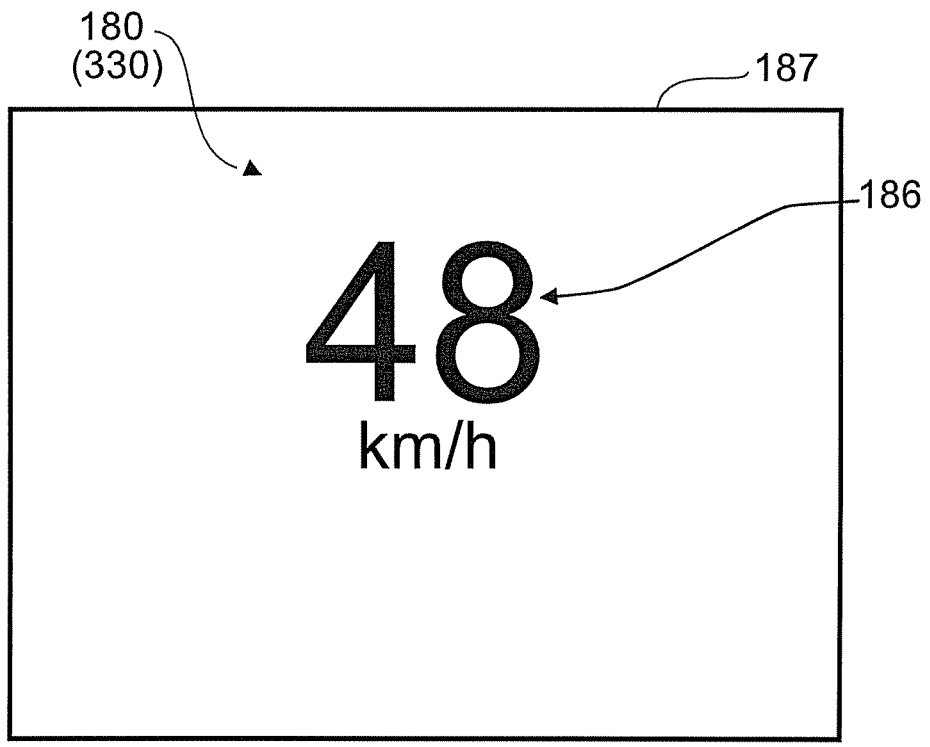

FIG. 3A and FIG. 3B are schematic views illustrating the operation of a display device of a reference example.

Namely, FIG. 3A schematically illustrates a video perceived by the image viewer 100 when the image viewer 100 views a display video 330 that is display information presented by a display device 18 of the reference example and an actual outside scene 340 that is outside information at the same time. FIG. 3B illustrates the display video 330 that is enlarged.

As shown in FIG. 3B, in the display device 18 of the reference example, image data (a display object 180) has a second display object 186 on vehicle information but it does not has a first display object 185 that is used for the reference of the display position.

As shown in FIG. 3A, when the image viewer 100 views the display video 330 including this second display object 186 and the actual outside scene 340 at the same time, the image viewer 100 feels that it is difficult to see the second display object 186. For example, the depth position of the second display object 186 does not tend to be stabilized in the space of the actual outside scene 340, so that the image viewer 100 suffers a considerable unpleasant sensation.

On the contrary, in the display device 10 according to the embodiment, the combination of the first display object 185 and the second display object 186 is adopted, so that it is possible to easily see the second display object 186 including vehicle information. The depth position of the second display object 186 in the actual outside scene 340 tends to be stabilized, and an unpleasant sensation that the image viewer 100 suffers is reduced. Since the second display object 186 is easily seen and an unpleasant sensation is reduced, it is possible to suppress gazing steadily at the second display object 186 in excess. Thus, it is possible to improve safety in driving the vehicle 730.

As described above, in the display device 10 according to the embodiment, the second display object 186 including vehicle information that is desired to present is presented to the image viewer 100 along with the first display object 185 that is a base in displaying the second display object 186, so that the ease to see the second display object 186 by the image viewer 100 is improved, resulting in a reduced unpleasant sensation.

This phenomenon was found through the experiment conducted by the inventors. In a HUD system like the display device 10 according to the embodiment, a special viewing state is adopted in which the image viewer 100 views the real image of the actual outside scene 340 and the virtual image of the display video 330 presented by the video projecting unit 115 at the same time. In seeing the videos, when the second display object 186 including information that is desired to present is displayed alone as in the aforementioned reference example, the position in the depth direction and the position in the height direction of the second display object 186 do not tend to be stabilized, so that the image viewer 100 tends to suffer an unpleasant sensation. On the contrary, in the embodiment, the first display object 185 that is a base is displayed along with the second display object 186 at the position corresponding to the position below the display position of the second display object 186, so that the second display object 186 is perceived as if the second display object 186 is placed on/above the first display object 185 that is a base for increasing a perception of stability. It is considered that an unpleasant sensation and a perception of stability as stated above are specific characteristics of the visual angle of a human, which is the image viewer 100.

As described above, in the display in which the display video 330 is viewed as superimposed on the actual outside scene 340, a new problem has been found in that an unpleasant sensation is perceived in the perception in the depth and height direction. For example, in the display according to computer graphics in which only the display video 330 is seen, there is no actual outside scene 340 against the display video 330, so that this unpleasant sensation is not a problem. The inventors investigated a measure for reducing this unpleasant sensation that is caused by human visual characteristics in the display in which the display video 330 is viewed as superimposed on the actual outside scene 340, and found a configuration according to the embodiment.

Namely, in the display device 10 according to the embodiment, attention is focused on the characteristics of human vision, and the second display object 186 for presenting information is displayed along with the first display object 185 that is a base for display, so that an unpleasant sensation is reduced. According to the display device 10, it is possible to provide a display device for moving bodies that enables the display in which an unpleasant sensation is reduced.

In the display device such as a HUD in which the display video 330 based on image data is superimposed on the actual outside scene 340 for presentation, it is important for improving the ease to see that the space of the display video 330 and the space of the actual outside scene 340 are harmonized with each other for perception.

In accordance with the display device 10 according to the embodiment, the combination of the first display object 185 and the second display object 186 is adopted, so that the perspective in the display video 330 and the perspective in the actual outside scene 340 are more matched with each other for perception. Thus, it is possible to reduce an unpleasant sensation. In addition, the horizontal direction in the space of the display video 330 and the horizontal direction in the space of the actual outside scene 340 are further matched with each other, so that it is possible to further reduce an unpleasant sensation.

It was found that there is a desirable shape for the first display object 185 that is a base for display. Namely, desirably, the first display object 185 has the upper part object 185a in a suited shape.

In the following, the shape of the first display object 185 will be described.

Here, for convenience of explanation, a coordinate system is introduced.

Figure 4:
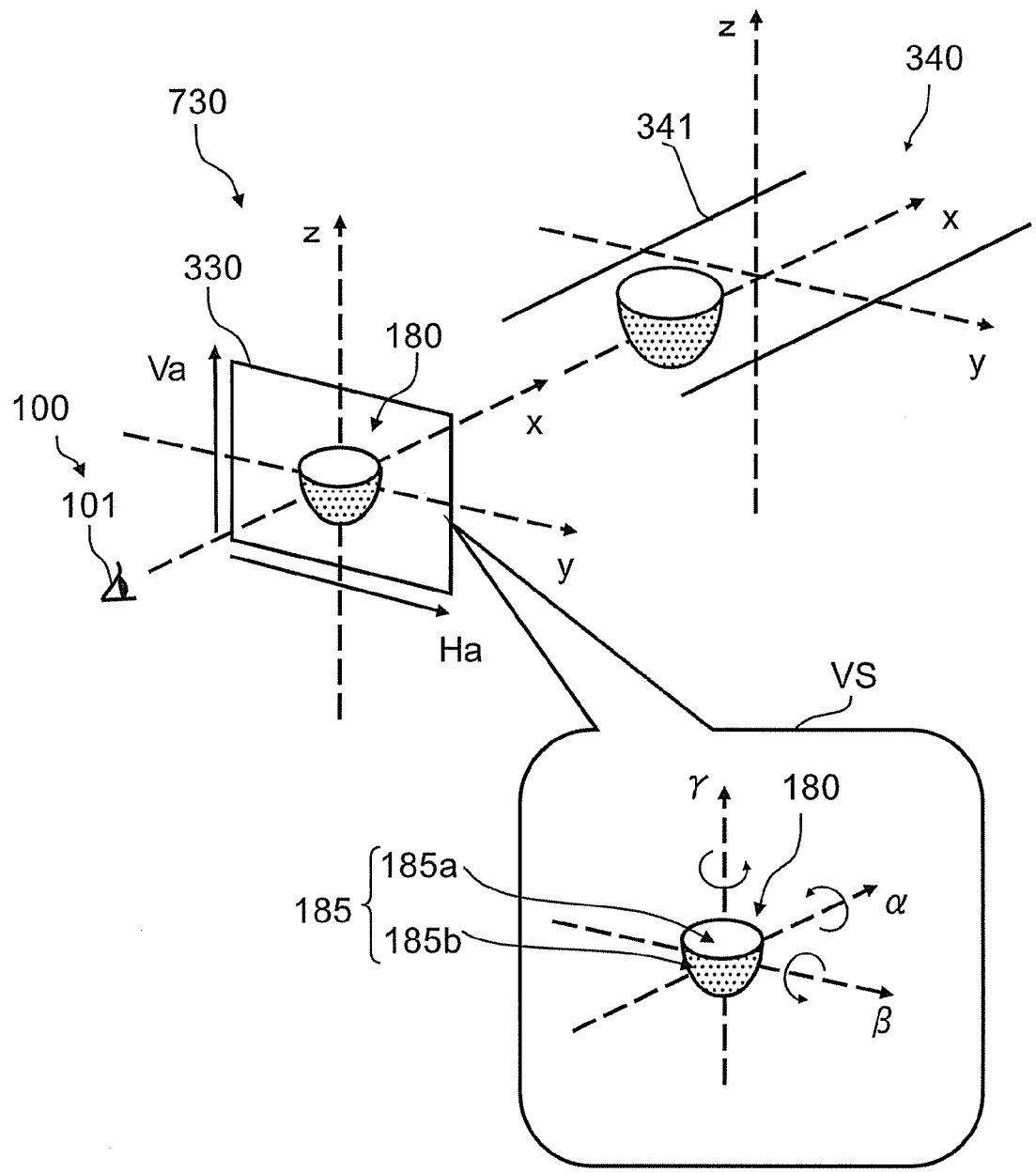
FIG. 4 is a schematic view showing a coordinate system in the display device according to the first embodiment.

FIG. 4 is a schematic view illustrating a coordinate system in the display device according to the first embodiment.

As shown in FIG. 4, the direction from the rear to the front of the vehicle 730, on which the display device 10 according to the embodiment is mounted, is an x-axis. The direction from the left to the right of the vehicle 730 is a y-axis. The direction vertical to the x-axis and the y-axis is a z-axis. In the case where the vehicle 730 runs, parks, or stops on a flat, horizontal surface, an x-y plane is a horizontal plane, and the z-axis is in the direction in parallel with the direction of gravity, i.e. the vertical direction. In the case where vehicle 730 runs straight on a flat, horizontal surface, the traveling direction of the vehicle 730 is the direction of the x-axis.

The surface of the display video 330 in the display device 10 is a y-z plane for convenience. The shape of the surface of the display video 330 is sometimes in a trapezoidal shape, for example. For simplifying the explanation, the display video 330 perceived by the image viewer 100 is in an almost rectangular when the image viewer 100 views a video reflected on the windshield unit 710. In the image of the display video 330, an axis parallel with the y-axis is a horizontal axis Ha, and an axis parallel with, the z-axis is a vertical axis Va.

In a virtual space VS in the display video 330, an $\alpha$-axis, $\beta$-axis, and $\gamma$-axis are established, which are three axes orthogonal to each other, for example. The $\alpha$-axis, $\beta$-axis, and $\gamma$-axis can correspond to the aforementioned x-axis, y-axis, and z-axis, respectively. Namely, the $\alpha$-axis can be the traveling direction of the vehicle 730.

Here, a rotation angle that the x-axis is the center axis is a roll angle. A rotation angle that the y-axis is the center axis is a pitch angle. A rotation angle that the z-axis is the center axis is a yaw angle. In the virtual space VS, the rotation angle that the $\alpha$-axis is the center axis corresponds to the roll angle, the rotation angle that the $\beta$-axis is the center axis corresponds to the pitch angle, and the rotation angle that the $\gamma$-axis is the center axis corresponds to the yaw angle.

The perception on the position in the x-axis direction (the $\alpha$-axis direction) corresponds to the perspective. The perception on the position in the z-axis direction (the $\gamma$-direction) corresponds to the perception on the height direction.

An angle in the vertical direction when seen from the image viewer 100 is a depression angle. For example, when the line of sight of the vehicle 730 (the image viewer 100) is changed in the pitch rotation direction as by a change in the gradient of the road on which the vehicle 730 is running, the depression angle is changed.

FIG. 5A to FIG. 5D are schematic views illustrating the operations of display devices.

Figure 5A:
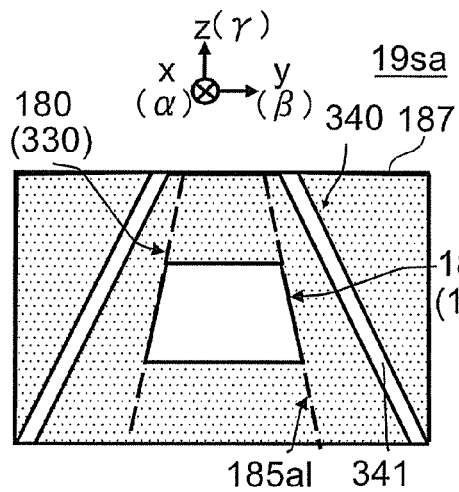
FIG. 5A to FIG. 5D are schematic views showing the operations of display devices.
Figure 5B:
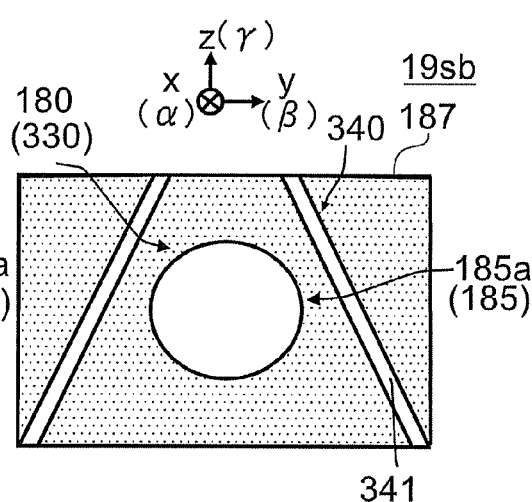
Figure 5C:
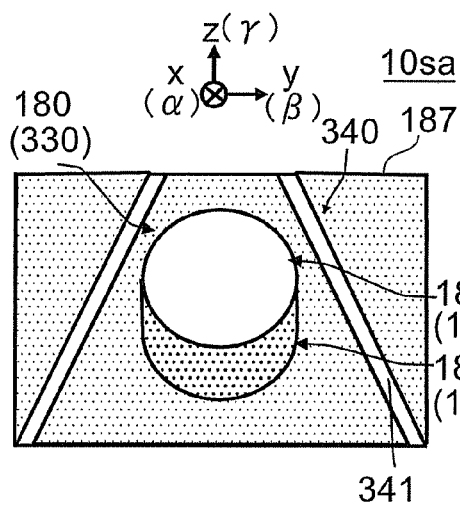
Figure 5D:
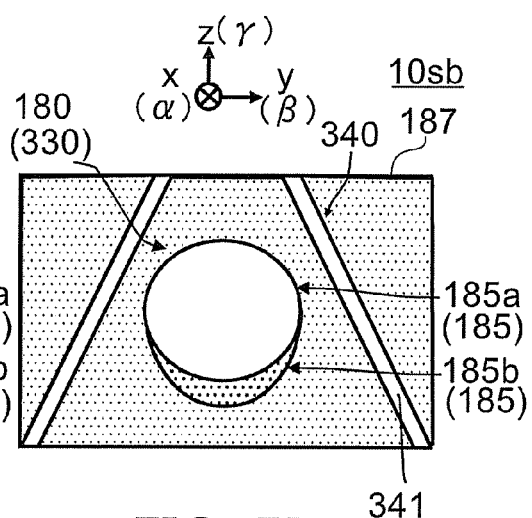

Namely, FIG. 5A and FIG. 5B illustrate the operation of a display device of a reference example (display operations 19sa and 19sb). FIG. 5C and FIG. 5D illustrate two operations (display operations 10sa and 10sb) of the display device 10 according to the embodiment. These drawings illustrate the first display object 185 of the display object 180 (the image data) in each of the display device, and the second display object 186 is omitted. These drawings schematically illustrate videos perceived by the image viewer 100 when the image viewer 100 views the display video 330 including the first display object 185 and the actual outside scene 340 at the same time. For simplifying the explanation, boundary lines 341 are illustrated on the road, on which the vehicle 730 is running, in the actual outside scene 340.

As shown in FIG. 5A, in the display operation 19*sa* of the display device of the reference example, the first display object 185 has only the upper part object 185*a*, but does not have the lower part object 185*b*. A trapezoid is used for the upper part object 185*a*. In the case where image data having this upper part object 185*a* is viewed along with the actual outside scene 340, the image viewer 100 feels considerable unpleasant sensation. The boundary lines 341 on the road tilt at a predetermined angle toward the vanishing point. The direction of an extenuation line 185*al* of the oblique side of the upper part object 185*a* is not always matched with the direction of the boundary line 341 on the road. Namely, the perspective in the actual outside scene 340 is not matched with the perspective of the first display object 185. Namely, an unpleasant sensation arises in the depth direction.

The upper part object 185*a* tends to be perceived as if the upper part object 185*a* contacts with the surface of the road, for example, in the actual outside scene 340, so that an unpleasant sensation arises at a spatial position in the height direction. The image viewer 100 is usually in the state of viewing vehicles running forward, road signs, or the like in the actual outside scene 340 while driving the vehicle 730, and the line of sight of the image viewer 100 is usually set to about the height of the vehicles running forward, road signs, or the like. In viewing them, the image viewer 100 tends to suffer an unpleasant sensation when a display desired to be displayed is disposed at the height position at which the display contacts with the surface of the road.

As shown in FIG. 5B, in the display operation 19*sb* of the display device of the reference example, the first display object 185 has only the upper part object 185*a*, but does not have the lower part object 185*b*. A flat circle (including an ellipse) is used for the upper part object 185*a*. In this case, since the upper part object 185*a* does not have any straight sides, a mismatch between the perspective in the actual outside scene 340 and the perspective of the first display object 185 is suppressed, which occurs when the direction of the sides of the upper part object 185*a* is not matched with the direction of the boundary lines 341 on the road. However, also in this case, the upper part object 185*a* tends to be perceived as if it contacts with the surface of the road, for example, in the actual outside scene 340, for instance, so that an unpleasant sensation arises at the spatial position in the height direction.

As shown in FIG. 5C, in the display operation 10*sa* of the display device 10 according to the embodiment, the first display object 185 has the upper part object 185*a* and the lower part object 185*b*. A flat circle (including an ellipse) is used for the upper part object 185*a*. The lower part object 185*b* has a shape in which the first display object 185 is perceived as if it has a cylindrical shape along with the upper part object 185*a*. In this case, since the upper part object 185*a* does not have any straight sides, it is possible to suppress a mismatch between the perspective in the actual outside scene 340 and the perspective of the first display object 185. Since the first display object 185 is perceived as if it has a cylindrical shape, the upper part object 185*a* is perceived as if it is positioned on/above the surface of the road, for example, in the actual outside scene 340. Namely, it is possible to suppress an unpleasant sensation at the spatial position in the height direction.

As shown in FIG. 5D, in another display operation 10*sb* of the display device 10 according to the embodiment, the first display object 185 has the upper part object 185*a* and the lower part object 185*b*. A flat circle (including an ellipse) is used for the upper part object 185*a*. The lower part object 185*b* has a shape in which the first display object 185 is perceived as if it is the lower hemisphere of a sphere horizontally cut along with the upper part object 185*a*. In this case, the upper part object 185*a* does not have any straight sides. Namely, the outer edge of the upper part object 185*a* has a curved shape. Thus, it is possible to suppress a mismatch between the perspective in the actual outside scene 340 and the perspective of the first display object 185. Since the first display object 185 is perceived as if it is a hemisphere, the upper part object 185*a* is perceived as if it is positioned on/above the surface of the road, for example, in the actual outside scene 340. Namely, it is possible to suppress an unpleasant sensation at the spatial position in the height direction.

As described above, in the display operation 19*sa* of the reference example, an unpleasant sensation on the perspective and an unpleasant sensation on the spatial position in the height direction tend to arise. In the display operation 19*sb* of the reference example, although an unpleasant sensation on the perspective is suppressed, an unpleasant sensation on the spatial position in the height direction tends to arise.

On the contrary, in the display operations 10*sa* and 10*sb* of the display device 10 according to the embodiment, an unpleasant sensation on the perspective and an unpleasant sensation on the spatial position in the height direction do not tend to arise.

A cylindrical shape is used for the first display object 185 in the display operation 10*sa*, and a hemisphere is used for the first display object 185 in the display operation 10*sb*. Thus, as compared with the display operation 10*sa*, in the display operation 10*sb*, an unpleasant sensation on a difference in the depression angle is reduced when seen from the image viewer 100, which is more desirable. A difference in the depression angle between the actual outside scene 340 and the display video 330 is varied depending on changes in the gradient of the road or the pitch angle of the vehicle, for example. Even in the case where a difference in the depression angle is varied, it is desirable to use the first display object 185 that an unpleasant sensation on a difference in the depression angle is reduced. More desirably, the first display object 185 has a hemispherical shape, not a cylindrical shape, for example.

In the display operations 19*sa* and 19*sb* of the reference example, since the upper part object 185*a* is provided but the lower part object 185*b* is not provided, the image viewer 100 feels a considerable unpleasant sensation on a difference in the depression angle.

As described above, in the display operations 10*sa* and 10*sb* of the display device 10 according to the embodiment, an unpleasant sensation on the perspective and an unpleasant sensation on the spatial position in the height direction do not tend to arise, so that it is possible to present a display easy to see to the image viewer 100.

Namely, in the display device such as a HUD in which the display video 330 based on image data is superimposed on the actual outside scene 340 for presentation, a shift is produced between the space of the display video 330 and the space of the actual outside scene 340 caused by changes in the situations of the outside, changes in the eye point of the user (the image viewer 100), or the like, and this shift changes with time, so that an unpleasant sensation tends to arise. On the contrary, in accordance with the display device 10 according to the embodiment, an object (the first display object 185) robust against a shift between the space of the display video 330 and the space of the actual outside scene 340 and robust against a change with time in this shift is adopted, so that it is possible to implement information presentation that an unpleasant sensation is further reduced.

In the case where the display device 10 is a monocular display device in which the light beam 112 enters the one eye 101 of the image viewer 100, a difficulty to see caused by binocular parallax is solved, and the depth perception perceived by the image viewer 100 is enhanced. Thus, there is a particularly significant effect to improve the ease to see because of a reduction in an unpleasant sensation caused by a shift between the space of the display video 330 and the space of the actual outside scene 340.

In the display device 10 according to the embodiment, as the object that is a base for presenting information, the first display object 185 is provided, which is robust against changes in the conditions of the user, the vehicle, and the outside. Information is presented by the second display object 186 disposed based on the display position of the first display object 185. Thus, it is possible to implement information presentation that an unpleasant sensation is further reduced.

In the display device 10 according to the embodiment, the first display object 185 includes the upper part object 185a and the lower part object 185b, so that the first display object 185 is perceived as a three-dimensional shape, the upper part object 185a is perceived as the upper part object 185a corresponds to the top surface of the three-dimensional shape, and the lower part object 185b is perceived as the side surface and bottom surface of the three-dimensional shape. These perceptions are used to enable the perception of the spatial position in the height direction in the first display object 185, so that an unpleasant sensation can be reduced.

The upper part object 185a and the lower part object 185b are contacted with each other in the vertical direction in the image 187. However, it may be possible to provide a partition line between the upper part object 185a and the lower part object 185b, which separates the upper part object 185a from the lower part object 185b. Thus, the upper part object 185a and the lower part object 185b are perceived as an integral shape, and consequently, the first display object 185 is perceived as a three-dimensional shape.

For example, the width (the maximum width) in the lateral direction (the direction of the horizontal axis Ha) of the upper part object 185a in the image 187 can be substantially made the same as the width (the maximum width) in the lateral direction of the lower part object 185b in the image 187. The upper part object 185a and the lower part object 185b are perceived as an integral shape, and the first display object 185 is perceived as a three-dimensional shape, which is perceived as a cylindrical shape or hemispherical shape having the width of the upper part of the three-dimensional shape greater than the width of the lower part.

The portion on the lower side of the boundary line of the upper part object 185a follows the portion on the upper side of the boundary line of the lower part object 185b. Thus, the upper part object 185a and the lower part object 185b are perceived as an integral shape, and consequently, the first display object 185 is perceived as a three-dimensional shape.

Desirably, the portion on the lower side of the boundary line of the upper part object 185a has a projecting shape toward the lower side in the image 187, and desirably, the portion on the upper side of the boundary line of the lower part object 185b has a projecting shape toward the lower side in the image 187. Thus, it is possible that the image viewer 100 has a perception as if viewing the first display object 185 having the three-dimensional shape from diagonally above. Therefore, it is possible to further reduce an unpleasant sensation.

Desirably, the upper part object 185a has a bilaterally symmetric shape with respect to the vertical direction (the direction of the vertical axis Va) as the center axis in the image 187. Desirably, the lower part object 185b has a bilaterally symmetric shape with respect to the vertical direction as the center axis in the image 187. Thus, the first display object 185 is perceived as a three-dimensional shape. It is possible that the image viewer 100 has a perception as if viewing the first display object 185 having the three-dimensional shape from diagonally above. Therefore, it is possible to further reduce an unpleasant sensation.

The upper part object 185a can have a vertically symmetric shape as the lateral direction is the center axis in the image 187. On the other hand, desirably, the lower part object 185b has a vertically asymmetric shape in the case where the lateral direction is an axis in the image 187. Thus, the first display object 185 is perceived as a three-dimensional shape. It is possible that the image viewer 100 has a perception as if viewing the first display object 185 having the three-dimensional shape from diagonally above. Therefore, it is possible to further reduce an unpleasant sensation.

The upper part object 185a can be a convex polygon.

The first display object 185 has the upper part object 185a and the lower part object 185b as described above. Thus, the first display object 185 is perceived as a three-dimensional shape, and an unpleasant sensation on the spatial position in the height direction is suppressed. The image viewer 100 is enabled to have a perception as if viewing the three-dimensional shape based on the first display object 185 from diagonally above, so that it is possible to further reduce an unpleasant sensation.

Next, the relationship between the shape of the first display object 185 and an unpleasant sensation (a harmonious sensation) on the perspective will be described.

Figure 6A:
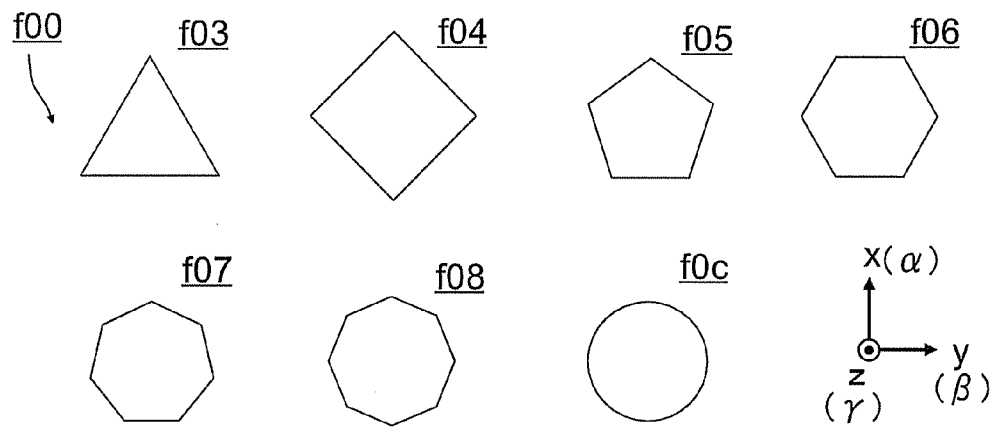
FIG. 6A and FIG. 6B are schematic views showing display objects.
Figure 6B:
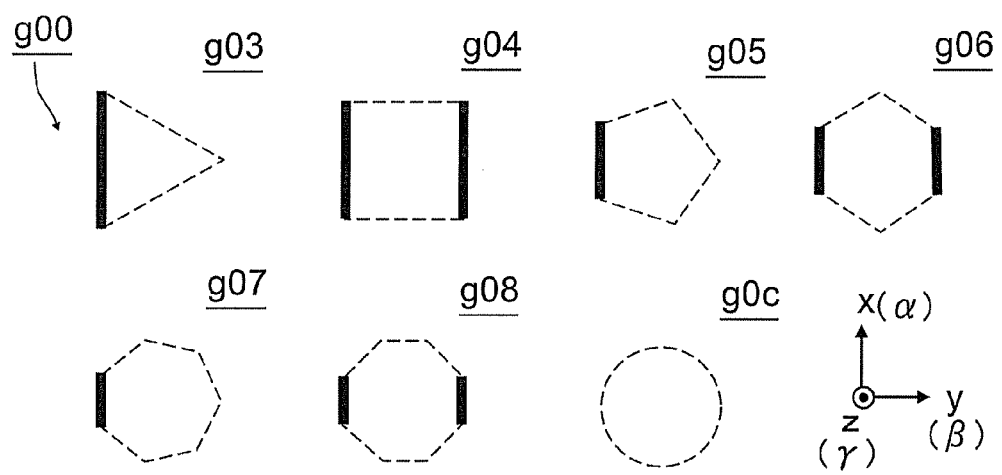

FIG. 6A and FIG. 6B are schematic views illustrating display objects that the display device displays.

Namely, FIG. 6A and FIG. 6B illustrate the shapes and dispositions of the upper part object 185a of the first display object 185 in the image 187. Namely, FIG. 6A and FIG. 6B correspond to shapes when the upper part object 185a is seen from the upward direction (in the γ-axis direction) in the virtual space VS.

As illustrated in FIG. 6A, a shape f03 is a triangle, a shape f04 is a quadrilateral, a shape f05 is a pentagon, a shape f06 is a hexagon, a shape f07 is a heptagon, and a shape f08 is an octagon. A shape f0c is a circle. A disposition f00 of the shape f03, the shape f04, the shape f05, the shape f06, the shape f07, the shape f08, and the shape f0c in the image 187 is such a disposition that these shapes do not include a straight line (a side) along the depth direction (the α-axis direction, i.e. the x-axis direction).

As illustrated in FIG. 6B, a shape g03 is a triangle, a shape g04 is a quadrilateral, a shape g05 is a pentagon, a shape g06 is a hexagon, a shape g07 is a heptagon, and a shape g08 is an octagon. A shape g0c is a circle. As indicated by thick solid lines in FIG. 6B, a disposition g00 of the shape g03, the shape g04, the shape g05, the shape g06, the shape g07, and the shape g08 in the image 187 is such a disposition that these shapes include a straight line (a side) along the depth direction (the α-axis direction, i.e. the x-axis direction).

When the disposition f00 illustrated in FIG. 6A is compared with the disposition g00 illustrated in FIG. 6B, an unpleasant sensation on the perspective is reduced in the disposition f00 than in the disposition g00.

This is because a relative angular difference between the boundary lines 341 on the road in the actual outside scene 340 and the sides of the first display object 185 in the display video 330 as illustrated in FIG. 5A tends to be perceived in the disposition g00 illustrated in FIG. 6B more than in the disposition f00 illustrated in FIG. 6A.

Figure 7:
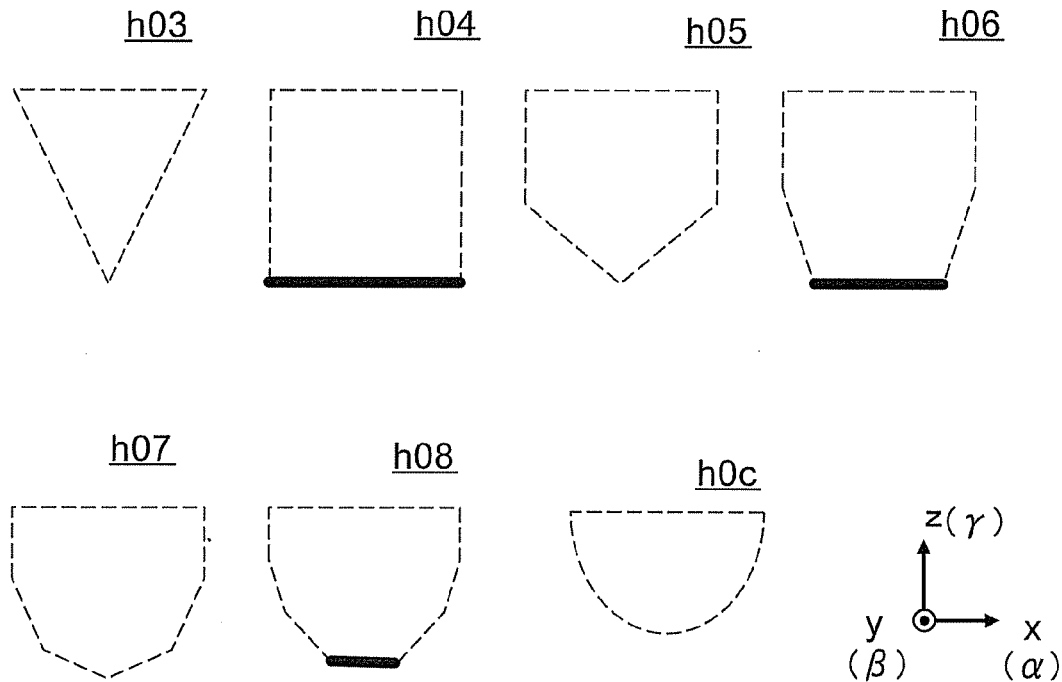
FIG. 7 is a schematic view showing display objects.

FIG. 7 is a schematic view illustrating display objects that the display device displays.

Namely, FIG. 7 illustrates shapes of the lower part object 185b of the first display object 185. Namely, FIG. 7 illustrates the shapes of the lower part object 185b when the lower part object 185b is seen from the lateral side in the virtual space VS, i.e. the y-axis direction (the β-axis direction).

Here, the shape of the upper part object 185a of the first display object 185 is fixed, and the length of the lower part object 185b along the x-axis (the α-axis) is fixed. The case will be described where the shape of the upper part object 185a of the first display object 185 is a circle.

As illustrated in FIG. 7, when the lower part object 185b is seen from the lateral side, a shape h03 is a triangle, a shape h04 is a quadrilateral, a shape h05 is a pentagon, a shape h06 is a hexagon, a shape h07 is a heptagon, and a shape h08 is an octagon. A shape h0c has a shape of a lower half of a circle (including a flat circle).

The shape h04 corresponds to the shape of the lower part object 185b in the display operation 10sa, for example, illustrated in FIG. 5C. The shape h0c corresponds to the shape of the lower part object 185b in the display operation 10sb, for example, illustrated in FIG. 5D. As already described, in the display operation 10sb, an unpleasant sensation on a difference in the depression angle when seen from the image viewer 100 is reduced than in the display operation 10sa, which is more desirable.

In the shape h03, the shape h04, the shape h05, the shape h06, the shape h07, the shape h08, and the shape h0c illustrated in FIG. 7, there is a difference in an unpleasant sensation on the depression angle. For example, the image viewer 100 feels a considerable unpleasant sensation on the depression angle in the shape h04, the shape h06, and the shape hO8 having a side (a thick solid line illustrated in FIG. 7) in parallel with the x-axis (the α-axis) among sides except the top side corresponding to the upper part object 185a. An unpleasant sensation on the depression angle is relatively reduced in the shape h03, the shape h05, the shape h07, and the shape h0c having no side in parallel with the x-axis (the α-axis).

As described above, an unpleasant sensation on the depression angle depends on the shape of the lower part object 185b (the shape seen along the γ-axis).

A harmony coefficient Et is introduced as an index concerning an unpleasant sensation between the display video 330 and the actual outside scene 340 when the display video 330 including the upper part object 185a of the first display object 185 is viewed as superimposed on the actual outside scene 340.

The harmony coefficient Et is an index to indicate a degree of reduction of unpleasant sensation, which the first display object 185 does not produce a shift against the space of the actual outside scene 340. The harmony coefficient Et includes coefficients, a perspective harmony coefficient Ep corresponding to a degree of harmony on a perspective and an angle harmony coefficient Ea indicating a degree of harmony on an angle. This angle is an angle on the depression angle, for example.

The harmony coefficient Et is calculated as a first equation below, for example.

$$Et = kp \times Ep + ka \times Ea \quad (1)$$

Where kp is a weight factor for the perspective harmony coefficient Ep, and ka is a weight factor for the angle harmony coefficient Ea.

The greater the perspective harmony coefficient Ep is, the less an unpleasant sensation on the perspective is. The smaller the angle harmony coefficient Ea is, the less an unpleasant sensation on an angle is. The smaller the harmony coefficient Et is, the less an overall unpleasant sensation is.

Figure 8:
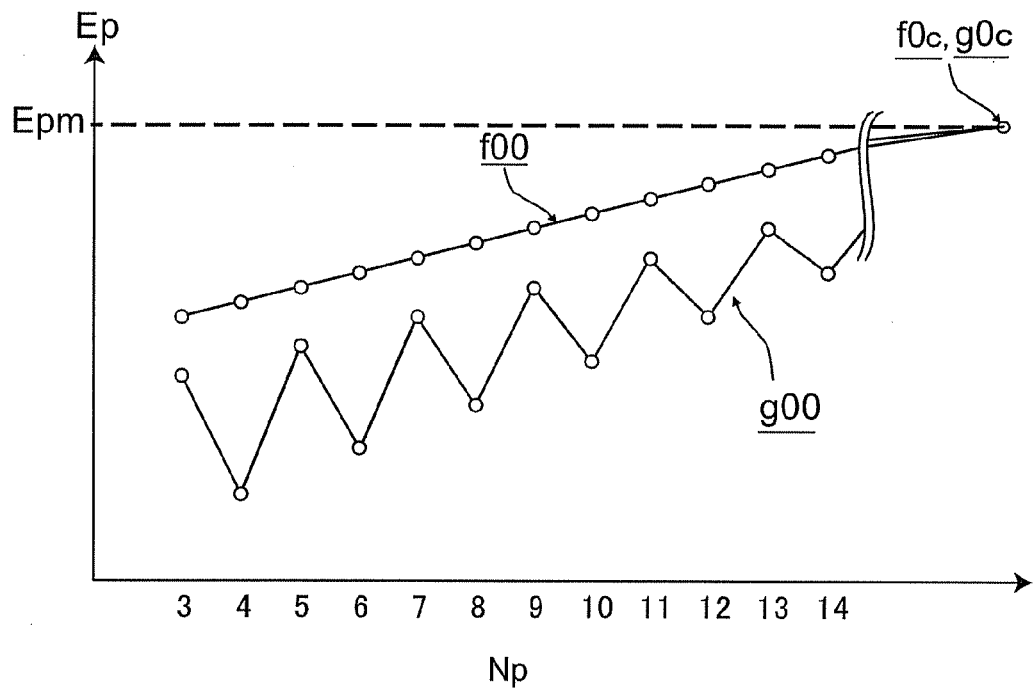
FIG. 8 is a graph showing characteristics in the display device according to the first embodiment.

FIG. 8 is a graph illustrating characteristics in the display device according to the first embodiment.

Namely, FIG. 8 illustrates the relationship between the perspective harmony coefficient Ep and the shapes and dispositions of the upper part object 185a (the shapes and dispositions seen from the upward direction (the γ-axis)). Here, the shape of the upper part object 185a seen from the upward direction (the γ-axis direction) was a regular polygon or circle. The horizontal axis in FIG. 8 expresses the number of vertices (the number of vertices Np) of the shape of the upper part object 185a. The vertical axis expresses the perspective harmony coefficient Ep. FIG. 8 shows the disposition f00 illustrated in FIG. 6A and the disposition g00 illustrated in FIG. 6B. There is also displayed the result of the shape f0c (and the shape g0c) corresponding to the case where the number of the vertices Np is infinite, which is the case where the number of vertices is large for convenience.

As shown in FIG. 8, the perspective harmony coefficient Ep depends on the disposition and number of the vertices Np of the shape of the upper part object 185a. In the case of the disposition f00 illustrated in FIG. 6A, the perspective harmony coefficient Ep is increased monotonously as the number of the vertices Np of the shape of the upper part object 185a is increased. In the case of the disposition g00 illustrated in FIG. 6B, the perspective harmony coefficient Ep is increased as the number of the vertices Np is increased while the number of the vertices Np of the shape of the upper part object 185a and the perspective harmony coefficient Ep are accompanied by parity.

Also in the cases of the disposition f00 and the disposition g00, the perspective harmony coefficient Ep is increased as the number of the vertices Np is increased. It is considered that this is because the length of individual sides included in the polygon of the upper part object 185a becomes short and the length of a straight line affecting a perspective becomes short as the number of the vertices Np is large.

As illustrated in FIG. 8, in the case where the upper part object 185a is a circle (the shape f0c and the shape g0c), the perspective harmony coefficient Ep takes a maximum value Epm. Namely, it is desirable that the upper part object 185a has a shape (a shape including no straight line) with a curved boundary line.

In the case where the upper part object 185a is a polygon, desirably, the number of the vertices Np is large.

In the case where the upper part object 185a is a polygon, more desirably, the disposition of the upper part object 185a in the image 187 is a disposition (the disposition f00) that does not include a straight line (a side) along the depth direction (the α-axis direction, i.e. the x-axis direction).

In the case where the upper part object 185a is a polygon and the disposition of the upper part object 185a in the image 187 is a disposition (the disposition g00) that includes a straight line (a side) along the depth direction (the α-axis direction, i.e. the x-axis direction), more desirably, the number of the vertices Np is an odd number.

By adopting these conditions, it is possible to further reduce an unpleasant sensation on the perspective.

Suppose that the total of the length of the straight line along the depth direction (which is the x-axis direction as well as the α-axis direction) included in the shape when the upper part object 185a is seen from above (the direction along the γ-axis) is a total length Lp, the perspective harmony coefficient Ep is calculated as a second equation below, for example.

$$Ep = knp \times Np \times klp \times Lp \quad (2)$$

Where, knp is a weight factor for the number of the vertices Np, and klp is a weight factor for the total length Lp.

Figure 9:
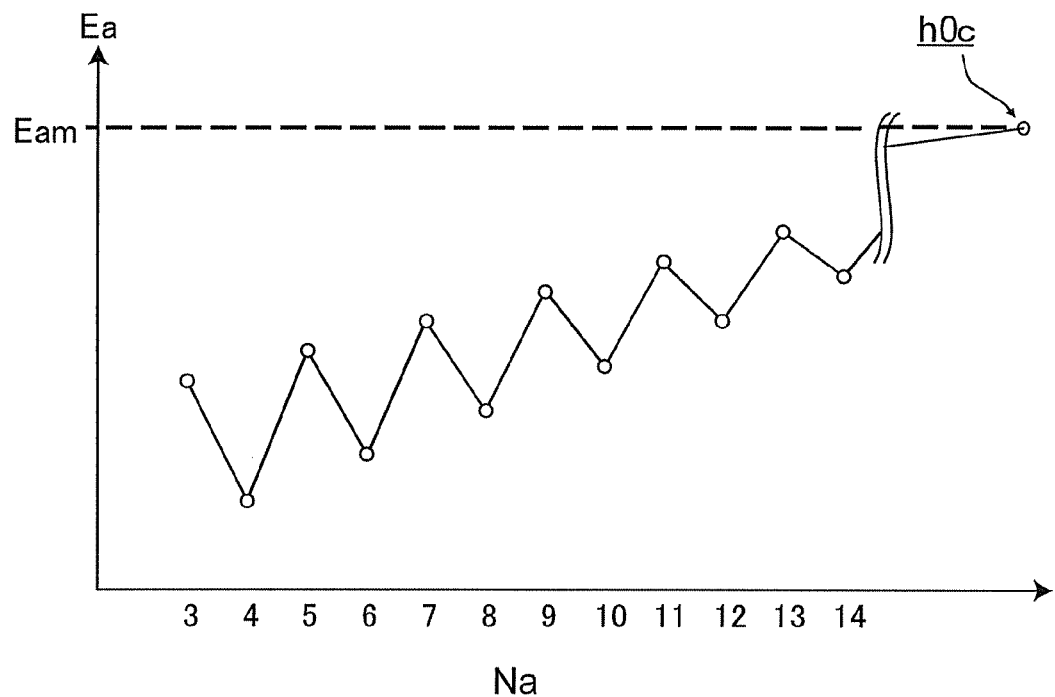
FIG. 9 is a graph showing characteristics in the display device according to the first embodiment.

FIG. 9 is a graph illustrating characteristics in the display device according to the first embodiment.

Namely, FIG. 9 illustrates the relationship between the angle harmony coefficient Ea and the shape of the lower part object 185b (the shape when seen from the β-axis direction). Here, as illustrated in FIG. 7, the shape of the lower part object 185b was a convex polygon with the top side having a fixed length, and the lengths of individual sides except the top side were the same. The horizontal axis in FIG. 9 expresses the number of vertices (the number of vertices Na) of the shape of the lower part object 185b. The vertical axis expresses the angle harmony coefficient Ea. FIG. 9 also shows the result of the shape h0c corresponding to the case where the number of the vertices Na is infinite as the case where the number of vertices is large for convenience.

As shown in FIG. 9, the angle harmony coefficient Ea depends on the number of the vertices Np of the shape of the lower part object 185b. The angle harmony coefficient Ea is increased as the number of the vertices Na is increased while the number of the vertices Na of the shape of the lower part object 185b and the angle harmony coefficient Ea are accompanied by parity.

It is considered that this is because the length of individual sides included in the polygon of the lower part object 185b becomes short and the length of a straight line affecting a perspective becomes short as the number of the vertices Na is large.

As illustrated in FIG. 9, in the case where the lower part object 185b is the lower half of a circle (the shape h0c), the angle harmony coefficient Ea takes a maximum value Earn. Namely, it is desirable that the boundary line on the lower side of the lower part object 185b (the boundary line on the opposite the upper part object 185a) be a curved shape (a shape including no straight line).

In the case where the lower part object 185b is a polygon, desirably, the number of the vertices Na is large.

In the case where the lower part object 185b is a polygon, more desirably, the number of the vertices Na is an odd number.

By adopting these conditions, it is possible to further reduce an unpleasant sensation on an angle (for example, the depression angle).

Suppose that the total of the length of a straight line (a portion of a straight line except a portion of the boundary line to the upper part object 185a in the boundary lines of the lower part object 185b) that perceives the bottom surface included in a shape when the lower part object 185b is seen from the lateral side (the direction along the β-axis) is a total length La, the angle harmony coefficient Ea is calculated as a third Equation below, for example.

$$Ea = kna \times Na - kla \times La \quad (3)$$

Where, kna is a weight factor for the number of the vertices Na, and kla is a weight factor for the total length La.

In the display device 10 according to the embodiment, the first display object 185 is adopted, in which the aforementioned harmony coefficient Et is large. For example, the upper part object 185a is adopted, in which the perspective harmony coefficient Ep is large. For example, the lower part object 185b is adopted, in which the angle harmony coefficient Ea is large.

For the shape of the first display object 185, in which the harmony coefficient Et is large, a lower hemispherical shape is used, which a sphere is horizontally cut as illustrated in FIG. 1B. Namely, the first display object 185 can have a shape when the lower part of a sphere, which is horizontally cut, is seen from a diagonal direction. However, the embodiment is not limited thereto, and it is possible to variously modify and alter the shape of the first display object 185.

Namely, it is possible to adopt the first display object 185 that arbitrarily combines various shapes of the upper part object 185a illustrated in FIG. 6A and FIG. 6B with various shapes of the lower part object 185b illustrated in FIG. 7.

It is possible to change the first display object 185 depending on the characteristics of items of information that are desired to present and the characteristics of each individual person relating to harmony with the actual outside scene. Desirably, the first display object 185 is set so as to fit to the characteristics of the perspective harmony coefficient Ep described in FIG. 8 and the characteristics of the angle harmony coefficient Ea described in FIG. 9.

FIG. 10A to FIG. 10H, FIG. 11A to FIG. 11H, FIG. 12A to FIG. 12H, FIG. 13A to FIG. 13H, and FIG. 14A to FIG. 14H are schematic views illustrating display objects for use in the display device according to the first embodiment.

Namely, these drawings illustrate the shapes of the upper part object 185a of the first display object 185 and the shapes of the lower part object 185b.

Figure 10A:
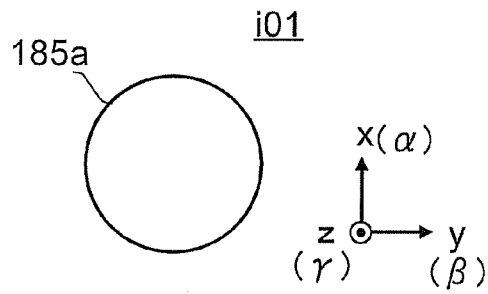
FIG. 10A to FIG. 10H are schematic views showing display objects for use in the display device according to the first embodiment.
Figure 10B:
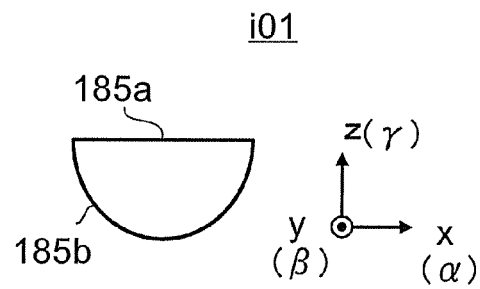

As shown in FIG. 10A and FIG. 10B, in a shape i01 of the first display object 185, the shape of the upper part object 185a when seen along the γ-axis is a circle, and the shape of the lower part object 185b when seen along the β-axis is a semicircle. Namely, the first display object 185 is a lower hemisphere that a sphere is cut in an α-β plane.

Figure 10C:
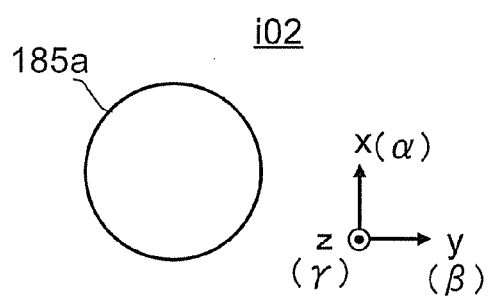
Figure 10D:
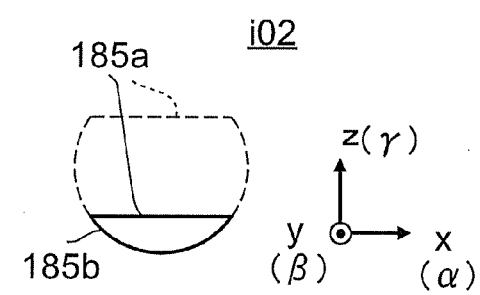

As shown in FIG. 10C and FIG. 10D, in a shape i02 of the first display object 185, the shape of the upper part object 185a when seen along the γ-axis is a circle, and the shape of the lower part object 185b when seen along the β-axis is a part of a circle.

In an example depicted by solid lines in FIG. 10D, the shape of the lower part object 185b when seen along the β-axis is smaller than a half of a circle. In an example depicted by broken lines in FIG. 10D, the shape of the lower part object 185b when seen along the β-axis is larger than a half of a circle. The first display object 185 is a part of a sphere cut in the α-β plane.

Figure 10E:
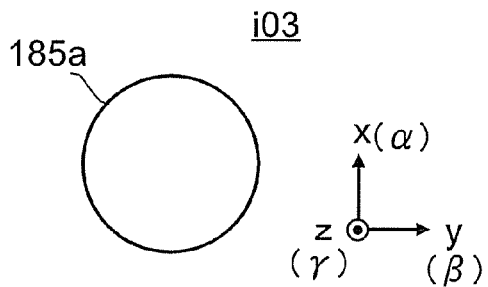
Figure 10F:
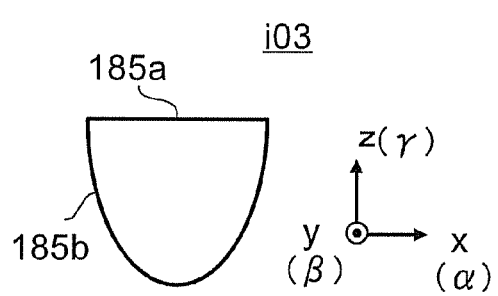

As shown in FIG. 10E and FIG. 10F, in a shape i03 of the first display object 185, the shape of the upper part object 185a when seen along the γ-axis is a circle, and the shape of the lower part object 185b when seen along the β-axis is a part of a flat circle (including an ellipse). The first display object 185 is a part of a three-dimensional shape that a flat spheroid (a spheroid) is cut in the α-β plane.

Figure 10G:
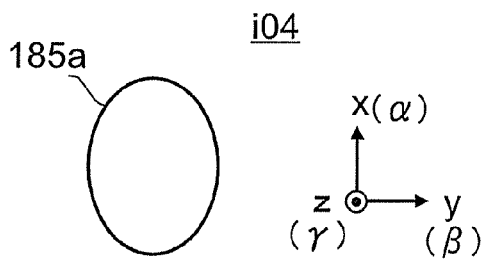
Figure 10H:
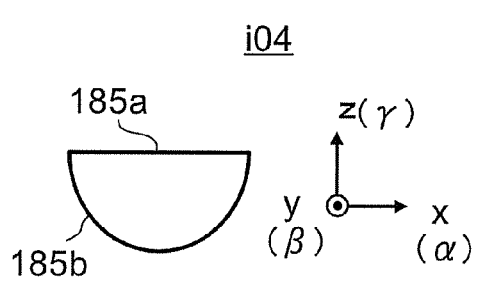

As shown in FIG. 10G and FIG. 10H, in a shape i04 of the first display object 185, the shape of the upper part object 185a when seen along the γ-axis is a flat circle (including an ellipse), and the shape of the lower part object 185b when seen along the β-axis is a part of a circle (including a circle, flat circle, and ellipse). In the specific example, the length of the first display object 185 along the α-axis is longer than the length along the β-axis.

Figure 11A:
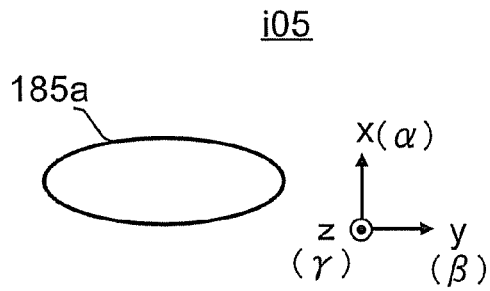
FIG. 11A to FIG. 11H are schematic views showing display objects for use in the display device according to the first embodiment.
Figure 11B:
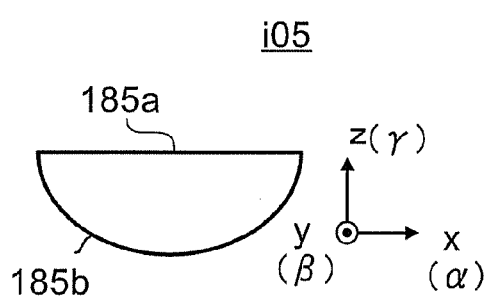

As shown in FIG. 11A and FIG. 11B, in a shape i05 of the first display object 185, the shape of the upper part object 185a when seen along the γ-axis is a flat circle (including an ellipse), and the shape of the lower part object 185b when seen along the β-axis is a part of a circle (including a circle, flat circle, and ellipse). In the specific example, the length of the first display object 185 along the α-axis is shorter than the length along the β-axis.

Figure 11C:
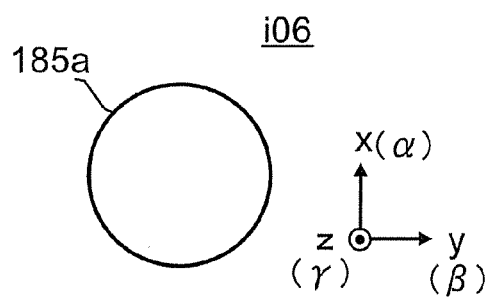
Figure 11D:
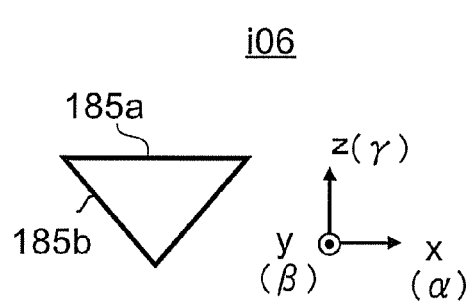
Figure 11E:
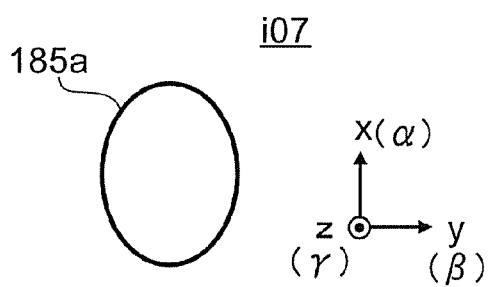
Figure 11F:
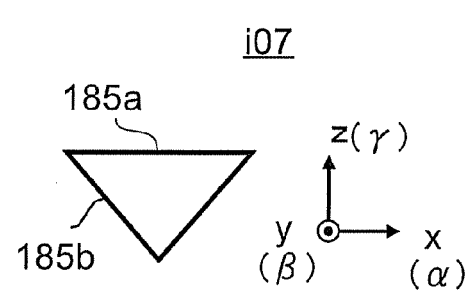
Figure 11G:
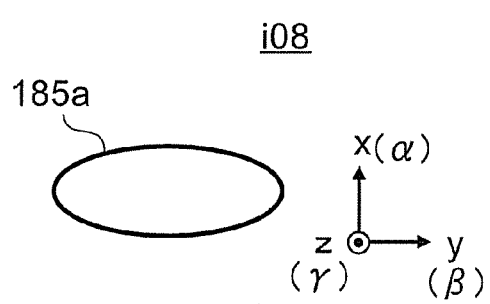
Figure 11H:
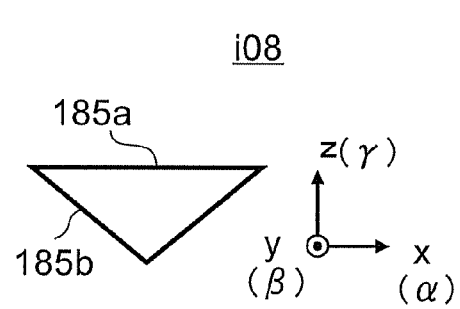

As shown in FIG. 11C and FIG. 11D, in a shape i06 of the first display object 185, the shape of the upper part object 185a when seen along the γ-axis is a circle, and the shape of the lower part object 185b when seen along the β-axis is a triangle. The first display object 185 is a cone.

As shown in FIG. 11E, FIG. 11F, FIG. 11G, and FIG. 11H, in a shape i07 and a shape i08 of the first display object 185, the shape of the upper part object 185a when seen along the γ-axis is a flat circle (including an ellipse), and the shape of the lower part object 185b when seen along the β-axis is a triangle. The first display object 185 is a flat cone (including an elliptic cone). In the shape iO7, the length of the first display object 185 along the α-axis is longer than the length along the β-axis. In the shape i08, the length of the first display object 185 along the α-axis is shorter than the length along the β-axis.

Figure 12A:
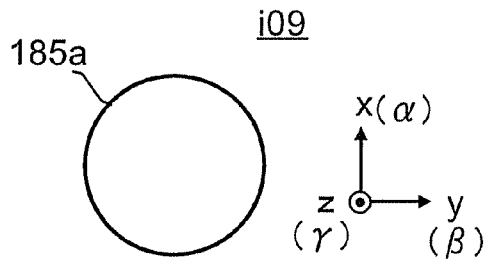
FIG. 12A to FIG. 12H are schematic views showing display objects for use in the display device according to the first embodiment.
Figure 12B:
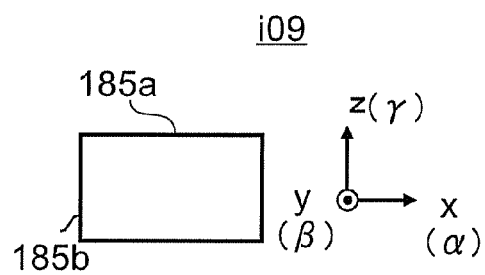

As shown in FIG. 12A and FIG. 12B, in a shape i09 of the first display object 185, the shape of the upper part object 185a when seen along the γ-axis is a circle, and the shape of the lower part object 185b when seen along the β-axis is a rectangle (a quadrilateral). The first display object 185 is a cylinder. It may be possible to adopt a shape of a flat cylinder (an elliptic cylinder) as the first display object 185.

Figure 12C:
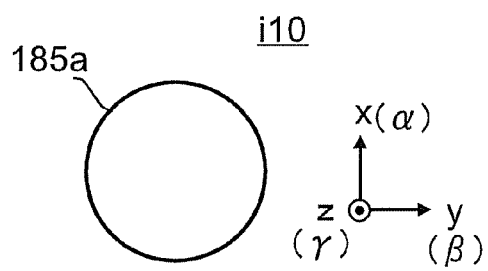
Figure 12D:
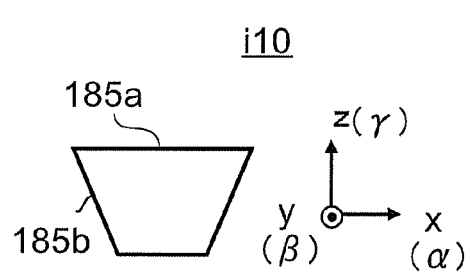

As shown in FIG. 12C and FIG. 12D, in a shape i10 of the first display object 185, the shape of the upper part object 185a when seen along the γ-axis is a circle, and the shape of the lower part object 185b when seen along the β-axis is a trapezoid. The length of the top side (a side on the upper part object 185a side) of the lower part object 185b is longer than the length of the lower side (a side opposite the upper part object 185a) of the lower part object 185b. The first display object 185 is a circular truncated cone. It may be possible to adopt a shape of a flat circular truncated cone (an elliptic truncated cone) as the first display object 185.

Figure 12E:
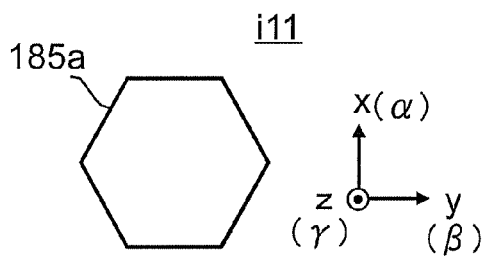
Figure 12F:
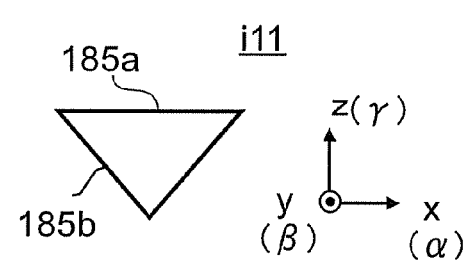

As shown in FIG. 12E and FIG. 12F, in a shape i11 of the first display object 185, the shape of the upper part object 185a when seen along the γ-axis is a hexagon, and the shape of the lower part object 185b when seen along the β-axis is a triangle. The first display object 185 is a hexagonal pyramid. It may be possible to adopt a shape of a polygonal pyramid having an arbitrary polygon other than a hexagon as the first display object 185.

Figure 12G:
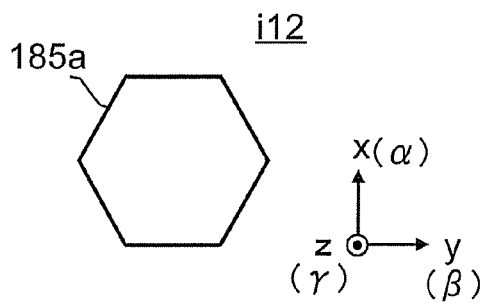
Figure 12H:
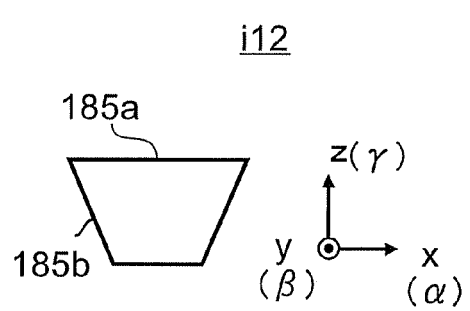

As shown in FIG. 12G and FIG. 12H, in a shape i12 of the first display object 185, the shape of the upper part object 185a when seen along the γ-axis is a hexagon, and the shape of the lower part object 185b when seen along the β-axis is a trapezoid. The length of the top side (a side on the upper part object 185a side) of the lower part object 185b is longer than the length of the lower side (a side opposite the upper part object 185a) of the lower part object 185b. The first display object 185 is a hexagonal truncated pyramid. It may be possible to adopt a shape of a polygonal truncated pyramid having an arbitrary polygon other than a hexagon as the first display object 185.

Figure 13A:
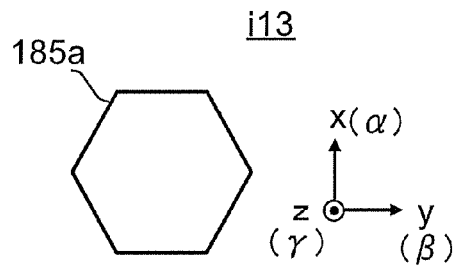
FIG. 13A to FIG. 13H are schematic views showing display objects for use in the display device according to the first embodiment.
Figure 13B:
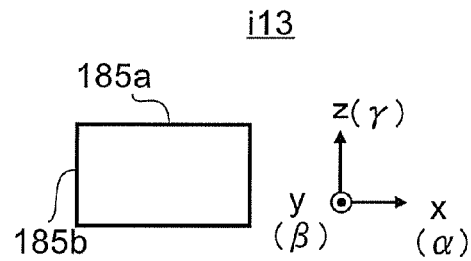

As shown in FIG. 13A and FIG. 13B, in a shape i13 of the first display object 185, the shape of the upper part object 185a when seen along the γ-axis is a hexagon, and the shape of the lower part object 185b when seen along the β-axis is a rectangle (a quadrilateral). The first display object 185 is a hexagonal prism. It may be possible to adopt a shape of a prism having an arbitrary polygon other than the first display object 185.

Figure 13C:
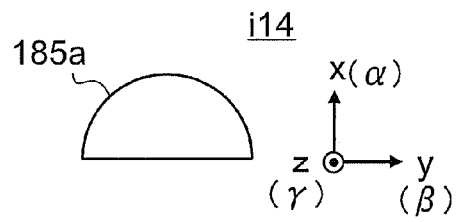
Figure 13D:
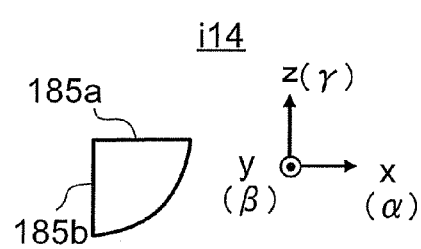

As shown in FIG. 13C and FIG. 13D, in a shape i14 of the first display object 185, the shape of the upper part object 185a when seen along the γ-axis is a semicircle, and the shape of the lower part object 185b when seen along the β-axis is a shape of a quarter of a circle. The first display object 185 has a shape of a quarter of a sphere (also including a flat sphere). In the specific example, the boundary of the upper part object 185a near the image viewer 100 is a boundary of a circle cut in a 13-y plane. It is noted that it may be possible that the boundary of the upper part object 185a apart from the image viewer 100, on the other way around, is a boundary that a circle is cut in the β-γ plane. Namely, it may be possible to adopt a shape that the shape i14 is inverted as the β-γ plane is the axis. It may be possible to adopt a shape that the shape i14 is inverted with reference to an arbitrary direction.

Figure 13E:
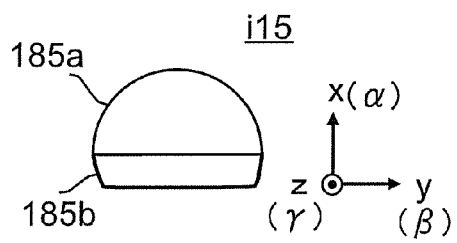
Figure 13F:
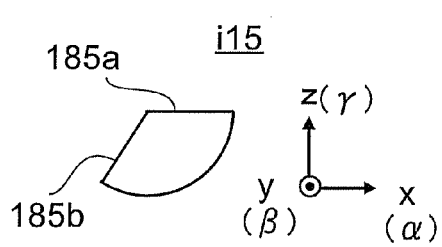

As shown in FIG. 13E and FIG. 13F, in a shape i15 of the first display object 185, the shape of the upper part object 185a when seen along the γ-axis is a part of a circle, and the shape of the lower part object 185b when seen along the β-axis is a part of a circle. The first display object 185 has a shape that a sphere (also including a flat sphere) is cut in a plane parallel with the β-axis and tilted to the α-axis and the γ-axis. Also in this case, it may be possible to adopt a shape that the shape i15 is inverted with reference to an arbitrary direction.

Figure 13G:
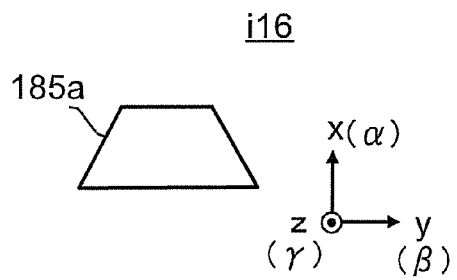
Figure 13H:
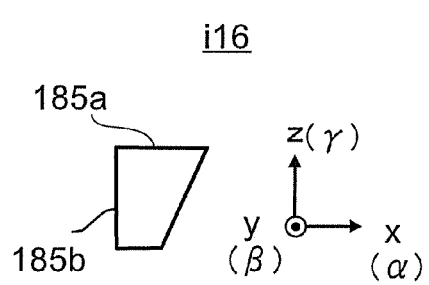

As shown in FIG. 13G and FIG. 13H, in a shape i16 of the first display object 185, the shape of the upper part object 185a when seen along the γ-axis is a trapezoid (a shape that a hexagon is cut), and the shape of the lower part object 185b when seen along the β-axis is a quadrilateral (a shape that a trapezoid is cut). The first display object 185 has a shape that a hexagonal truncated pyramid, for example, is cut in the β-γ plane. Also in this case, it may be possible to adopt a shape that the shape i16 is inverted with reference to an arbitrary direction.

Figure 14A:
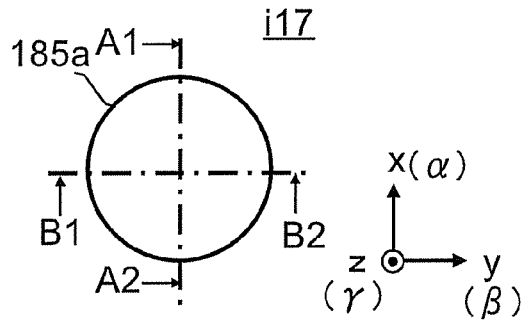
FIG. 14A to FIG. 14H are schematic views showing display objects for use in the display device according to the first embodiment.
Figure 14B:
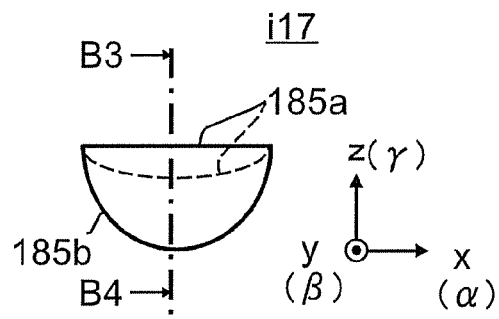
Figure 14C:
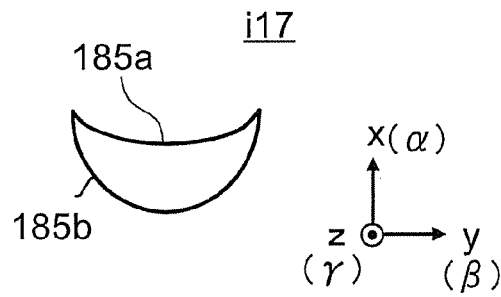
Figure 14D:
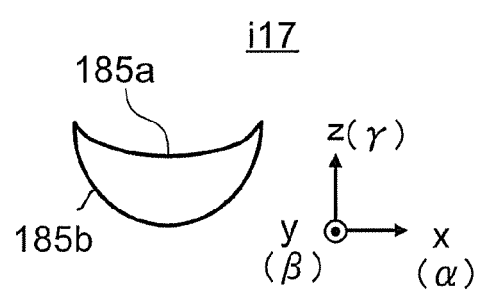

FIG. 14A is a plan view when the first display object 185 is seen along the γ-axis, FIG. 14B is a plan view when the first display object 185 is seen along the β-axis, FIG. 14C is a cross-sectional view corresponding to a cross section of a line A1-A2 in FIG. 14A, and FIG. 14D is a cross-sectional view corresponding to a cross section of a line B1-B2 in FIG. 14A and corresponding to a cross section of line B3-B4 in FIG. 14B.

As shown in FIG. 14A and FIG. 14B, in a shape i17 of the first display object 185, the shape of the upper part object 185a when seen along the γ-axis is a circle (including a flat circle and an ellipse), and the shape of the lower part object 185b when seen along the β-axis is a part of a circle. As shown in FIG. 14C and FIG. 14D, the upper part object 185a is bowed inward at the center portion to the lower side.

As described above, the top surface of the three-dimensional shape (a portion corresponding to the upper part object 185a) expressed by the first display object 185 may be a plane, or a curved surface.

Figure 14E:
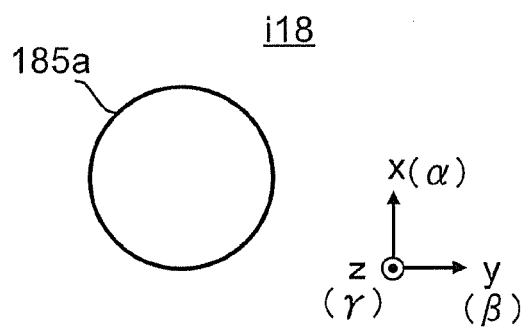
Figure 14F:
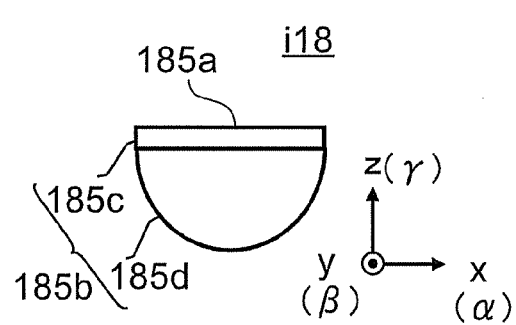

As shown in FIG. 14E and FIG. 14F, in a shape i18 of the first display object 185, the shape of the upper part object 185a when seen along the γ-axis is a circle (including a flat circle and an ellipse), and the shape of the lower part object 185b when seen along the β-axis has a shape that a part of a circle is combined with a rectangle. Namely, the lower part object 185b has a disc-shaped first part 185c and a lower part 185d in a shape that is a part of a sphere.

Figure 14G:
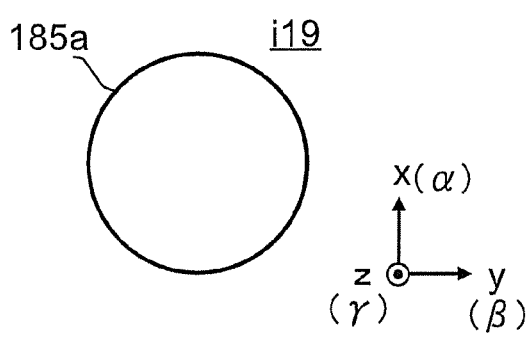
Figure 14H:
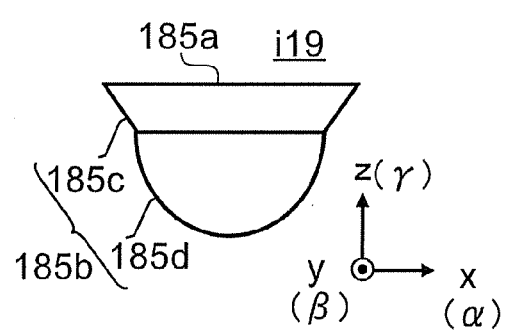

As shown in FIG. 14G and FIG. 14H, in a shape i19 of the first display object 185, the shape of the upper part object 185a when seen along the γ-axis is a circle (including a flat circle and an ellipse), and the shape of the lower part object 185b when seen along the β-axis has a shape that a part of a circle is combined with a trapezoid. Namely, the lower part object 185b has the first part 185c having a shape of a circular truncated cone and the lower part 185d having a shape that is a part of a sphere.

As described above, the lower part object 185b may have a shape that a plurality of parts in an arbitrary shape are combined. The upper part object 185a may also have a shape that a plurality of parts in an arbitrary shape are combined.

A line to cut various cones (including a flat cone), polygonal pyramids, circular truncated cones (including a flat circular truncated cone), and polygonal truncated pyramids described above in the plane including the γ-axis is not always a straight line, which may be an arbitrary curve.

In the following, an example of the second display object 186 will be described.

Figure 15A:
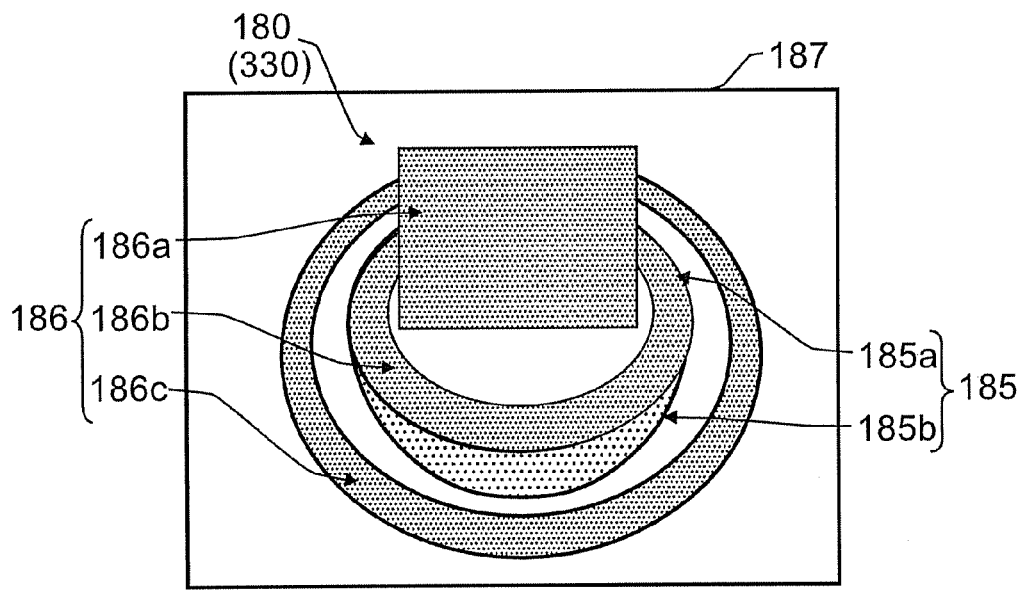
FIG. 15A to FIG. 15C are schematic views showing display objects for use in the display device according to the first embodiment.
Figure 15B:
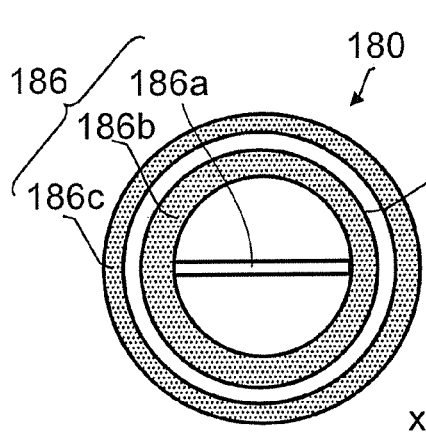
Figure 15C:
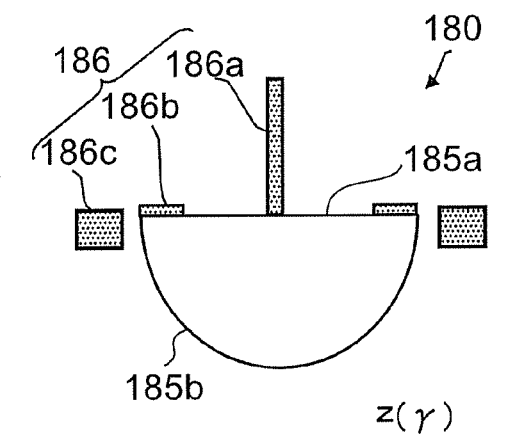

FIG. 15A to FIG. 15C are schematic views illustrating display objects for use in the display device according to the first embodiment.

Namely, these drawings illustrate the configuration of the second display object 186. FIG. 15A illustrates the state perceived when the image viewer 100 views the display object 180 (the display video 330), FIG. 15B is a schematic plan view when the display object 180 is seen along the γ-axis in the virtual space VS, and FIG. 15C is a schematic plan view when the display object 180 is seen along the β-axis in the virtual space VS.

As shown in FIG. 15A, FIG. 15B, and FIG. 15C, the second display object 186 can have a first type object 186a and a second type object 186b. The second display object 186 can have a third type object 186c. As described above, the second display object 186 can have a plurality of types of objects.

The first type object 186a is disposed in the image 187 with reference to the display position of the first display object 185 in the image 187. The first type object 186a includes symbolic information. Here, the symbolic information includes character information. The character information includes characters and numerals. The character information includes information that arbitrary graphics are adopted as symbolic patterns. The first type object 186a may further include information other than the aforementioned symbolic information.

The first type object 186a includes numerals, characters, three-dimensional objects, and so on, for example, and presents the correct meanings of items of information to the image viewer 100.

The second type object 186b is disposed in the image 187 with reference to the display position of the first display object 185 in the image 187. The second type object 186b is different from the first type object 186a. The second type object 186b includes graphic pattern information. The graphic pattern information has a functionality of conveying information by at least one of the shape, size, number, position, color, and brightness of graphics. For example, the graphic pattern information includes graphs (including a bar graph, a ring graph, and the like), and the move of graphics (such as a graphic that expresses a meter in which a line indicating a needle, for example, turns), etc. The graphic pattern information includes a meter, an indicator, and the like, for example, and relatively presents quantitative information to the image viewer 100 by at least one of the shape, size, number, position, color, and brightness of graphics.

The third type object 186c is disposed in the image 187 with reference to the display position of the first display object 185 in the image 187. The third type object 186c includes a first state object and a second state object. The first state object corresponds to the moving body (the vehicle 730) in a first state. The second state object corresponds to the moving body in a second state in which a predetermined characteristic value is different from that of the aforementioned first state. The second state object is different from the first state object. A change with time in at least one of the shape, size, number, color, brightness, position, and track of the first state object is different from that in the second state object. At least one of the projections and depressions of the shape of the second state object and the projections and depressions of the track is different from those in the first state object.

For example, the first state object creates a stable impression in a person, and the second state object creates an unstable impression in a person. The third type object 186c presents information to the image viewer 100 by a method of acting on the sensation of the image viewer 100. The image viewer 100 intuitively grasps the presented information.

The third type object 186c intuitively presents to the image viewer 100 information on the driving conditions of the vehicle 730 (including the driving conditions from a viewpoint of energy consumption efficiency, and the degree of safety or danger or the like in driving the vehicle 730, for instance), for example, by at least one of the shape, color, and motion of graphic patterns.

As shown in FIG. 15A to FIG. 15C, in the virtual space VS, the first type object 186a is disposed on/above the first display object 185, for example. The first type object 186a is disposed on/above the upper part object 185a. The first type object 186a is disposed on/above a plane (β-γ plane, for example) crossing the α-β plane on the upper part object 185a. The first type object 186a is disposed at the center portion (the center portion on the α-axis, for example) on/above the upper part object 185a.

In this example, in the virtual space VS, the first type object 186a is disposed in a space different from the surface of the first display object 185 (for example, the surface of the upper part object 185a).

In the virtual space VS, the second type object 186b is disposed at a position different from the position of the first type object 186 on the first display object 185, for example. Here, the different position means that it is sufficient that at least a part of the region in which the second type object 186b is disposed is different from the region in which the first type object 186a is disposed. A part of the region in which the second type object 186b is disposed may overlap with the region in which the first type object 186a is disposed. The second type object 186b is disposed at a position different from the position of the first type object 186 on/above the upper part object 185a. The second type object 186b is disposed on/above the edge portion of the upper part object 185a on/above the upper part object 185a. In the case where the first display object 185 has a shape that a part of a sphere is cut in the α-β plane, the second type object 186b is disposed in an annular region (a ring-shaped region, for example) in the edge portion on the surface of the upper part object 185a.

In this example, in the virtual space VS, the second type object 186b is disposed on/above the surface of the first display object 185 (for example, the surface of the upper part object 185a).

The third type object 186c is disposed at a position different from the position of the first type object 186 and also different from the position of the second type object 186b in the image 187. In the virtual space VS, the third type object 186c is disposed in a region in which the third type object 186c is surrounded around the first display object 185, for example. The third type object 186c is disposed in a region in which the third type object 186c is surrounded around the first display object 185 in the α-β plane, for example. In the case where the first display object 185 has a shape that a part of a sphere is cut in the α-β plane, the third type object 186*c* is provided in an annular region that the third type object 186*c* is surrounded around the edge of the upper part object 185*a* in the α-β plane.

In this example, in the virtual space VS, the third type object 186*c* is disposed in a space different from the surface of the first display object 185 (for example, the surface of the upper part object 185*a*).

As described above, the first type object 186*a* and the second type object 186*b* are disposed with reference to the first display object 185, so that the display positions of the first type object 186*a* and the second type object 186*b* are relatively fixed to each other. Thus, the image viewer 100 easily recognizes the first type object 186*a* and the second type object 186*b*. In the case of providing the third type object 186*a*, the third type object 186*c* is disposed with reference to the first display object 185, so that the display position of the third type object 186*c* is relatively fixed. Thus, the image viewer 100 easily recognizes the third type object 186*c*.

As described above, the first display object 185 has a three-dimensional shape; the upper part object 185*a* includes the top surface of the three-dimensional shape, and includes at least one of the side surface and bottom surface on the lower side of the top surface of the lower part object 185*b* in the three-dimensional shape. In the virtual space VS, at least a part of the second display object 186 is disposed in a space different from the surface of the first display object 185 (for example, the surface of the upper part object 185*a*). Therefore, the second display object 186 tends to be perceived as if the second display object 186 is placed on/above the first display object 185, and it is possible to further reduce an unpleasant sensation on the depth direction and an unpleasant sensation on the position in the height direction.

The second display object 186 may have at least one of the aforementioned first type object 186*a*, the second type object 186*b*, and the third type object 186*c*. It may be possible that the types of objects included in the second display object 186 are changed depending on the operating state of the display device 10.

In FIG. 1B already illustrated, it is an example that the first type object 186*a* is displayed as the second display object 186. This example is an example using the combination of numerals and characters to display the velocity of the vehicle 730 as the first type object 186*a*.

Figure 16A:
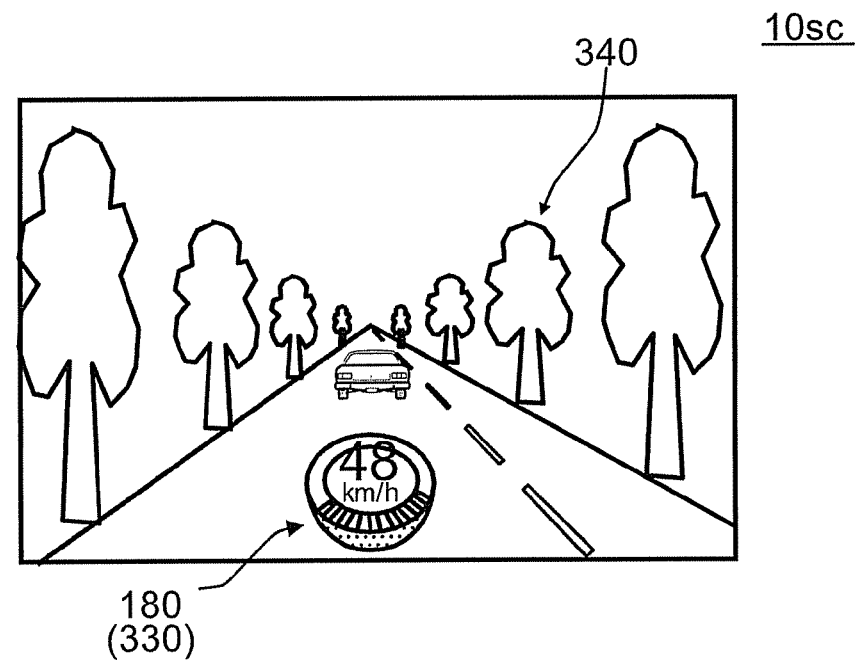
FIG. 16A and FIG. 16B are schematic views showing display objects for use in the display device according to the first embodiment.
Figure 16B:
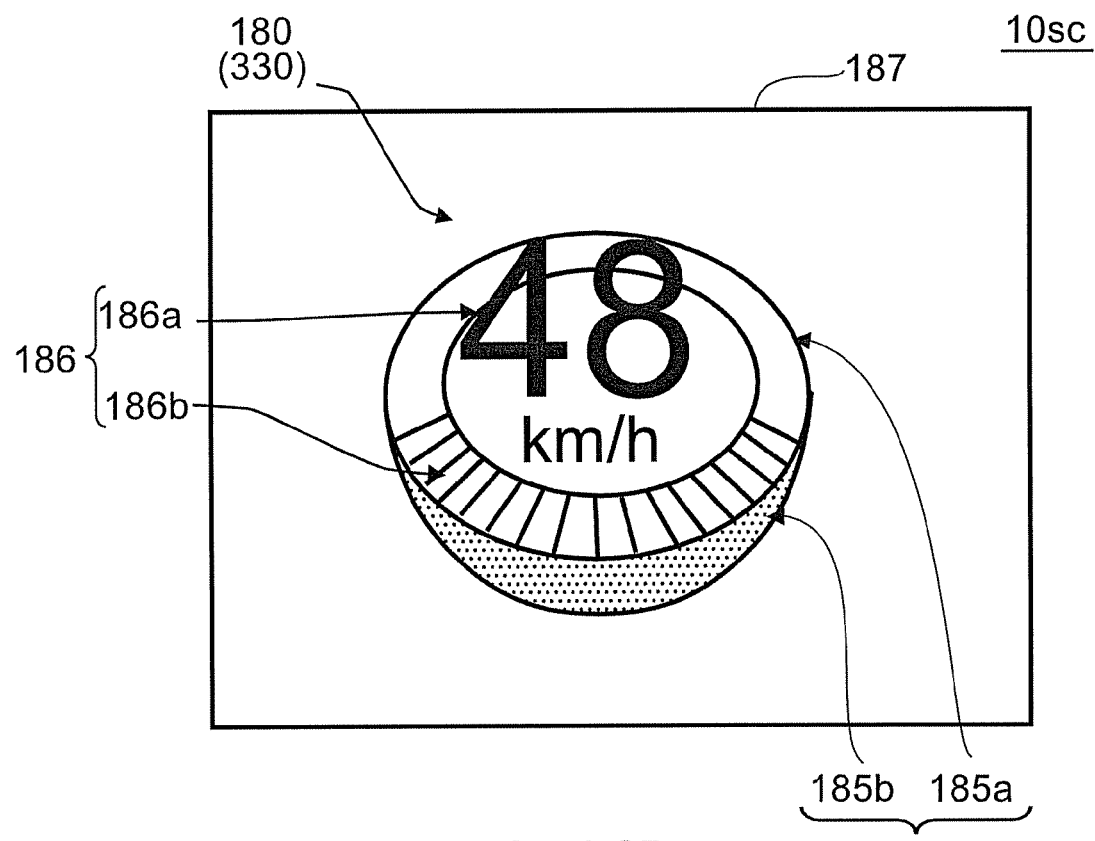

FIG. 16A and FIG. 16B are schematic views illustrating display objects for use in the display device according to the first embodiment.

As shown in FIG. 16A and FIG. 16B, in a display operation 10*sc* of the display device 10, the velocity of the vehicle 730 is displayed as the first type object 186*a* with characters that are symbolic information, and the engine RPM of the vehicle 730 is displayed as the second type object 186*b* by a bar graph that is a graphic pattern.

Figure 17A:
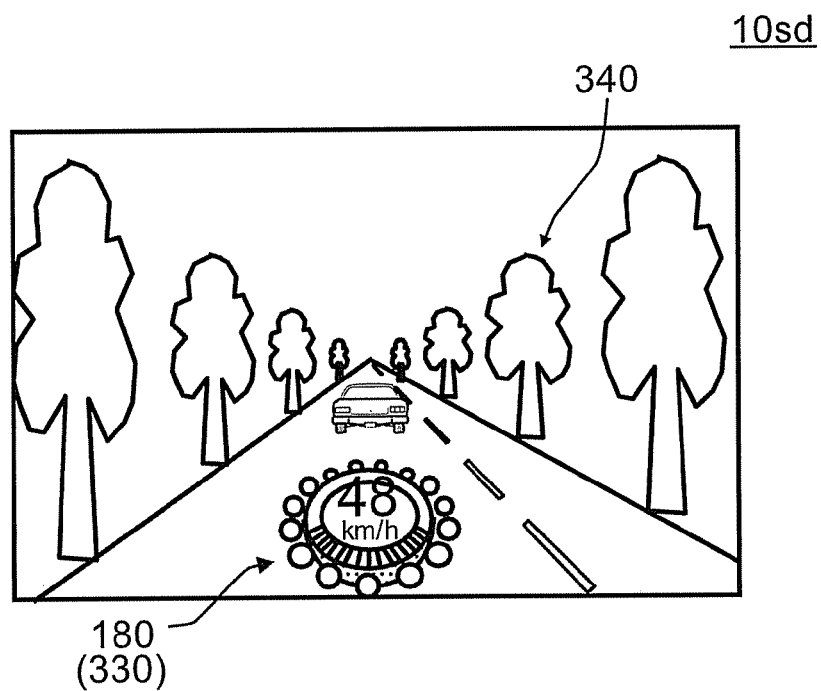
FIG. 17A and FIG. 17B are schematic views showing display objects for use in the display device according to the first embodiment.
Figure 17B:
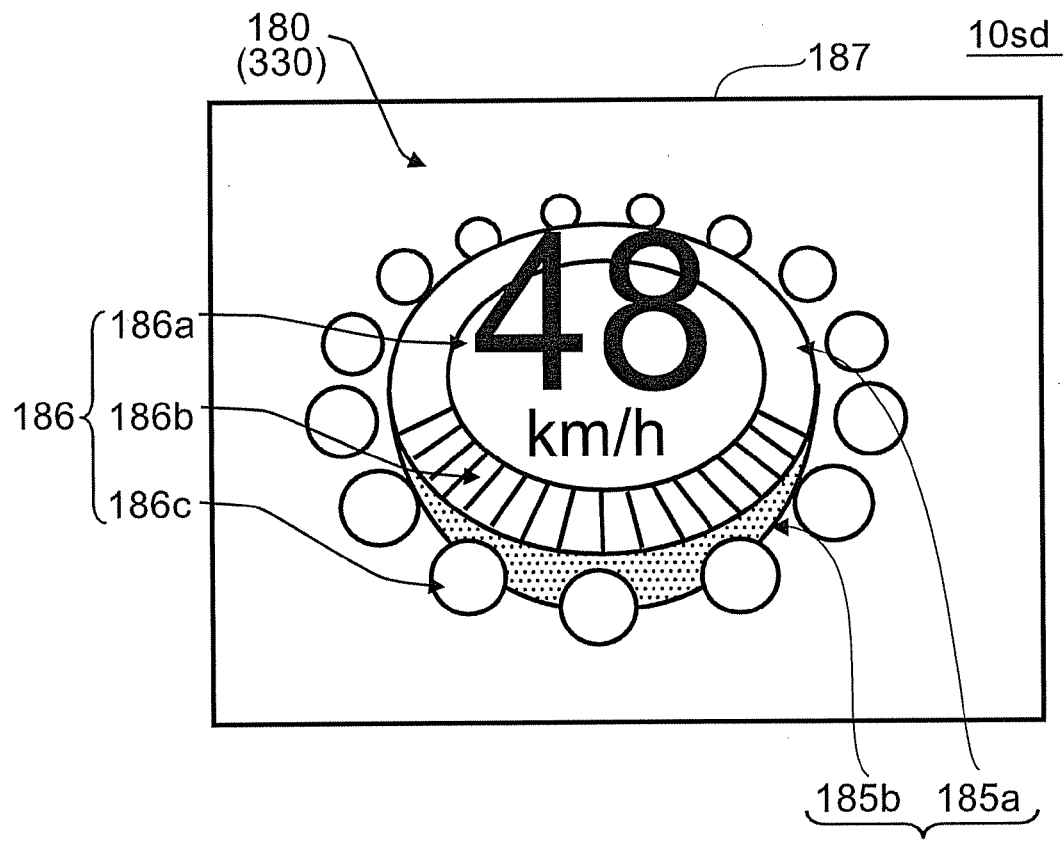

FIG. 17A and FIG. 17B are schematic views illustrating display objects for use in the display device according to the first embodiment.

As shown in FIG. 17A and FIG. 17B, in a display operation 10*sd* of the display device 10, in addition to the first type object 186*a* and the second type object 186*b* already described relating to the display operation 10*sc*, the driving conditions of the vehicle 730 (for example, the driving conditions from a viewpoint of energy consumption efficiency) are displayed by a color of graphic patterns such as a plurality of circles (spheres) and a rate of travel of a graphic pattern in the image 187. For example, when the driving conditions are excellent in energy consumption efficiency, the color of graphic patterns is green for safe color, whereas when the driving conditions are poor in energy consumption efficiency, the color of graphic patterns is red for dangerous color. For example, when the driving conditions are excellent in energy consumption efficiency, the rate of travel of a graphic pattern in the image 187 is made low, whereas when the driving conditions are poor in energy consumption efficiency, the rate of travel of a graphic pattern in the image 187 is made high.

As described above, the first type object 186*a*, the second type object 186*b*, and the third type object 186*c* can include items of information whose properties are different from each other. The first type object 186*a*, the second type object 186*b*, and the third type object 186*c* including the items of information whose properties are different from each other are disposed in regions different from each other in the image 187, and displayed by methods different from each other.

Figure 18A:
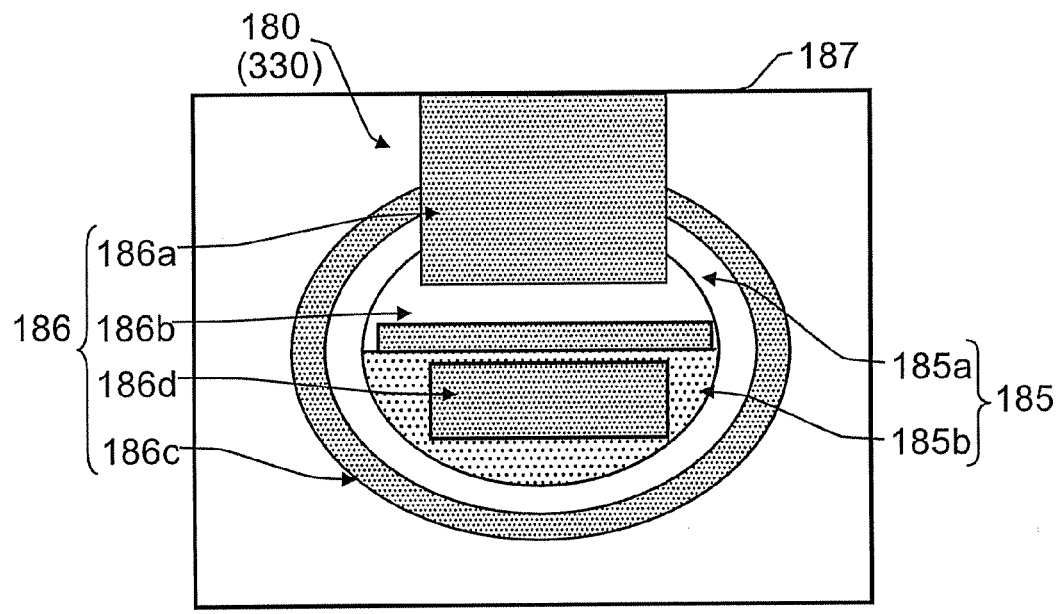
FIG. 18A to FIG. 18C are schematic views showing display objects for use in the display device according to the first embodiment.
Figures 18B, 18C:
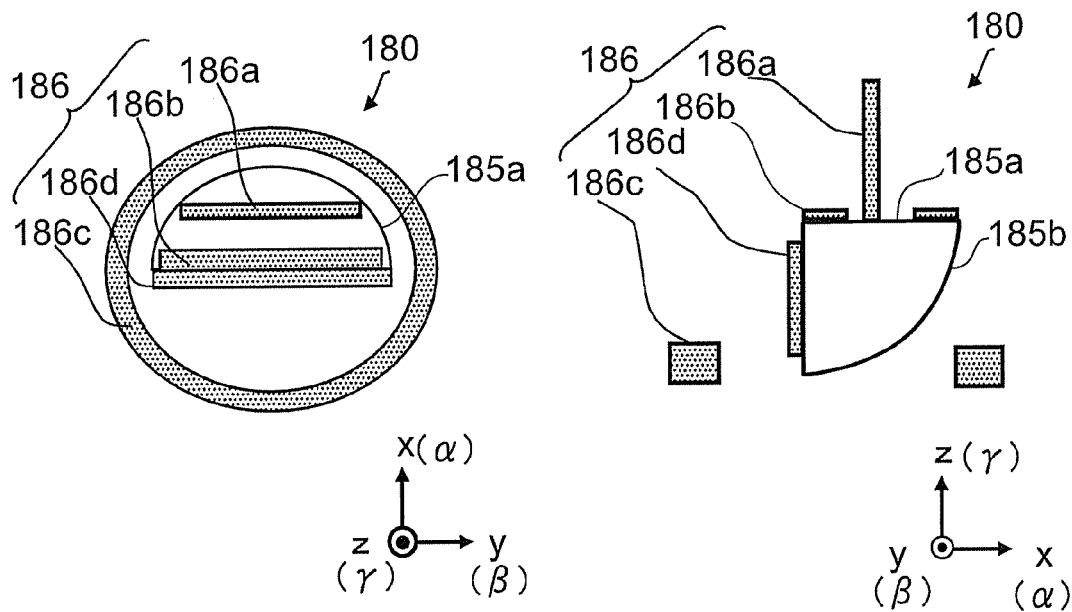

FIG. 18A to FIG. 18C are schematic views illustrating display objects for use in the display device according to the first embodiment.

Namely, FIG. 18A to FIG. 18C illustrate the configuration of the second display object 186.

As shown in FIG. 18A, FIG. 18B, and FIG. 18C, in addition to the first type object 186*a*, the second type object 186*b*, and the third type object 186*c* already described, the second display object 186 has a fourth type object 186*d*. In the specific example, it may be possible that the second type object 186*b* and the third type object 186*c* are omitted and the first type object 186*a* and the fourth type object 186*d* are used.

In the specific example, the shape i14 shown in FIG. 13B and FIG. 13C is used for the first display object 185. Namely, the shape of the upper part object 185*a* when seen along the γ-axis is a semicircle, and the shape of the lower part object 185*b* when seen along the β-axis has a shape of a quarter of a circle. In the virtual space VS, the first type object 186*a* is disposed at the central portion on/above the upper part object 185*a*. The second type object 186*b* is disposed frontward on/above the first type object 186*a*. The third type object 186*c* is disposed in an annular region in which the third type object 186*c* is surrounded around the periphery of the upper part object 185*a* in the α-β plane. The fourth type object 186*d* is disposed on the side surface of the lower part object 185*b* on the image viewer 100 side, for example.

Figure 19A:
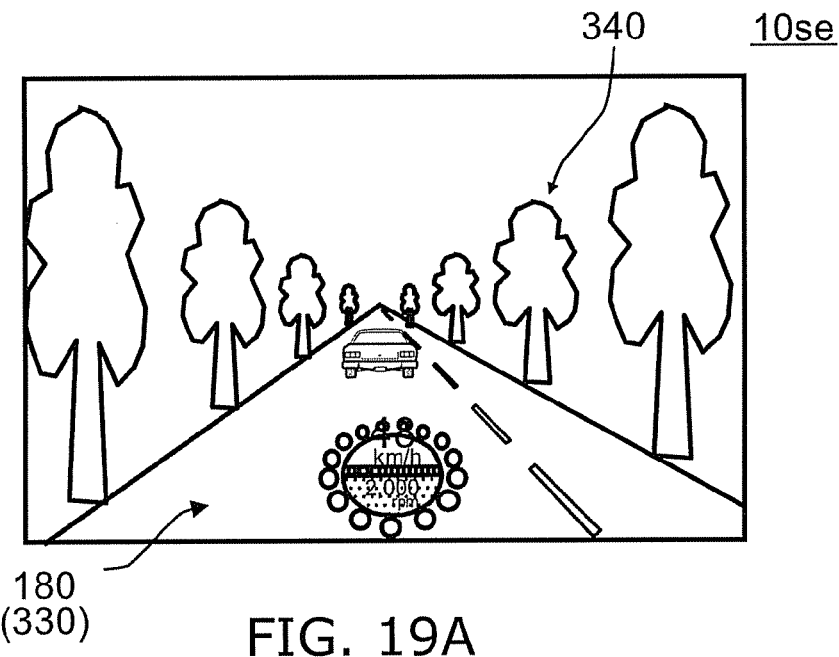
FIG. 19A and FIG. 19B are schematic views showing display objects for use in the display device according to the first embodiment.
Figure 19B:
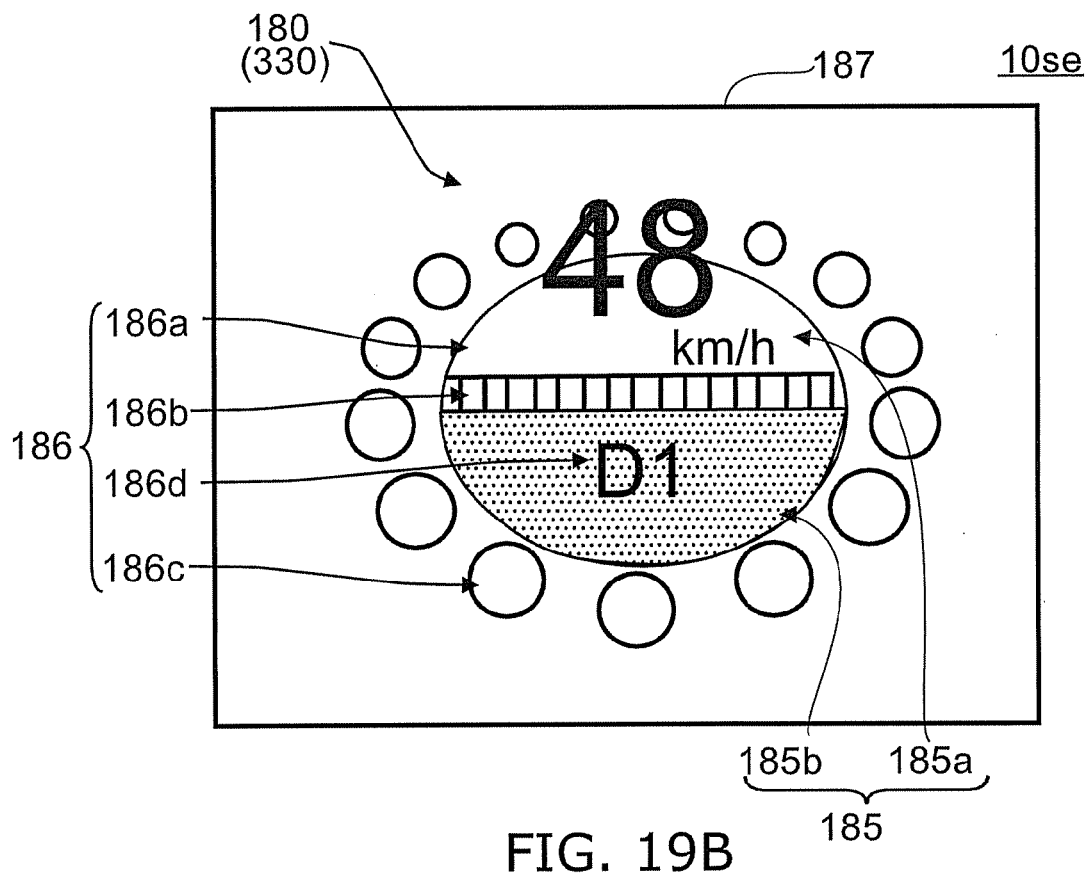

FIG. 19A and FIG. 19B are schematic views illustrating display objects for use in the display device according to the first embodiment.

As shown in FIG. 19A and FIG. 19B, in a display operation 10*se* of the display device 10, in addition to the first type object 186*a* (displaying the vehicle speed), the second type object 186*b* (displaying the engine RPM), and the third type object 186*c* (displaying the driving conditions from a viewpoint of energy consumption efficiency of the vehicle 730, for example) as described relating to the display operation 10*sd*, the operating state of the transmission of the vehicle 730 is displayed using symbolic information as the fourth type object 186*d*.

As described above, the first type object 186*a* and the second type object 186*b* are disposed with reference to the first display object 185, so that the display positions of the first type object 186*a* and the second type object 186*b* are relatively fixed to each other. Thus, the image viewer 100 easily recognizes the first type object 186*a* and the second type object 186*b*. In the case of providing the third type object 186*a*, the third type object 186*c* is disposed with reference to the first display object 185, so that the display position of the third type object 186*c* is relatively fixed. Thus, the image viewer 100 easily recognizes the third type object 186*c*. In the case of providing the fourth type object 186*d*, the fourth type object 186*d* is disposed with reference to the first display object 185, so that the display position of the fourth type object 186d is relatively fixed. Therefore, the image viewer 100 easily recognizes the fourth type object 186d.

FIG. 20A to FIG. 20D are schematic views showing display objects for use in the display device according to the first embodiment.

Figure 20A:
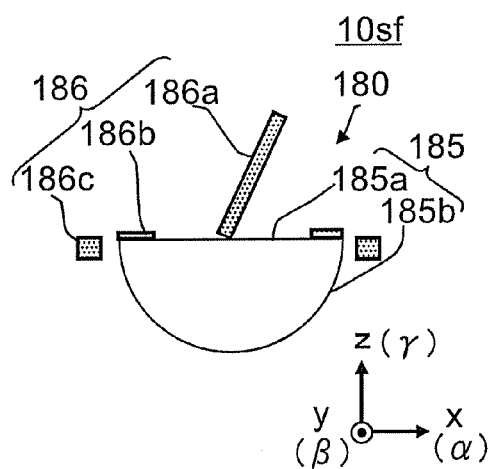
FIG. 20A to FIG. 20D are schematic views showing display objects for use in the display device according to the first embodiment.

As shown in FIG. 20A, in a display operation 10sf, the top surface (the top surface of the upper part object 185a) of the first display object 185 is horizontal (in parallel with the α-β plane), and the display surface of the first type object 186a is tilted to the top surface of the first display object 185 in the virtual space VS.

Figure 20B:
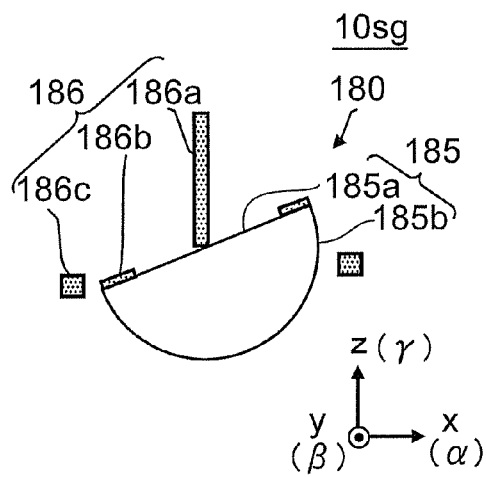

As shown in FIG. 20B, in a display operation 10sg, the top surface (the top surface of the upper part object 185a) of the first display object 185 is tilted from the horizontal plane (the α-β plane), and the display surface of the first type object 186a is tilted to the horizontal plane in the virtual space VS. Namely, the display surface of the first type object 186a is tilted to the top surface of the first display object 185.

Figure 20C:
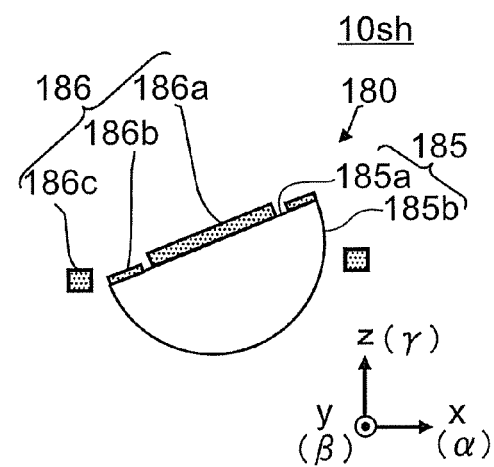

As shown in FIG. 20C, in a display operation 10sh, the top surface (the top surface of the upper part object 185a) of the first display object 185 is tilted from the horizontal plane (the α-β plane), and the display surface of the first type object 186a is in parallel with the top surface of the first display object 185 in the virtual space VS.

As described above, in the virtual space VS, at least one of the display surfaces of components (the first type object 186a, the second type object 186b, the third type object 186c, and the like, for example) included in the second display object 186 may be vertical to, in parallel with, or tilted to the top surface (the top surface of the upper part object 185a) of the first display object 185.

In the virtual space VS, the top surface (the top surface of the upper part object 185a) of the first display object 185 may be in parallel with or tilted to the α-β plane.

It is possible to change the angle of the top surface (the top surface of the upper part object 185a) of the first display object 185 in the virtual space VS based on at least any item of information on the outside of the vehicle 730 (including the slope or the like of the road on which the vehicle 730 is running, for example), information on the vehicle 730 (including the roll angle, pitch angle, yaw angle, or the like of the vehicle 730, for example), and information on the state of the image viewer 100 (the position or the like of the eye 101 of the image viewer 100, for example), for instance. The angle of the top surface of the first display object 185 is changed as corresponding to changes in the gradient of the road or changes in the attitude of the vehicle 730, for example, so that it is possible to further reduce an unpleasant sensation. As described above, the image data generating unit 130 can change the first display object 185 based on at least one of the information on the outside of the vehicle 730, the information on the vehicle 730, and the information on the image viewer 100.

Figure 20D:
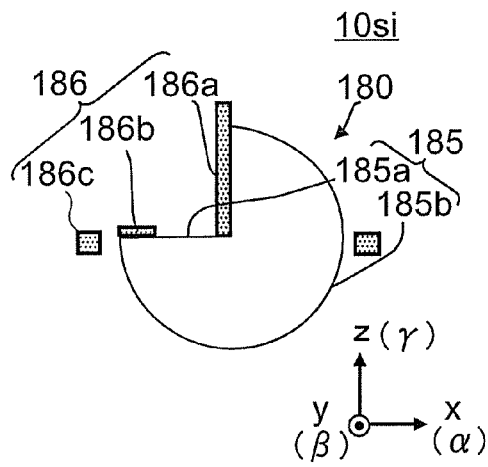

As shown in FIG. 20D, in a display operation 10si, a three-dimensional shape (a shape of three quarters of a sphere) is used for the first display object 185, which a sphere is cut in the horizontal plane and the vertical plane. The section in the horizontal plane and the section in the vertical plane of this three-dimensional shape correspond to the upper part object 185a, and the surface of the sphere on the outer side corresponds to the lower part object 185b. In this example, the first type object 186a is disposed along the section in the vertical plane of the sphere. The second type object 186b is disposed along the section in the horizontal plane of the sphere. The third type object 186c is disposed around the periphery of the sphere along the horizontal plane.

As described above, it is possible to variously modify and alter the shape of the first display object 185.

Figure 21A:
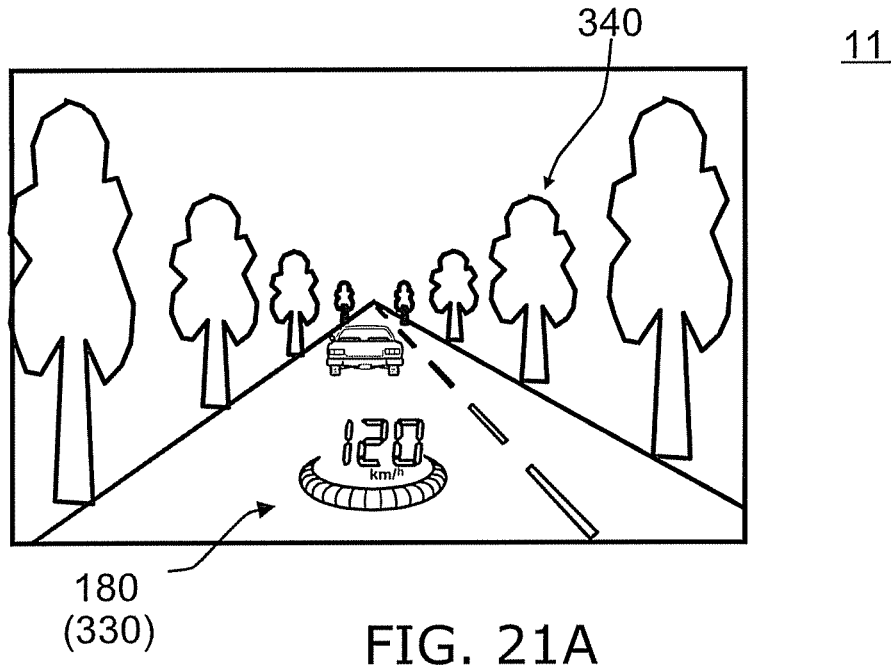
FIG. 21A and FIG. 21B are schematic views showing display objects for use in the display device according to the first embodiment.
Figure 21B:
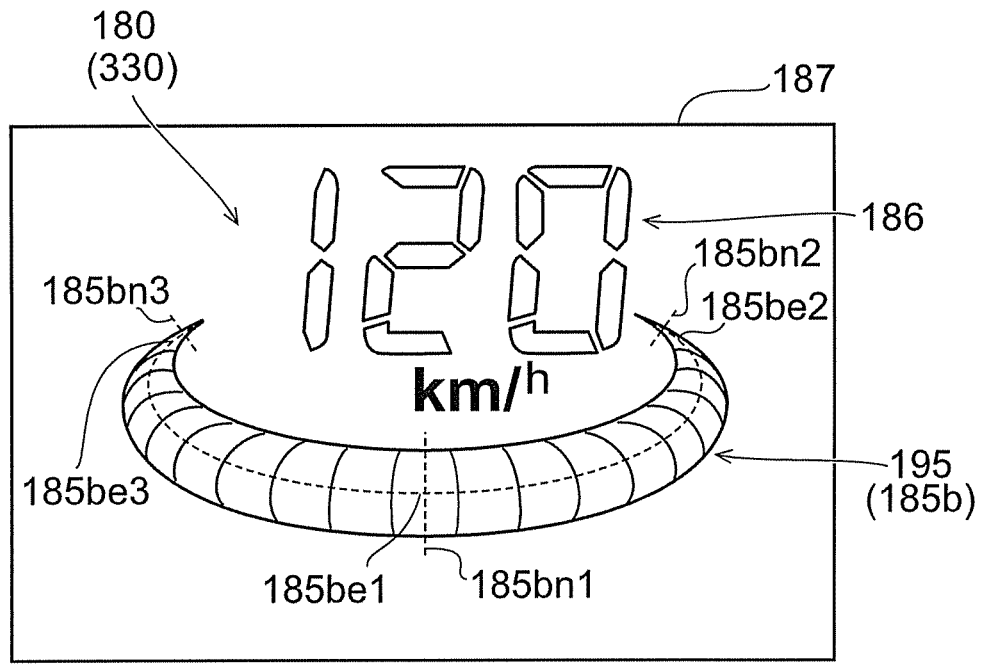

FIG. 21A and FIG. 21B are schematic views illustrating display objects for use in the display device according to the first embodiment.

Since the configuration of a display device 11 according to the embodiment can be the same as that of the display device 10, the description is omitted.

As shown in FIG. 21A and FIG. 21B, in the display device 11, a first display object 195 includes the lower part object 185b. The first display object 195 is not provided with the upper part object 185a. Also in this case, the lower part object 185b has the lower part disposed in the image 187, the upper right part disposed on the upper side of the lower part and on the right side of the lower part in the image 187, and the upper left part disposed on the upper side of the lower part and on the left side of the lower part in the image 187.

The length of the lower part 185b1 along the first normal line direction 185bn1 is longer than the length of the upper right part 185b2 along the second normal line direction 185bn2 and the length of the upper left part 185b3 along the third normal line direction 185bn3.

The length of the lower part along the vertical direction in the image 187 is longer than the length of the upper right part along the vertical direction and the length of the upper left part along the vertical direction.

As described above, by providing the lower part object 185b, the first display object 185 enables the image viewer 100 to feel the depth perception and the thickness in the height direction In FIG. 21A and FIG. 21B, although the vehicle speed is displayed as the second display object 186, it may be possible to display an item of information other than the vehicle speed as the second display object 186. For example, the following arbitrary items of information (vehicle information) can be displayed as the second display object 186: winkers; speed limits; a distance-to-empty; a high beam (lighting states); shifts (states of the transmission); a remaining quantity alert for fuel (or a battery); a parking brake alert; a tire inflation pressure alert; a door alert; an energy consumption efficiency display (an eco-display); a navigation display; units; outside air temperature; and so on.

In the specific example, it may be possible to display an item of vehicle information by the first display object 195. For example, in the case where a winker is displayed, the display state of the first display object 195 is changed. For example, in the case where a right winker is displayed, the right portion of the first display object 195 is displayed (including flashing). Alternatively, a part of the first display object 195 is displayed in such a way that a part of the first display object 195 moves from the left portion through the center portion toward the right portion. As described above, the first display object 195 can include items of vehicle information. The first display object 195 is a reference position for displaying the second display object 186, and at the same time, the first display object 195 can display vehicle information with a three-dimensional shape for the image viewer 100 clearly and three-dimensionally.

In the following, an exemplary configuration of the display unit 540 (the video projecting unit 115) of the display device 10 according to the embodiment will be described.

The configuration of the display unit 540 (the video projecting unit 115) illustrated in FIG. 2 is one of specific examples of the display device 10. As shown in FIG. 2, the video projecting unit 115 has a video light forming unit 110 and a light beam projecting unit 120.

The video light forming unit 110 has a light source 111 and a video forming unit 117, for example.

The light source 111 emits light to be a source of the light beam 112. For the light source 111, various products such as an LED (Light Emitting Diode), high pressure mercury lamp, halogen lamp, and laser can be used. An LED is used for the light source 111, so that it is possible to reduce power consumption and the weight of the device for downsizing.

For the video forming unit 117, optical switches for a liquid crystal display device (LCD) or the like can be used, for example. Image data is supplied from the image data generating unit 130 to the video forming unit 117, and the video forming unit 117 generates the light beam 112 including the display video 330 based on the image data.

In the specific example, the video light forming unit 110 further has a tapered light guide 116 provided between the light source 111 and the video forming unit 117. The divergence angle of the light emitted from the light source 111 is controlled in a certain range at the tapered light guide 116. The light passes through the video forming unit 117, and the light is then turned to be the light beam 112 including the display video 330. The divergence angle of this light beam 112 is controlled in a certain range.

The light beam projecting unit 120 reflects the light beam 112 emitted from the video light forming unit 110 in the windshield unit 710 of the vehicle 730, and projects the light beam 112 toward the image viewer 100. For the light beam projecting unit 120, various optical devices are used, which control various lenses and mirrors, and the divergence angle (the diffusion angle), for example.

In the specific example, the light beam projecting unit 120 includes a light source side lens 123, an aperture 124, an emitting side lens 125, and an emitting side mirror 126.

Along the traveling direction of the light beam 112, the light source side lens 123 is disposed between the video light forming unit 110 and the emitting side mirror 126, the aperture 124 is disposed between the light source side lens 123 and the emitting side mirror 126, and the emitting side lens 125 is disposed between the aperture 124 and the emitting side mirror 126.

In the specific example, the emitting side mirror 126 is concave, so that the video of the display video 330 included in the light beam 112 can be enlarged and projected to the image viewer 100. The emitting side mirror 126 can be movable; it is possible that the position or angle of the emitting side mirror 126 is manually or automatically adjusted as matched with the position or motion of the head 105 of the image viewer 100, for example, and the light beam 112 is appropriately projected to the one eye 101 of the image viewer 100.

With this configuration, the divergence angle of the light beam 112 is controlled, and the projection region 114 of the light beam 112 is controlled in a fixed range at the position of the image viewer 100.

Since the distance between both eyes (pupils) of the image viewer 100 ranges from 60 mm (millimeters) to 75 mm, for example, in the case where a video is viewed by the one eye 101, the size of the projection region 114 of the light beam 112 at the position of the image viewer 100 (the width in the lateral direction) is set in the range of about 60 mm to 75 mm or less, for example. The size of this projection region 114 is mainly controlled by optical devices included in the light beam projecting unit 120.

A projection position 114*a* of the light beam 112 at the position of the image viewer 100 can be controlled by changing the installation position or angle of the video projecting unit 115, for example. For example, the projection position 114*a* can be controlled by changing at least one of the installation position of the video light forming unit 110, the angle of the video light forming unit 110, the installation position of the light beam projecting unit 120, and the angle of the light beam projecting unit 120.

It is possible to variously modify and alter the configurations of the video light forming unit 110 and the light beam projecting unit 120. The arrangements of components included in the video light forming unit 110 and components included in the light beam projecting unit 120 are arbitrary. For example, it may be possible to insert the video light forming unit 110 (and components included therein) between components included in the light beam projecting unit 120.

In addition to the aforementioned specific example, it is possible to variously modify and alter the video projecting unit 115.

The configuration of the video projecting unit 115 for use in the display device 10 according to the embodiment is arbitrary. In the above description, the light beam 112 enters the one eye 101 of the image viewer 100, so that a difficulty to see caused by binocular parallax is solved, and the depth perception perceived by the image viewer 100 is enhanced. Thus, it is possible to further exert the foregoing effects according to the embodiment.

In the display device 10 according to the embodiment, it is possible to use various optical switches such as a DMD (Digital Micromirror Device) and a MEMS (Micro-electro-mechanical System) for the video forming unit 117, in addition to LCDs. A laser projector, LED projector, or the like can be used for the video light forming unit 110. In this case, a video is formed by a laser beam or light from an LED.

Second Embodiment

The image data generating device 530 (the image data generating unit 130) according to a second embodiment is an image data generating device for use in a display device for moving bodies such as the vehicle 730, for example.

The image data generating device 530 according to the embodiment generates image data of the display video 330 to be presented to the image viewer 100 on the moving body (the vehicle 730) and to be superimposed on the actual outside scene 340 in the outside of the moving body (the vehicle 730).

Figure 22:
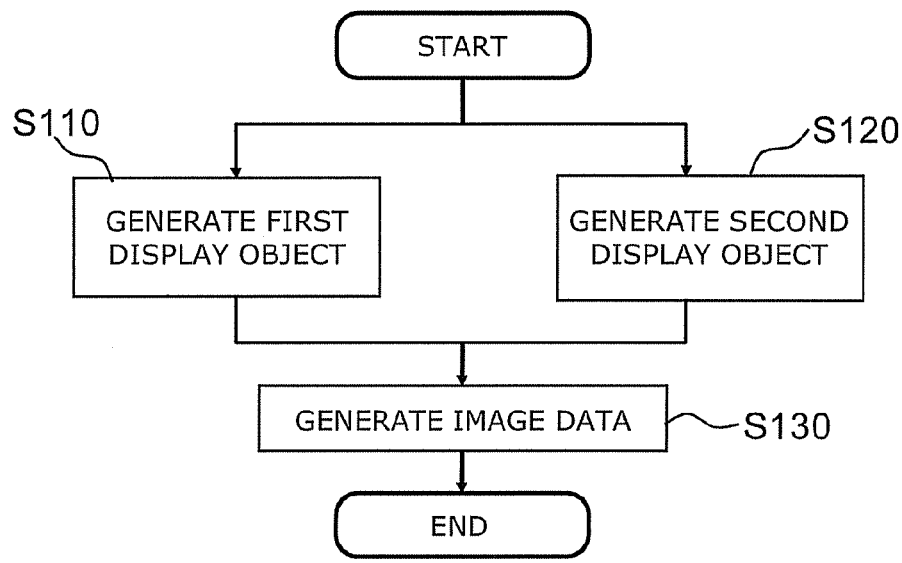
FIG. 22 is a flow chart showing the operation of an image data generating device according to a second embodiment.

FIG. 22 is a flow chart illustrating the operation of the image data generating device according to the second embodiment.

As shown in FIG. 22, the image data generating device 530 generates the first display object 185 including the lower part object 185*b* having the lower part disposed in the image 187, the upper right part disposed on the upper side of the lower part and on the right side of the lower part in the image 187, and the upper left part disposed on the upper side of the lower part and on the left side of the lower part in the image 187, in which the length of the lower part along the vertical direction in the image 187 is longer than the length of the upper right part along the vertical direction and the length of the upper left part along the vertical direction. For example, the image data generating device 530 generates the first display object 185 having the upper part object 185*a* disposed in the image 187 and the lower part object 185*b* disposed on the lower side of the upper part object 185*a* and separated from the upper part object 185*a* in the image 187 (Step S110).

The image data generating device 530 generates the second display object 186 disposed in the image 187 with reference to the display position of the first display object 185 in the image 187, the second display object 186 including information (moving body information and vehicle information) on the moving body (the vehicle 730) (Step S120). For example, the second display object 186 has a portion on the upper side of the first display object 185 in the image 187.

The image data generating device 530 generates image data based on the first display object 185 and the second display object 186 (Step S130).

Thus, it is possible to generate image data for use in a display device for moving bodies that enables the display in which an unpleasant sensation is reduced.

It is noted that at least a part of the process included in the aforementioned Step S110, at least a part of the process included in Step S120, and at least a part of the process included in Step S130 can be implemented at the same time in a technically feasible range. The order of at least a part of the process included in the aforementioned Step S110, at least a part of the process included in Step S120, and at least a part of the process included in Step S130 can be exchanged in a technically feasible range. The aforementioned steps can be repeatedly executed.

For the image data generating device 530, an electronic circuit including a semiconductor integrated circuit or the like is used, for example. For the image data generating device 530, a semiconductor chip for arithmetic processing is used, for example. The image data generating device 530 can include a memory that stores data. The image data generating device 530 can include a printed wiring board including a plurality of semiconductor chips.

In the following, an exemplary configuration and operation of the image data generating device 530 will be described.

Figure 23:
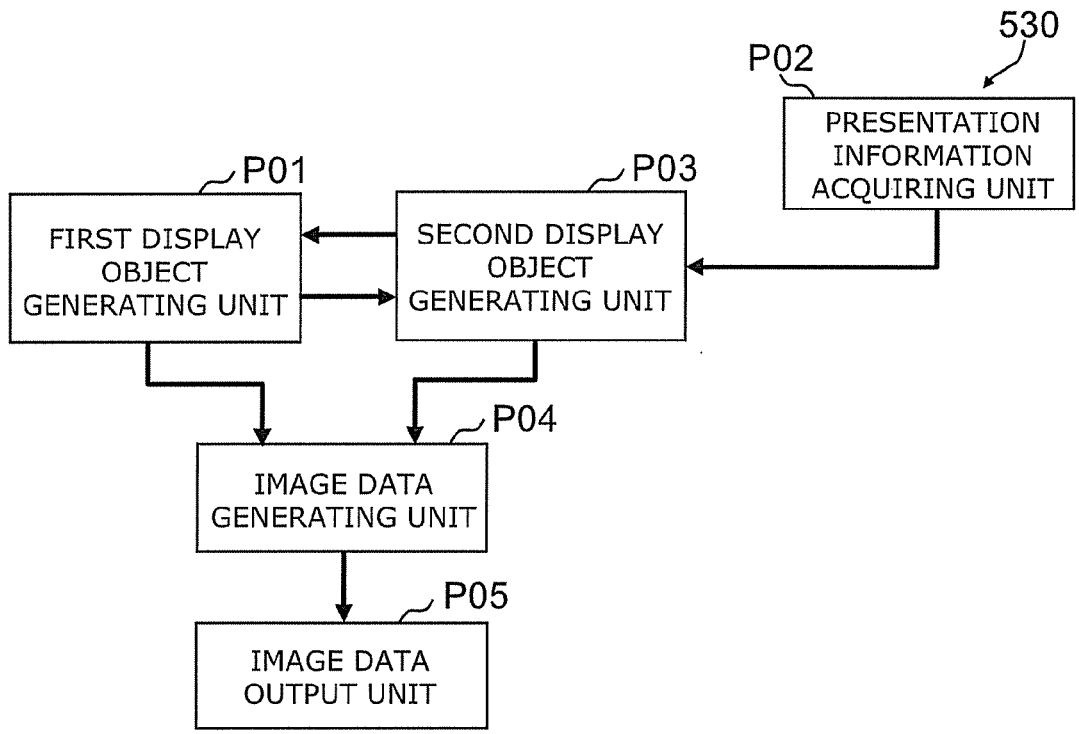
FIG. 23 is a schematic view showing the configuration of the image data generating device according to the second embodiment.

FIG. 23 is a schematic view illustrating the configuration of the image data generating device according to the second embodiment. As shown in FIG. 23, the image data generating device 530 according to the embodiment includes a first display object generating unit P01, a second display object generating unit P03, a presentation information acquiring unit P02, an image data generating unit P04, and an image data output unit P05.

The first display object generating unit P01, the second display object generating unit P03, the presentation information acquiring unit P02, the image data generating unit P04, and the image data output unit P05 correspond to processes performed in the image data generating device 530. The same portion in the image data generating device 530 may perform a plurality of processes, whereas different portions in the image data generating device 530 may perform one of a plurality of processes.

The first display object generating unit P01 generates the first display object 185 that is a base for presenting information.

The presentation information acquiring unit P02 acquires an item of information that is a target for presentation. The item of information that is a target for presentation can include at least vehicle information.

The second display object generating unit P03 forms an object of the information acquired at the presentation information acquiring unit P02, and generates the second display object 186 based on the conditions including at least one of the shape, color, size, and orientation of the first display object 185 generated by the first display object generating unit P01.

The image data generating unit P04 disposes the second display object 186 generated by the second display object generating unit P03 in the image 187 with reference to the position of the first display object 185 in the image 187, the first display object 185 being generated by the first display object generating unit P01, and synthesizes the first display object 185 and the second display object 186 for generating image data.

The image data output unit P05 outputs the image data generated by the image data generating unit P04.

A hemispherical object, for example, is used in the first display object generating unit P01. This object is disposed in the direction in which the cross section of the sphere faces the upper side, and the first display object 185 is generated. The size of the first display object 185 is adjusted in consideration of the size of information presentation media (including at least one of the video forming unit 117, for example, and the windshield unit 710 such as the reflector 711 provided on the windshield of the vehicle 730, for example) and the size of information to be presented, for example.

As already described, the first display object 185 generated by the first display object generating unit P01 is not limited to a hemispherical object. Objects such as a cylinder, cone, circular truncated cone, elliptic cylinder, elliptic cone, elliptic truncated cone, prism, polygonal pyramid, and polygonal truncated pyramid can be adopted as the shape of the first display object 185.

The first display object 185 is determined in consideration of the harmony coefficient $E_t$, for example, already described. The harmony coefficient $E_t$ includes coefficients, the perspective harmony coefficient $E_p$ and the angle harmony coefficient $E_a$.

In the above description, the case is described where the angle harmony coefficient $E_a$ is an angle on the depression angle. The angle in the angle harmony coefficient $E_a$ may be an angle in an arbitrary direction other than the depression angle.

For example, the angle harmony coefficient $E_a$ can be a parameter to express robustness against a shift in the roll angle of the first display object 185. The angle harmony coefficient $E_a$ can also be a parameter to express robustness against a shift in the pitch angle of the first display object 185. The angle harmony coefficient $E_a$ can also be a parameter to express robustness against a shift in the yaw angle of the first display object 185. In the case where the angle harmony coefficient on the rotations of these angles is used as a parameter, independent terms on the rotations of these angles are introduced in the third equation on the angle harmony coefficient $E_a$ as already described.

For example, it is possible to provide a harmony coefficient for the size of the first display object 185 with respect to the actual outside scene. For example, it is possible to provide a harmony coefficient for the angle of the first display object 185 with respect to the eye point position of the user (the image viewer 100).

It is possible to reflect the harmony coefficients on these various characteristics in the calculation of the harmony coefficient $E_t$ as independent terms.

It may be possible to modify the shape of the first display object 185 while maintaining the characteristics of the harmony coefficient $E_t$.

It may be possible to change at least one of the shape, color, size, and orientation of the first display object 185 based on the conditions including at least one of the type, number, and size of the second display object 186. Thus, it is possible to generate a more suited first display object 185 depending on the content of presentation information.

The first display object generating unit P01 presets an image to be the first display object 185 depending on the parameters including the harmony coefficient $E_t$, and modifies the image according to the conditions including at least one of the set shape, color, size, and orientation, so that the first display object generating unit P01 can generate the first display object 185.

The presentation information acquiring unit P02 acquires an item of information that is a target for presentation.

For example, the presentation information acquiring unit P02 acquires an item of information to be presented to the image viewer 100 from the information acquiring unit 520, for example, described referring to FIG. 2.

The item of information acquired at the presentation information acquiring unit P02 includes at least one of a vehicle speed, an average velocity, an engine RPM, a motor RPM, energy consumption efficiency, operating states of direction indicators (turning on, off, or the like of a winker, for example), lighting states (turning on, off, or the like of a high beam, for example), various warnings, states of the transmission (an up shift, down sift, or the like, for example), instantaneous fuel consumption, average fuel consumption, a fuel remaining quantity (a gasoline remaining quantity, for example), a battery remaining quantity, a distance-to-empty, continuous driving hours, a continuous distance covered, navigation, and the orientation of the traveling direction of the vehicle 730, for example.

The presentation information acquiring unit P02 can also acquire information to be presented in the state in which attribute information to show the type of information to be presented is provided. The attribute information includes information on the display form of the presentation information (which the second display object 186 is used for presenting presentation information). The attribute information includes information on the combination of items of the presentation information for presentation (the combination of items of information presented together among items of the presentation information).

The display form of the presentation information includes an object to present the correct meanings of items of information using numerals, characters, three-dimensional objects, and so on (the first type object 186a, for example), an object to present quantitative information using a meter, an indicator, and the like (the second type object 186b, for example), and an object to present information by acting on the sensation of the image viewer 100 using the shape, color, and motion of a three-dimensional object, or the like (the third type object 186c, for example), for instance. For example, the attribute information includes information for selecting presentation information as an object of one of the first type object 186a, the second type object 186b, the third type object 186C, and the fourth type object 186d.

The information on the combination of items of the presenting presentation information includes information on an event that the vehicle speed, the engine RPM, and the energy saving display are displayed at the same time, an event that the average fuel consumption and the average velocity are displayed at the same time, an event that the continuous driving hours and the continuous distance covered are displayed at the same time, an event that all the displays of individual warning lights are displayed at the same time, and so on, for example.

The presentation information and the attribute information provided for the presentation information are acquired to determine how to present which items of information.

For example, in the case where the vehicle speed is presented as a numeral object, the second display object generating unit P03 generates a numeral object corresponding to the numeric value data of the vehicle speed. For example, in the case where the engine RPM is presented as an indicator, the second display object generating unit P03 generates an indicator-like object corresponding to the numeric value data of the engine RPM. For example, in the case where the fuel remaining quantity is presented as a three-dimensional object and an indicator, the second display object generating unit P03 generates a three-dimensional object that can show a fuel remaining quantity at a glance and an indicator-like object that is matched with the numeric value data of the fuel remaining quantity. For example, in the case where the energy saving display is presented as an object to act on the sensation of the image viewer 100, the second display object generating unit P03 generates an object showing driving energy consumption efficiency by changing at least one of the shape, color, and motion of a three-dimensional object in a small sphere, or the like.

The generation of the second display object 186 as described above may be performed by a predetermined method, or may be performed by a method based on the attribute information of the presentation information acquired at the presentation information acquiring unit P02.

A more suited second display object 186 is generated according to the attributes of the presentation information, so that it is possible to present information in which an unpleasant sensation is further reduced.

In the second display object generating unit P03, the conditions including at least one of the shape, color, size, and orientation of the second display object 186 can be changed based on the conditions including at least one of the shape, color, size, and orientation of the first display object 185. For example, in the case where the first display object 185 is a hemispherical object and an indicator is presented as the second display object 186 on the cross section of a sphere, the second display object 186 is generated, in which the size of the indicator is adjusted as matched with the size of the first display object 185. If the shape of the cross section of the first display object 185 is elliptic, the shape of the indicator is adjusted as matched with the elliptic shape for generating the second display object 186. For example, in the case where the second display object 186 is an object of small spheres as illustrated for the third type object 186c, the number and size of small spheres and the track of the motion are adjusted depending on the shape and size of the first display object 185.

In the case where the color of the second display object 186 is a color similar to that of the first display object 185, the second display object 186 does not sometimes attract attention. The color of the second display object 186 is adjusted based on the color of the first display object 185.

The second display object generating unit P03 forms an object of the presentation information acquired at the presentation information acquiring unit P02, and makes the object to be presented.

The image data generating unit P04 specifies the region of disposing components included in the second display object 186 for each type of the second display object 186, for example. For example, the image data generating unit P04 specifies the region of the first type object 186a, the region of the second type object 186b, the region of the third type object 186c, and the region of the fourth type object 186d already described.

For example, in the case where the first display object 185 is a hemispherical object, the region of the first type object 186a is the upper part of a hemisphere to be the cross sectional portion of a sphere, for example, in the virtual space VS. In the region of the first type object 186a, an object corresponding to the correct meanings of items of information is presented using numerals, characters, three-dimensional objects, and so on, for example. In the virtual space VS, the region of the second type object 186b is the region around the cross sectional portion of a sphere, for example. In the region of the second type object 186b, an object corresponding to quantitative information is presented using a ring-shaped meter, indicator, and the like, for example. In the virtual space VS, the region of the third type object 186c is the peripheral portion of a hemisphere, for example. In the region of the third type object 186c, an object to act on the sensation of the image viewer 100 is presented using the shape, color, and motion of a three-dimensional object, or the like, for example. In the virtual space VS, the region of the fourth type object 186d is the region of the side surface of the cross sectional portion of a sphere on the image viewer 100 side, for example. In the region of the fourth type object 186d, an arbitrary item of information is presented, for example.

The individual items of information presented using the first type object 186a, the second type object 186b, and the third type object 186c are arbitrary, and can be changed according to presentation patterns (operation modes, for example).

For example, in a first presentation pattern, the first type object 186a expresses the velocity of the vehicle 730, the second type object 186b expresses the engine RPM of the vehicle 730, and the third type object 186c expresses the driving conditions of the vehicle 730 (for example, the driving conditions from a viewpoint of energy consumption efficiency).

For example, in a second presentation pattern, the first type object 186a expresses the operating, states of the direction indicators of the vehicle 730, the second type object 186b expresses the engine RPM of the vehicle 730, and the third type object 186c expresses the driving conditions of the vehicle 730 (for example, the driving conditions from a viewpoint of energy consumption efficiency).

For example, in a third presentation pattern, the first type object 186a expresses the velocity of the vehicle 730, the second type object 186b expresses the engine RPM and the operating states of lighting of the vehicle 730 (a high beam, low beam, or the like), and the third type object 186c expresses the driving conditions of the vehicle 730 (for example, the driving conditions from a viewpoint of energy consumption efficiency).

For example, in a fourth presentation pattern, the first type object 186a expresses the velocity and warnings of the vehicle 730, the second type object 186b expresses the engine RPM of the vehicle 730, and the third type object 186c expresses the driving conditions of the vehicle 730 (for example, the driving conditions from a viewpoint of energy consumption efficiency).

For example, in a fifth presentation pattern, the first type object 186a expresses the operating state of the transmission of the vehicle 730 (including an up shift, down sift, or the like, for example), the second type object 186b expresses the engine RPM of the vehicle 730, and the third type object 186c expresses the driving conditions of the vehicle 730 (for example, the driving conditions from a viewpoint of energy consumption efficiency).

For example, in a sixth presentation pattern, the first type object 186a expresses the distance-to-empty of the vehicle 730, the second type object 186b expresses the distance-to-empty indicator of the vehicle 730, and the third type object 186c expresses the multistep alarm of the vehicle 730.

For example, in a seventh presentation pattern, the first type object 186a expresses the indoor temperature of the vehicle 730, the second type object 186b expresses the indoor temperature indicator of the vehicle 730, and the third type object 186c expresses the multistep representation of temperature of the vehicle 730.

For example, in an eighth presentation pattern, the first type object 186a expresses the average fuel consumption and average vehicle speed of the vehicle 730, and the third type object 186c expresses the driving conditions of the vehicle 730 (for example, the driving conditions from a viewpoint of energy consumption efficiency). It is noted that the second type object 186b is not used in this case.

For example, in a ninth presentation pattern, the first type object 186a expresses the continuous traveling hours and continuous distance covered of the vehicle 730, and the third type object 186c expresses the multistep representation of the traveling amount of the vehicle 730. It is noted that the second type object 186b is not used in this case.

For example, in a tenth presentation pattern, the first type object 186a expresses various displays on the manipulation of the vehicle 730 (auto mobile icons), and the second type object 186b expresses various warning lights of the vehicle 730. It is noted that the third type object 186c is not used in this case.

For example, in an eleventh presentation pattern, the second type object 186b expresses a clock. In this case, the first type object 186a and the third type object 186c are not used.

For example, in a twelfth presentation pattern, the second type object 186b expresses the orientation of a magnetic needle. In this case, the first type object 186a and the third type object 186c are not used.

For the first type object 186a, it is possible to use not only the individual numerals, characters, and three-dimensional objects alone but also the combination of a plurality of objects. For example, in the aforementioned seventh presentation pattern, a numeral object showing the indoor temperature and a three-dimensional object that can show the indoor temperature at a glance can be presented together for the first type object 186a.

The second type object 186b can include other objects in addition to meters and indicators. For example, in the third presentation pattern already described, for the second type object 186b, the engine RPM can be displayed using an indicator, and an object can be presented which has the effect to brighten the circumference of the cross section of a sphere according to the ON or OFF state of the high beam. The brightened object is generated by the second display object generating unit P03, for example. In the tenth presentation pattern already described, an animation display can be performed in which various warning lights are arranged in a ring shape and these warning lights are rotated.

The third type object 186c displays an energy saving display (a display on energy consumption efficiency), for example, by a method of acting on the sensation of the image viewer 100. The third type object 186c may further perform various displays. For example, in the sixth presentation pattern already described, the third type object 186c can include the multistep alarm corresponding to the length of the distance-to-empty. For example, in the seventh presentation pattern already described, the third type object 186c can include the multistep representation on temperature. In these cases, the third type object 186c can display information by a method of acting on the sensation of the image viewer 100.

The image data generating unit P04 generates image data to present by synthesizing the first display object 185 generated by the first display object generating unit P01 and the second display object 186 generated by the second display object generating unit P03.

The image data output unit P05 outputs the image data generated by the image data generating unit P04 as data in each unit time, for example. For example, in the case where items of information are presented at a frame rate of 30 fps (frames per second), the image data output unit P05 outputs image data at every 1/30 seconds. The image data can be reproduced based on the animation generated by the image data generating unit P04, while the image data is smoothly changed. The output state and non-output state of data in the image data output unit P05 can also be switched by overall system control.

According to the image data generating device 530, it is possible to generate image data for use in a display device for moving bodies that enables the display in which an unpleasant sensation is reduced. It is possible to implement information presentation with a reduced unpleasant sensation in which the user rarely senses a shift between the display video 330 and the actual outside scene 340, for example.

Figure 24A:
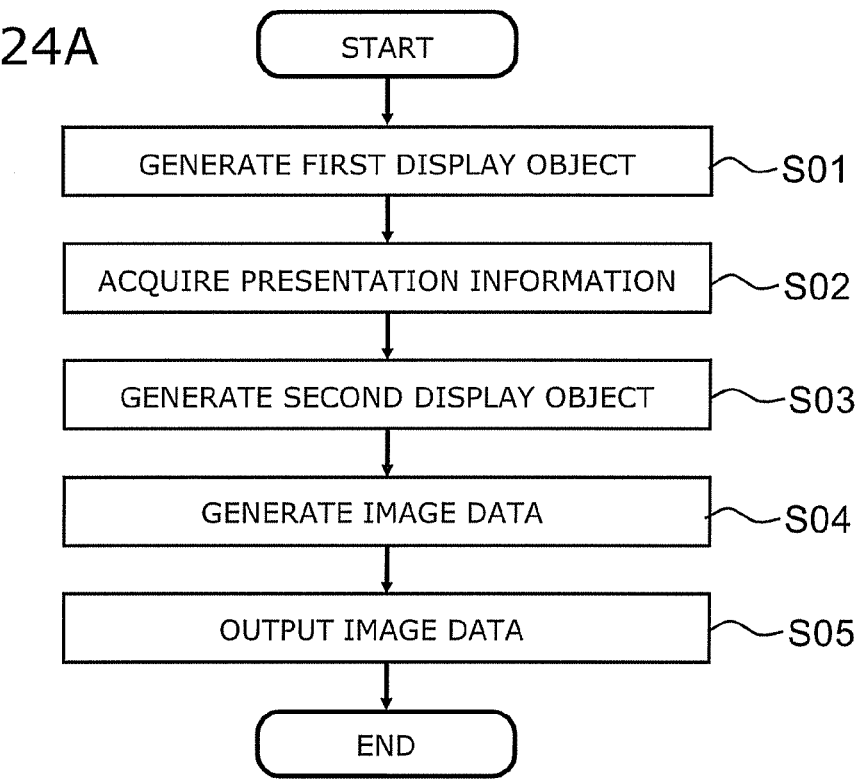
FIG. 24A and FIG. 24B are flow charts showing the operation of the image data generating device according to the second embodiment.
Figure 24B:
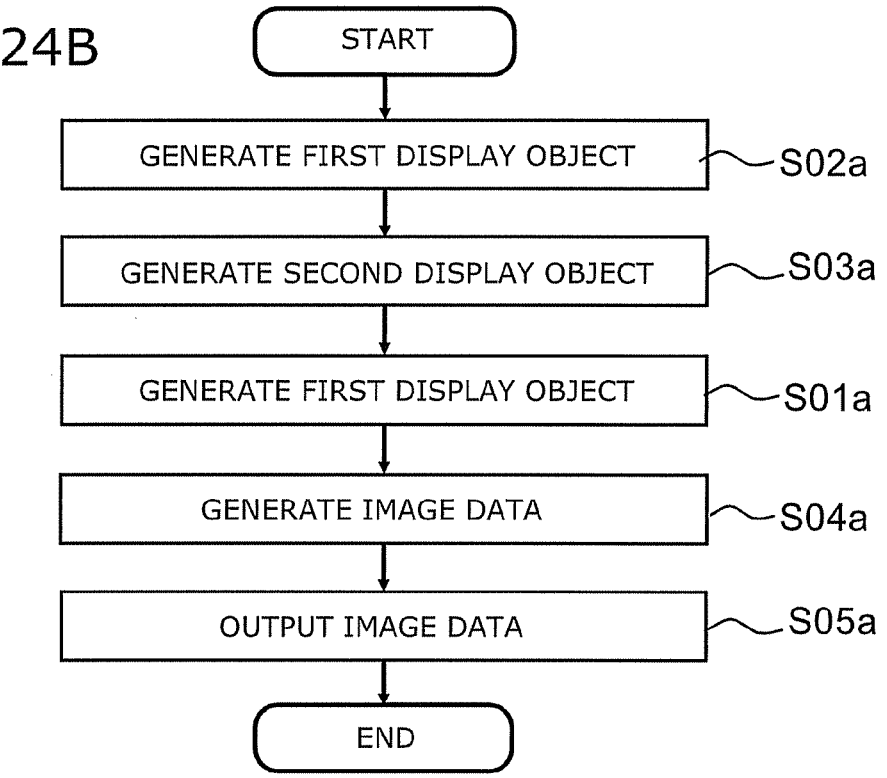

FIG. 24A and FIG. 24B are flow charts illustrating the operation of the image data generating device according to the second embodiment.

As shown in FIG. 24A, a first display object is generated (Step S01). This process is executed at the first display object generating unit P01, for example. The first display object 185 that is a base for presenting information is generated.

An item of presentation information is acquired (Step S02). This process is executed at the presentation information acquiring unit P02, for example. The item of information that is a target for presentation is acquired.

A second display object 186 is generated (Step S03). This process is executed at the second display object generating unit P03, for example. Based on the conditions including at least one of the shape, color, size, and orientation of the first display object 185 generated by the first display object generating unit P01, an object of the presentation information acquired at the presentation information acquiring unit P02 is formed, and the second display object 186 is generated.

Image data is generated (Step S04). This process is executed at the image data generating unit P04, for example. The second display object 186 generated by the second display object generating unit P03 is disposed with respect to the first display object 185 generated by the first display object generating unit P01, and the first display object 185 and the second display object 186 are synthesized for generating the image data.

The image data is outputted (Step S05). This process is executed at the image data output unit P05, for example. The image data generated by the image data generating unit P04 is outputted.

These processes are performed to implement information presentation with a reduced unpleasant sensation in which the user rarely senses a shift between the image data and the actual outside scene.

It is noted that the aforementioned Step S01 to Step S05 can be implemented at the same time in a technically feasible range. The order of the aforementioned Step S01 to Step S05 can be exchanged in a technically feasible range. The aforementioned steps can be repeatedly executed.

For example, as shown in FIG. 24B, it may be possible that an item of presentation information is acquired (Step S02a), after a second display object 186 is generated (Step S03a), a first display object is generated (Step S01a), image data is generated (Step S04a), and the image data is outputted (Step S05a).

In the image data generating device 530 according to the embodiment, for example, as the first display object 185 that is a base for presenting information, the first display object 185 is provided, which is robust against a change in at least one of the conditions of the user, the vehicle 730, and the outside, and information is presented using the second display object 186 disposed based on the position of the first display object 185.

For example, at least one of the shape, color, size, and orientation of the first display object 185 is determined based on the harmony coefficient Et on at least one of the angle and the perspective between the first display object 185 and the actual outside scene 340. As the first display object 185, an object is adopted which is a hemispherical object and disposed in the direction as the cross section faces the upper side, for example.

The second display object 186 that is an object of presentation information is disposed at a relative position with respect to the first display object 185, and the second display object 186 is presented. For example, in the case where the first display object 185 is hemispherical, quantitative information is presented on the upper part of a hemisphere as the second display object 186, and qualitative information is presented on the peripheral portion of the hemisphere. The second display object 186 can include a plurality of types of objects for each region, for example, in order to easily identify the type of information.

Figure 25:
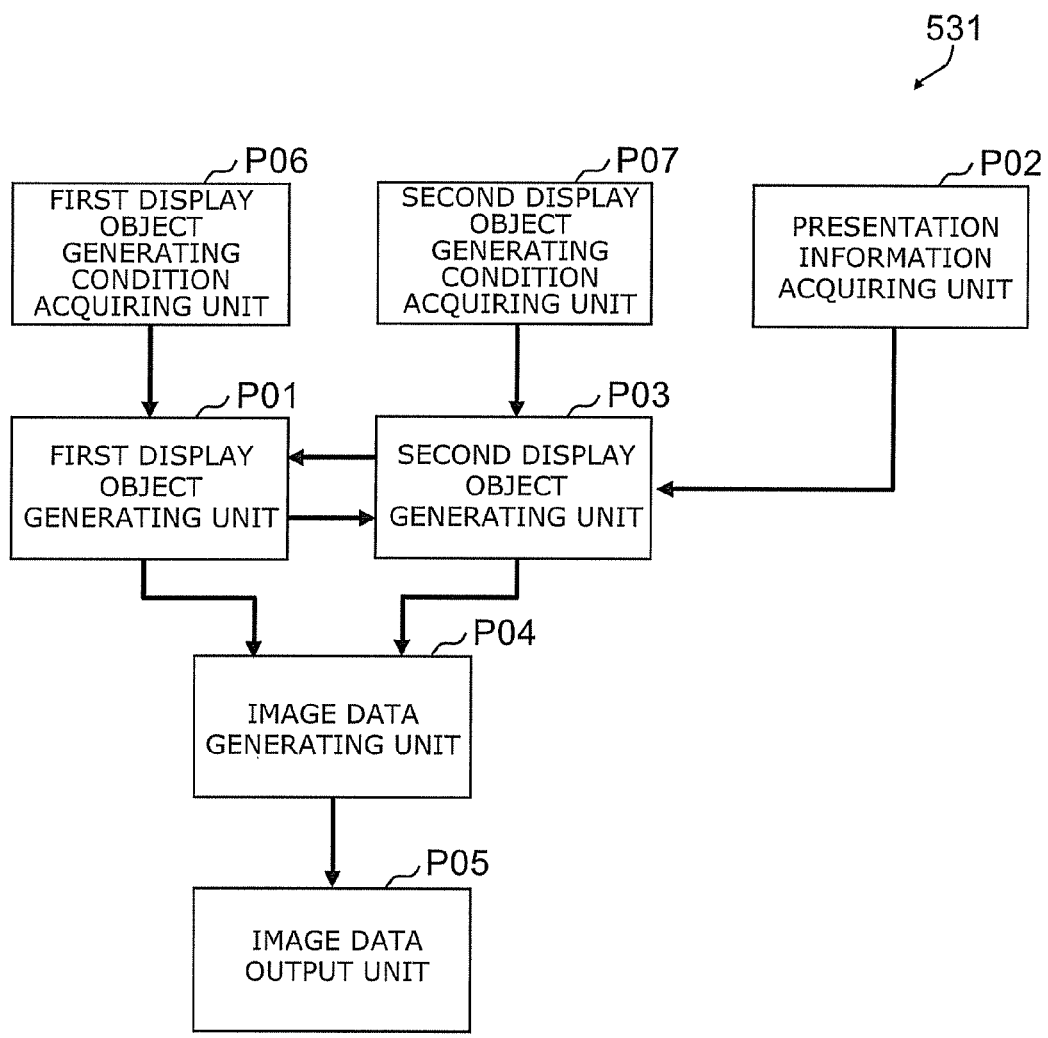
FIG. 25 is a schematic view showing the configuration of another image data generating device according to the second embodiment.

FIG. 25 is a schematic view illustrating the configuration of another image data generating device according to the second embodiment.

As shown in FIG. 25, an image data generating device 531 according to the embodiment further includes a first display object generating condition acquiring unit P06 and a second display object generating condition acquiring unit P07, in addition to the first display object generating unit P01, the second display object generating unit P03, the presentation information acquiring unit P02, the image data generating unit P04, and the image data output unit P05 already described.

The first display object generating unit P01, the second display object generating unit P03, the presentation information acquiring unit P02, the image data generating unit P04, the image data output unit P05, the first display object generating condition acquiring unit P06, and the second display object generating condition acquiring unit P07 correspond to processes performed at the image data generating device 531. The same portion in the image data generating device 531 may perform a plurality of processes, whereas different portions in the image data generating device 531 may perform one of a plurality of processes.

The first display object generating condition acquiring unit P06 acquires the conditions of generating the first display object 185 that is a base for presenting information.

For example, at least one of the user and the system (the display device 10) specifies at least one of the conditions including at least one of the shape, color, size, and orientation of the first display object 185 and the conditions of the harmony coefficient Et, and the first display object generating condition acquiring unit P06 acquires the specified conditions.

For example, in the case where the conditions of the harmony coefficient Et are specified, the graphic shape of the first display object 185 is derived from the specified harmony coefficient Et according to the characteristics or the like shown in FIG. 8 and FIG. 9 for converting the conditions into conditions for the shape.

As described above, the first display object generating condition acquiring unit P06 acquires the conditions of generating the first display object 185.

The first display object generating unit P01 generates the first display object 185 that is a base for presenting information based on the conditions of generating the first display object 185 acquired at the first display object generating condition acquiring unit P06.

In the image data generating device 530 described referring to FIG. 23, FIG. 24A, and FIG. 24B, the first display object generating unit P01 generates the first display object 185 based on the conditions including at least one of the preset shape, color, size, and orientation, whereas in the image data generating device 531, the first display object 185 is generated based on the first display object generating conditions acquired at the first display object generating condition acquiring unit P06.

By providing the first display object generating condition acquiring unit P06, the first display object 185 can be generated based on the conditions of generating the first display object 185 acquired at the first display object generating condition acquiring unit P06, and dynamic control of the first display object 185 can be performed including the changing or the like of the first display object 185 by the user or system.

The second display object generating condition acquiring unit P07 acquires the conditions of forming an object of the presentation information acquired at the presentation information acquiring unit P02.

For example, at least one of the user and the system specifies whether the second display object 186 is generated depending on attribute information provided for the presentation information. At least one of the user and the system specifies the conditions of generating the second display object 186 for presentation information, which is not provided with attribute information. The second display object generating condition acquiring unit P07 acquires the conditions of generating the second display object 186.

The second display object generating condition acquiring unit P07 can also specify a specific second display object generating condition for specific presentation information. Namely, in the case where information (for example, attribute information) to be attached to presentation information is not provided for this presentation information, the second display object generating condition acquiring unit P07 can also externally provide information not attached to this presentation information to this presentation information.

The second display object generating unit P03 forms an object of the presentation information acquired at the presentation information acquiring unit P02 based on at least one of the conditions including at least one of the shape, color, size, and orientation of the first display object 185 generated by the first display object generating unit P01, and the second display object generating conditions acquired at the second display object generating condition acquiring unit P07 for generating the second display object 186.

In the image data generating device 530, the second display object generating unit P03 generates the second display object 186 based on at least one of the preset second display object generating conditions, attribute information provided for presentation information, and the conditions including at least one of the shape, color, size, and orientation of the first display object 185, whereas in the image data generating device 531, the second display object generating unit P03 generates the second display object 186 based on at least one of the preset second display object generating conditions, attribute information provided for presentation information, the conditions including at least one of the shape, color, size, and orientation of the first display object 185, and the second display object generating conditions acquired at the second display object generating condition acquiring unit P07.

The second display object 186 is generated as described above, so that dynamic control of the second display object 186 can be performed including the changing of the second display object 186 by the user or system.

Figure 26:
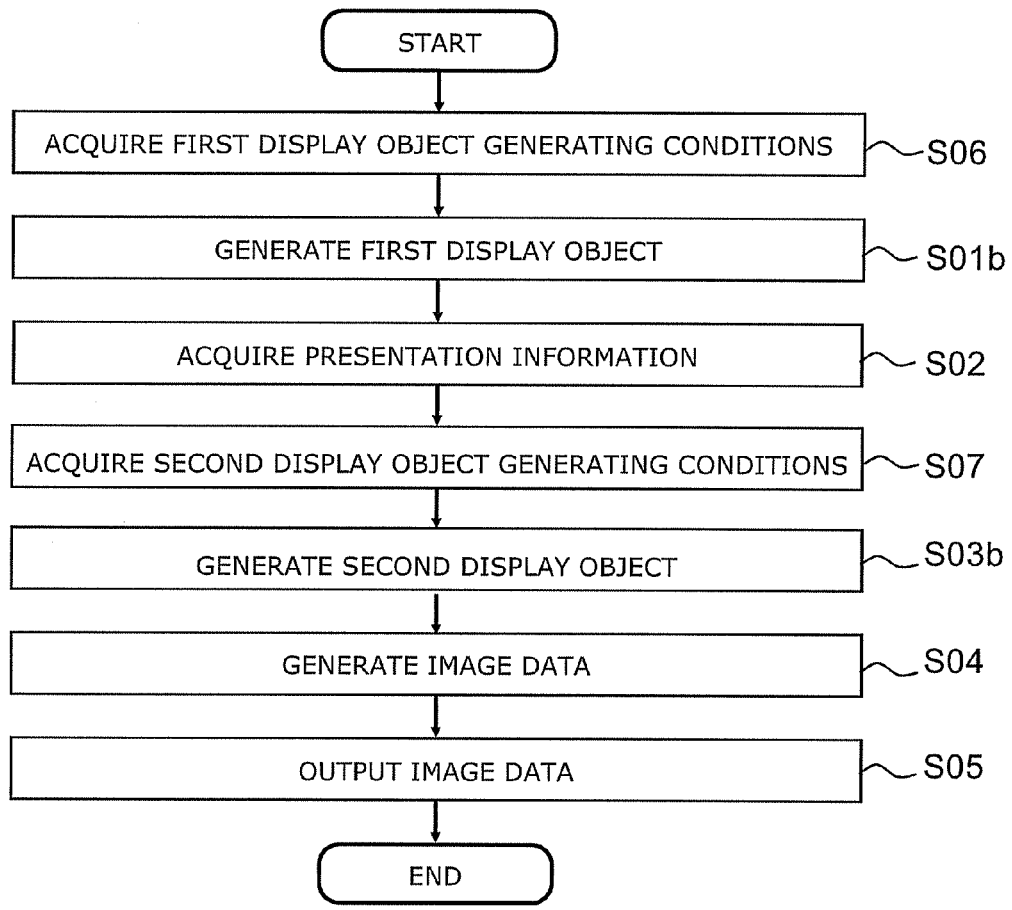
FIG. 26 is a flow chart showing the operation of another image data generating device according to the second embodiment.

FIG. 26 is a flow chart illustrating the operation of another image data generating device according to the second embodiment.

As shown in FIG. 26, first display object generating conditions are acquired (Step S06). This process is executed at the first display object generating condition acquiring unit P06, for example. The conditions of generating the first display object 185 that is a base for presenting information are acquired.

A first display object 185 is generated (Step S01b). This process is executed at the first display object generating unit P01, for example. The first display object 185 that is a base for presenting information is generated based on the first display object generating conditions acquired at the first display object generating condition acquiring unit P06.

An item of presentation information is acquired (Step S02).

Second display object generating conditions are acquired (Step S07). This process is executed at the second display object generating condition acquiring unit P07, for example. The conditions of forming an object of the presentation information acquired at the presentation information acquiring unit P02 are acquired.

A second display object 186 is generated (Step S03b). This process is executed at the second display object generating unit P03, for example. An object of the presentation information acquired at the presentation information acquiring unit P02 is formed based on the conditions including at least one of the shape, color, size, and orientation of the first display object 185 generated by the first display object generating unit P01, and the second display object generating conditions acquired at the second display object generating condition acquiring unit P07, and the second display object 186 is generated.

Image data is generated (Step S04). The image data is outputted (Step S05). These processes are performed, so that it is possible that the user or system more appropriately specifies the conditions of generating the first display object 185 and the second display object 186, and it is possible to implement information presentation that an unpleasant sensation is further reduced.

The aforementioned individual steps can be implemented at the same time in a technically feasible range. The order of the aforementioned individual steps can be exchanged in a technically feasible range. The aforementioned steps can be repeatedly executed.

Figure 27:
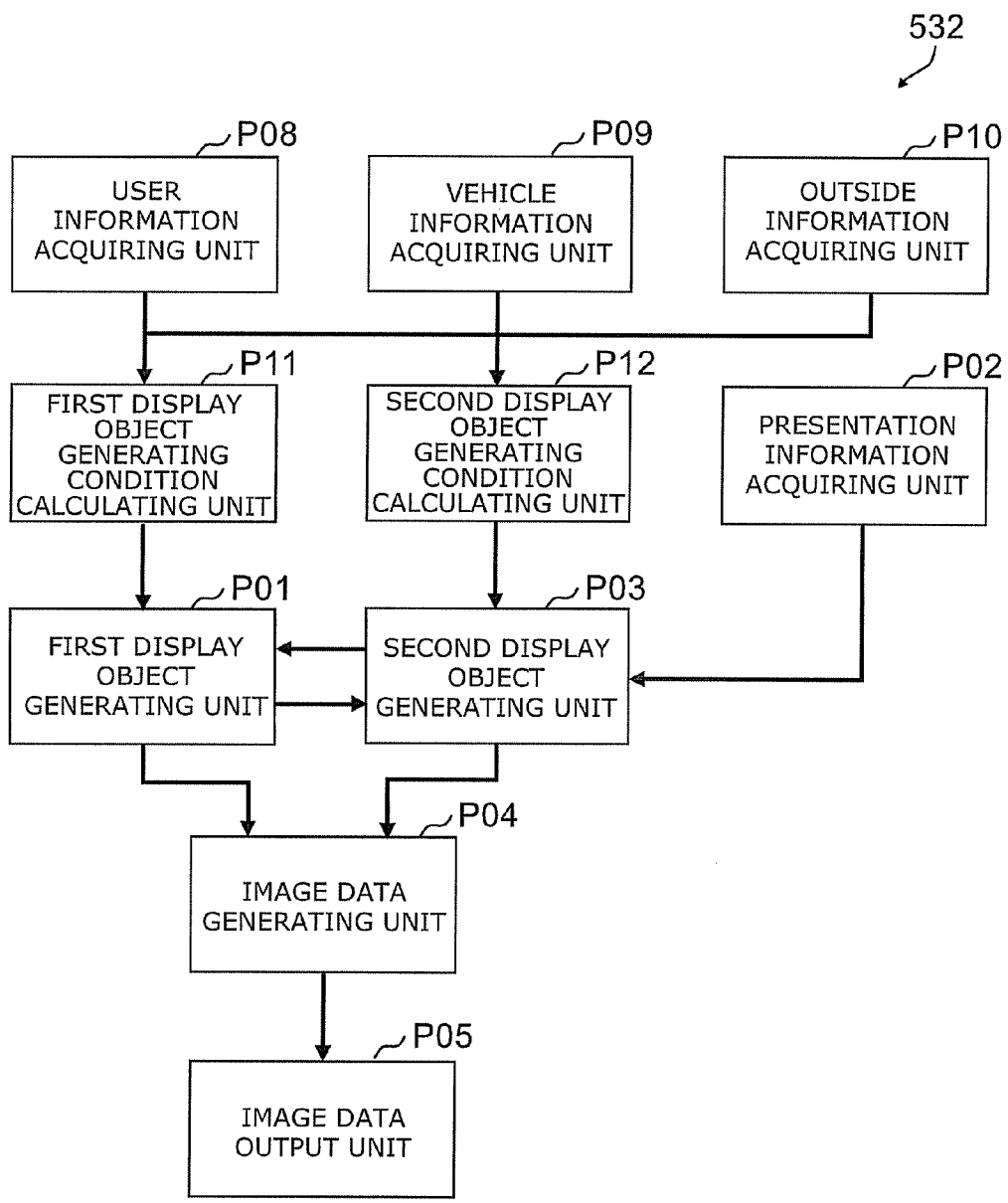
FIG. 27 is a schematic view showing the configuration of another image data generating device according to the second embodiment.

FIG. 27 is a schematic view illustrating the configuration of still another image data generating device according to the second embodiment.

As shown in FIG. 27, an image data generating device 532 according to the embodiment further includes a viewer information acquiring unit (a user information acquiring unit P08), a moving body information acquiring unit (a vehicle information acquiring unit P09), an outside information acquiring unit P10, a first display object generating condition calculating unit P11, and a second display object generating condition calculating unit P12, in addition to the first display object generating unit P01, the second display object generating unit P03, the presentation information acquiring unit P02, the image data generating unit P04, and the image data output unit P05 already described.

The first display object generating unit P01, the second display object generating unit P03, the presentation information acquiring unit P02, the image data generating unit P04, the image data output unit P05, the user information acquiring unit P08, the vehicle information acquiring unit P09, the outside information acquiring unit P10, the first display object generating condition calculating unit P11, and the second display object generating condition calculating unit P12 correspond to processes performed at the image data generating device 532. The same portion in the image data generating device 532 may perform a plurality of processes, whereas different portions in the image data generating device 532 may perform one of a plurality of processes.

The user information acquiring unit P08 acquires an item of information (user information) on the user including at least one of the height, sitting height, eye point position, direction of the line of sight, and eyesight of the user.

The user information acquiring unit P08 acquires an item of user information from the information acquiring unit 520, for example, described referring to FIG. 3. The user information acquiring unit P08 acquires an item of user information using user information built in the system beforehand, for example. The user information acquiring unit P08 acquires an item of user information by the user directly inputting user information to the system, for example. The user information acquiring unit P08 acquires an item of user information based on data detected using a sensor or the like.

The vehicle information acquiring unit P09 acquires an item of information on the vehicle 730 (vehicle information) including at least one of a vehicle speed, an average velocity, an engine RPM, a motor RPM, energy consumption efficiency, operating states of direction indicators (turning on, off, or the like of a winker, for example), lighting states (turning on, off, or the like of a high beam, for example), various warnings, states of the transmission (an up shift, down sift, or the like, for example), instantaneous fuel consumption, average fuel consumption, a fuel remaining quantity, a battery remaining quantity, a distance-to-empty, continuous driving hours, a continuous distance covered, navigation, and the orientation of the traveling direction.

The vehicle information acquiring unit P09 acquires an item of vehicle information from the information acquiring unit 520, for example. The vehicle information acquiring unit P09 acquires an item of vehicle information from an information communication system constructed in the vehicle 730, for example. The vehicle information acquiring unit P09 acquires an item of vehicle information in real time, for example.

The outside information acquiring unit P10 acquires an item of information on the outside of the vehicle 730 (outside information) including at least one of weather, temperature, brightness, the color and shape of the forward road, the presence or absence of vehicles therearound, and the distance between the own car (the vehicle 730) and other vehicles.

The outside information acquiring unit P10 acquires an item of outside information from the information acquiring unit 520, for example. The outside information acquiring unit P10 acquires an item of outside information including at least one item of information obtained from a camera and a sensor, GPS (Global Positioning System) information, information obtained from map information, information obtained from measuring instruments such as a thermometer and an illuminometer, and information obtained from Internet communications, for example.

The first display object generating condition calculating unit P11 calculates the conditions of generating the first display object 185 that is a base for presenting information based on at least one of items of information including the user information acquired at the user information acquiring unit P08, the vehicle information acquired at the vehicle information acquiring unit P09, and the outside information acquired at the outside information acquiring unit P10.

The second display object generating condition calculating unit P12 calculates the conditions of forming an object of the presentation information acquired at the presentation information acquiring unit P02 based on at least one of items of information including the user information acquired at the user information acquiring unit P08, the vehicle information acquired at the vehicle information acquiring unit P09, and the outside information acquired at the outside information acquiring unit P10.

The first display object generating unit P01 generates the first display object 185 that is a base for presenting information based on the first display object generating conditions calculated at the first display object generating condition calculating unit P11.

The presentation information acquiring unit P02 acquires an item of information that is a target for presentation.

The second display object generating unit P03 forms an object of the presentation information acquired at the presentation information acquiring unit P02 for generating the second display object 186 based on the conditions including at least one of the shape, color, size, and orientation of the first display object 185 generated by the first display object generating unit P01, and the second display object generating conditions calculated at the second display object generating condition calculating unit P12.

The image data generating unit P04 disposes the second display object 186 generated by the second display object generating unit P02 with respect to the first display object 185 generated by the first display object generating unit P01, and synthesizes the first display object 185 and the second display object 186 for generating image data.

The image data output unit P05 outputs the image data generated by the image data generating unit P04.

In the following, an exemplary process in the first display object generating condition calculating unit P11 will be described.

In the first display object generating condition calculating unit P11, a relative angle between the display video 330 and the actual outside scene 340 when the user views the display video 330 based on the image data is estimated and calculated based on the height, sitting height, eye point position, and the like of the user acquired as user information, for example. For example, based on this angle, the orientation of the first display object 185 is controlled in such a way that the surface of the first display object 185 (the top surface expressed in the upper part object 185a, for example) is kept horizontal with respect to the horizontal plane (the surface or the like of the road, for example) in the actual outside scene 340.

In the first display object generating condition calculating unit P11, an appropriate harmony coefficient Et is calculated for generating the first display object 185 based on the vehicle speed acquired as vehicle information, for example. For example, the harmony coefficient Et is set lower when the vehicle speed is fast, whereas the harmony coefficient Et is set higher when the vehicle speed is slow. The conditions including the preset harmony coefficient Et are reflected in the conditions of generating the first display object 185. For example, since it is estimated that the user does not tend to gaze steadily at the display video 330 based on the image data in the case where the vehicle speed is fast, an unpleasant sensation caused by a difference between the display video 330 and the actual outside scene 340 is not a great problem. Thus, in the case where the vehicle speed is fast, the process to more optimize the display state of the second display object 186 is performed, while a part of the process to reduce an unpleasant sensation on the video of the first display object 185 is omitted, for example, and it is possible to further reduce an unpleasant sensation in the overall display video 330. On the other hand, since it is estimated that the user often gazes steadily at the display video 330 in the case where the vehicle speed is slow, the first display object generating conditions are determined in such a way that the first display object 185 with a further reduced unpleasant sensation is generated.

In the first display object generating condition calculating unit P11, the first display object generating conditions are calculated, which reflect the ease to harmonize the actual outside scene 340 with the display video 330, based on the acquired outside information, for example. For example, in the case where the road is flat or where there are no forward vehicles, the actual outside scene 340 tends to harmonize with the display video 330. On the other hand, in the case where the road is rough or where there are forward vehicles, the actual outside scene 340 does not tend to harmonize with the display video 330. For example, in the case where the actual outside scene 340 does not tend to harmonize with the display video 330, the first display object generating conditions are calculated, which the harmony coefficient Et is increased more than the case where the actual outside scene 340 tends to harmonize with the display video 330.

For example, items of information (functions, for example) on relationships between the harmony coefficient Et and values containing values including amplitudes and frequencies on road roughness and values including the distance to a forward vehicle and the number of vehicles therearound are stored, and a suited harmony coefficient Et is calculated based on the stored items of information. In the case where the road is excessively rough, and in the case where forward vehicles change the positions quickly, the first display object generating conditions with a low harmony coefficient Et are calculated, for example. Thus, the process to more optimize the display state of the second display object 186 is performed while a part of the process to reduce an unpleasant sensation on the video of the first display object 185 is omitted, for example, so that it is possible to further reduce an unpleasant sensation in the overall display video 330.

The embodiment is not limited to the description above. The first display object generating conditions can be calculated by combining individual items of user information, individual items of vehicle information, and individual items of outside information using various methods, for example. The first display object generating conditions are calculated based on weights expressing the significances of user information, vehicle information, and outside information, for example.

In the following, an exemplary process in the second display object generating condition calculating unit P12 will be described.

The second display object generating condition calculating unit P12 changes the second display object generating conditions between the case where the line of sight of the user faces the direction of the display video 330 and the case where the line of sight of the user does not face the direction of the display video 330, for example, based on the direction of the line of sight of the user acquired as user information, for example. For example, in the case where the line of sight of the user does not face the direction of the display video 330, the second display object generating condition calculating unit P12 calculates the second display object generating conditions of frequently presenting an object (the third type object 186c, for example) to present information such as the degree of danger, or the like using the shape, color, and motion of a three-dimensional object, or the like. On the other hand, in the case where the line of sight of the user faces the direction of the display video 330, the second display object generating condition calculating unit P12 calculates the second display object generating conditions of frequently presenting at least one of an object to present the correct meanings of items of information (the first type object 186a, for example) using numerals, characters, three-dimensional objects, and so on, and an object to present quantitative information (the second type object 186b, for example) using a meter, an indicator, and the like.

The second display object generating condition calculating unit P12 changes the second display object generating conditions based on the eyesight of the user, for example. If the eyesight of the user is not good, for example, the second display object generating condition calculating unit P12 calculates the second display object generating conditions of frequently presenting the third type object 186c, for example. On the other hand, if the eyesight of the user is good, the second display object generating condition calculating unit P12 calculates the second display object generating conditions of frequently presenting at least one of the first type object 186a and the second type object 186b, for example.

The second display object generating condition calculating unit P12 changes the second display object generating conditions based on the age group of the user, for example. For example, for a relatively elder user, the second display object generating condition calculating unit P12 calculates the conditions of generating the second display object 186 to present information using graphics, colors, or the like acting on sensation. For a relatively elder user, the second display object generating condition calculating unit P12 calculates the conditions of generating large-sized objects. For a relatively younger user, the second display object generating condition calculating unit P12 calculates the conditions of generating the second display object 186 to present detailed information using characters, signs, or the like. For a relatively younger user, the second display object generating condition calculating unit P12 calculates the conditions of generating small-sized objects.

The second display object generating condition calculating unit P12 changes the second display object generating conditions based on the vehicle speed acquired as vehicle information, for example. For example, when the vehicle speed is fast, the second display object generating condition calculating unit P12 calculates the second display object generating conditions of frequently presenting an object (the third type object 186c, for example) to present information on the degree of danger or the like using the shape, color, and motion of a three-dimensional object or the like. On the other hand, when the vehicle speed is slow, the second display object generating condition calculating unit P12 calculates the second display object generating conditions of frequently presenting at least one of an object to present the correct meanings of items of information (the first type object 186a, for example) and an object to present quantitative information using a meter, an indicator, and the like (the second type object 186b, for example) using numerals, characters, three-dimensional objects, etc. Since it is estimated that the user does not tend to gaze steadily at the display video 330 in the case where the vehicle speed is fast, for example, the second display object 186 acting on sensation is often used. On the other hand, since it is estimated that the user tends to gaze steadily at the display video 330 in the case where the vehicle speed is slow, the second display object 186 to convey detailed information is often used.

The second display object generating condition calculating unit P12 calculates the second display object generating conditions of reflecting the ease to harmonize the actual outside scene 340 with the display video 330 based on the acquired outside information, for example. For example, in the case where the actual outside scene 340 does not tend to harmonize with the display video 330, as in the case where the road is rough or where there are forward vehicles, the second display object generating condition calculating unit P12 calculates the second display object generating conditions of frequently presenting the third type object 186c, for example. On the other hand, in the case where the actual outside scene 340 tends to harmonize with the display video 330 as in the case where the road is flat or where there are no forward vehicles, the second display object generating condition calculating unit P12 calculates the second display object generating conditions of frequently presenting at least one of the first type object 186a and the second type object 186b, for example.

The embodiment is not limited to the description above. The second display object generating conditions are calculated by combining individual items of user information, individual items of vehicle information, and individual items of outside information using various methods, for example. The second display object generating conditions are calculated based on weights expressing the significances of user information, vehicle information, and outside information, for example.

Figure 28:
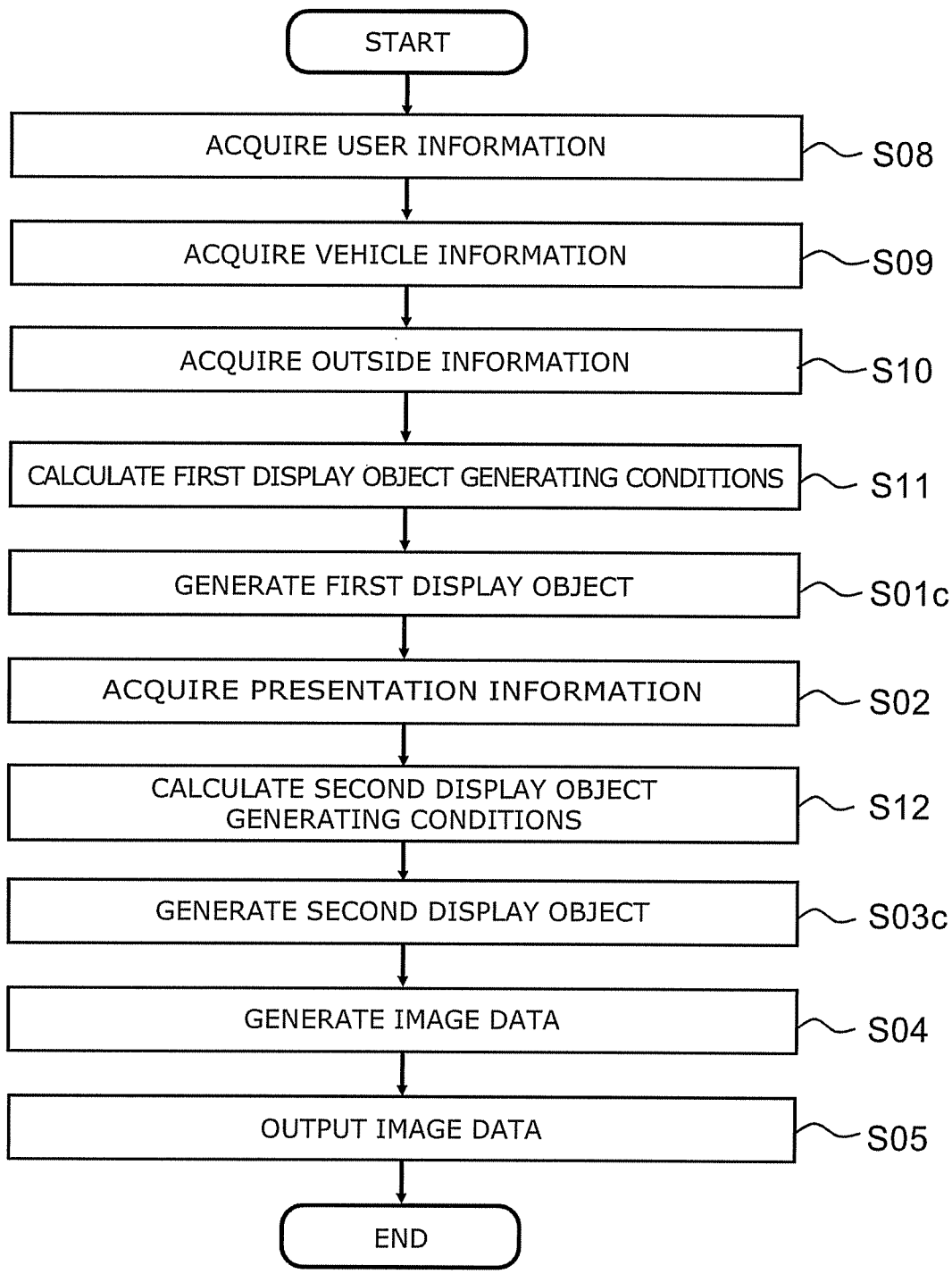
FIG. 28 is a flow chart showing the operation of another image data generating device according to the second embodiment.

FIG. 28 is a flow chart illustrating the operation of another image data generating device according to the second embodiment.

As shown in FIG. 28, an item of user information is acquired (Step S08). This process is executed at the user information acquiring unit P08 for example. The item of information on the user is acquired including at least one of the height, sitting height, eye point position, direction of the line of sight, and eyesight of the user, for example.

An item of vehicle information is acquired (Step S09). This process is executed at the vehicle information acquiring unit P09 for example. The item of information on the vehicle 730 is acquired including at least one of a vehicle speed, an average velocity, an engine RPM, a motor RPM, energy consumption efficiency, operating states of direction indicators (turning on, off, or the like of a winker, for example), lighting states (turning on, off, or the like of a high beam, for example), various warnings, states of the transmission (an up shift, down sift, or the like, for example), instantaneous fuel consumption, average fuel consumption, a fuel remaining quantity, a battery remaining quantity, a distance-to-empty, continuous driving hours, a continuous distance covered, navigation, and the orientation of the traveling direction, for example.

An item of outside information is acquired (Step S10). This process is executed at the outside information acquiring unit P10 for example. The item of information on the outside of the vehicle 730 is acquired including at least one of weather, temperature, brightness, the color and shape of the forward road, the presence or absence of vehicles therearound, and the distance between the own car (the vehicle 730) and other vehicles, for example.

The first display object generating conditions are calculated (Step S11). This process is executed at the first display object generating condition calculating unit P11, for example. The conditions of forming an object of the presentation information acquired at the presentation information acquiring unit P02 are calculated based on at least one of items of information including the user information acquired at the user information acquiring unit P08, the vehicle information acquired at the vehicle information acquiring unit P09, and the outside information acquired at the outside information acquiring unit P10.

A first display object 185 is generated (Step S01c). This process is executed at the first display object generating unit P01, for example. The first display object 185 that is a base for presenting information is generated based on the first display object generating conditions calculated at the first display object generating condition calculating unit P11.

An item of presentation information is acquired (Step S02).

The second display object generating conditions are calculated (Step S12). This process is executed at the second display object generating condition calculating unit P12, for example. The conditions of forming an object of the presentation information acquired at the presentation information acquiring unit P02 are calculated based on at least one of items of information including the user information acquired at the user information acquiring unit P08, the vehicle information acquired at the vehicle information acquiring unit P09, and the outside information acquired at the outside information acquiring unit P10.

A second display object 186 is generated (Step S03c). This process is executed at the second display object generating unit P03, for example. An object of the presentation information acquired at the presentation information acquiring unit P02 is formed, and the second display object 186 is generated based on the conditions including at least one of the shape, color, size, and orientation of the first display object 185 generated by the first display object generating unit P01, and the second display object generating conditions calculated at the second display object generating condition calculating unit P12.

Image data is generated (Step S04). The image data is outputted (Step S05).

These processes are performed, so that it is possible to specify more appropriate conditions of generating the first display object 185 and the second display object 186 depending on changes in the conditions of the user, the vehicle, and the outside, and it is possible to implement information presentation that an unpleasant sensation is further reduced.

The aforementioned individual steps can be implemented at the same time in a technically feasible range. The order of the aforementioned individual steps can be exchanged in a technically feasible range. The aforementioned steps can be repeatedly executed.

The image data generating device 532 can further include at least one of the first display object generating condition acquiring unit P06 and the second display object generating condition acquiring unit P07 described relating to the image data generating device 531.

Third Embodiment

An image data generating program according to a third embodiment is an image data generating program to cause a computer to generate image data of the display video 330 to be presented to the image viewer 100 on the moving body and to be superimposed on the actual outside scene 340 outside the moving body.

The image data generating program causes the computer (for example, the image data generating unit 130) to perform the processes illustrated in FIG. 22.

Namely, the image data generating program causes the computer to generate the first display object 185 including the lower part object 185b having the lower part disposed in the image 187, the upper right part disposed on the upper side of the lower part and on the right side of the lower part in the image 187, and the upper left part disposed on the upper side of the lower part and on the left side of the lower part in the image 187, in which the length of the lower part along the vertical direction in the image 187 is longer than the length of the upper right part along the vertical direction and the length of the upper left part along the vertical direction. For example, the image data generating program causes the computer to generate the first display object 185 having the upper part object 185a disposed in the image 187 and the lower part object 185*b* disposed on the lower side of the upper part object 185*a* and separated from the upper part object 185*a* in the image 187.

The image data generating program generates the second display object 186 disposed in the image 187 with reference to the display position of the first display object 185 in the image 187, the second display object 186 including information (moving body information and vehicle information) on the moving body (the vehicle 730) (Step S120). For example, the second display object 186 has a portion on the upper side of the first display object 185 in the image 187.

The image data generating program generates image data based on the first display object 185 and the second display object 186 (Step S130).

Thus, it is possible to generate image data for use in a display device for moving bodies that enables the display in which an unpleasant sensation is reduced.

At least a part of the process included in the aforementioned Step S110, at least a part of the process included in Step S120, and at least a part of the process included in Step S130 can be implemented at the same time in a technically feasible range. The order of at least a part of the process included in the aforementioned Step S110, at least a part of the process included in Step S120, and at least a part of the process included in Step S130 can be exchanged in a technically feasible range. The aforementioned steps can be repeatedly executed.

This image data generating program is recorded on an arbitrary recording medium according to at least one of a magnetic recording mode, optical recording mode, and electric recording mode.

This image data generating program causes the computer to execute the processes illustrated in FIG. 24A and FIG. 24B, for example. Namely, the computer is caused to generate the first display object 185 that is a base for presenting information (Step S01), to acquire an item of information that is a target for presentation (Step S02), to form an object of the acquired presentation information for generating the second display object 186 based on the conditions including at least one of the shape, color, size, and orientation of the generated first display object 185 (Step S03), to dispose the second display object 186 in the image 187 with reference to the position of the first display object 185 in the image 187, to synthesize the first display object 185 and the second display object 186 for generating image data (Step S04), and to output the generated image data (Step S05).

As already described, the aforementioned Step S01 to Step S05 can be implemented at the same time in a technically feasible range. The order of the aforementioned Step S01 to Step S05 can be exchanged in a technically feasible range. The aforementioned steps can be repeatedly executed.

Fourth Embodiment

Figure 29:
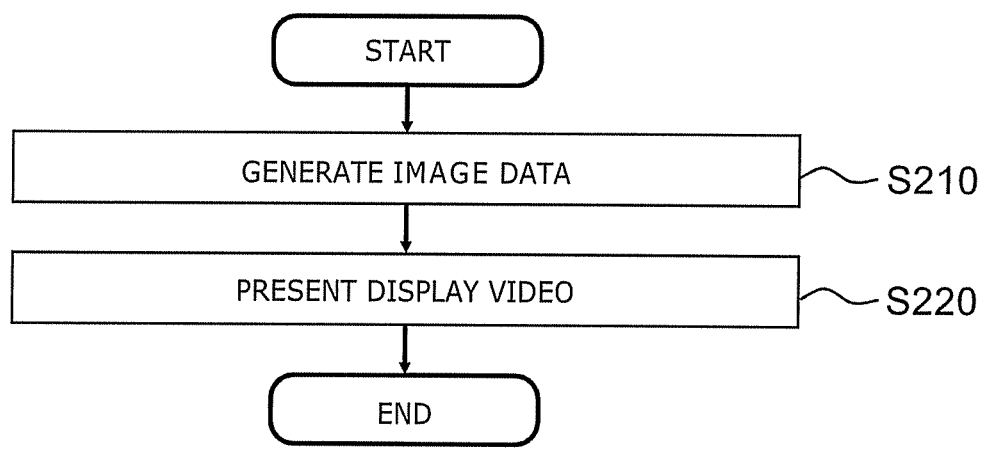
FIG. 29 is a flow chart showing a display method according to a fourth embodiment.

FIG. 29 is a flow chart illustrating a display method according to a fourth embodiment.

As shown in FIG. 29, the display method according to the embodiment generates image data including: the first display object 185 including the lower part object 185*b* having the lower part disposed in the image 187, the upper right part disposed on the upper side of the lower part and on the right side of the lower part in the image 187, and the upper left part disposed on the upper side of the lower part and on the left side of the lower part in the image 187, in which the length of the lower part along the vertical direction in the image 187 is longer than the length of the upper right part along the vertical direction and the length of the upper left part along the vertical direction; and the second display object 186 disposed in the image 187 with reference to the display position of the first display object 185 in the image 187, the second display object 186 including information on a moving body (Step S210). For example, the display method generates image data including: the first display object 185 having the upper part object 185*a* disposed in the image 187 and the lower part object 185*b* disposed on the lower side of the upper part object 185*a* and separated from the upper part object 185*a* in the image 187; and the second display object 186 disposed in the image 187 with reference to the display position of the first display object 185 in the image 187, the second display object 186 including information on the moving body. For example, the second display object 186 has a portion on the upper side of the first display object 185 in the image 187.

This display method presents the display video 330 based on the image data to the image viewer 100 on the moving body and superimposes the display video 330 on the actual outside scene 340 in the outside of the moving body (Step S220).

According to this display method, it is possible to display information with a reduced unpleasant sensation.

Fifth Embodiment

A moving body (the vehicle 730) according to a fifth embodiment is mounted with the display device according to the embodiment.

For example, as shown in FIG. 2, as the moving body according to the embodiment, the vehicle 730 (the moving body) is adopted.

The moving body (for example, the vehicle 730) includes the display device according to the embodiment (for example, the display device 10), and the reflection unit (the windshield unit 710, for example) that reflects the light beam 112 emitted from the display device toward the image viewer 100.

The reflection unit (the windshield unit 710) may additionally include the reflector 711, and the windshield unit 710 includes the reflector 711.

In accordance with the moving body (for example, the vehicle 730) according to the embodiment, it is possible to implement the display for moving bodies that enables the display with a reduced unpleasant sensation.

The vehicle 730 (the moving body), on which the display device and the image data generating device according to the embodiment are mounted, may be not only a four-wheel vehicle, but also a two-wheel vehicle. The display device and the image data generating device according to the embodiment may be mounted on a railway vehicle, a bus, etc. The display device and the image data generating device according to the embodiment are mounted not only on a vehicle but also on an arbitrary moving body including an aircraft (including a helicopter, or the like), ship, or the like for obtaining similar effects by performing similar operations.

The display device and the image data generating device according to the embodiment can also be for use in sightseeing guiding in sightseeing areas and in explaining exhibits in museums and art museums, or the like, for example. The devices can be for use in an arbitrary device to superimpose display videos based on image data on actual scenes for presentation.

According to the embodiments, it is possible to provide a display device, image data generating device, image data generating program, and display method that enable the display with a reduced unpleasant sensation.

In the specification of this application, the terms "vertical" and "parallel" include not only being strict vertical and being strict parallel, but also variations or the like in making process steps, and being substantially vertical and being substantially parallel are included.

Hereinabove, the exemplary embodiments of the invention are described with reference to specific examples. However, the invention is not limited to these specific examples. For example, one skilled in the art may appropriately select the specific configurations of components of the video projecting unit, the video light forming unit, the light beam projecting unit, the image data generating unit (the image data generating device), or the like included in the display device from known art and similarly practice of the invention. Such practice is included in the scope of the invention to the extent that similar effects thereto are obtained.

Further, any two or more components of the specific examples may be combined within the extent of technical feasibility, and the combinations are included in the scope of the invention to the extent that the purport of the invention is included.

Moreover, all display devices, image data generating devices, image data generating programs, and display methods obtainable by appropriate design modifications by one skilled in the art based on the foregoing display device, the image data generating device, the image data generating program, and the display method described as the embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display device comprising:
an image data generating unit configured to generate image data on an image; and
a display unit configured to present a video including the image data generated by the image data generating unit to an image viewer on a moving body to superimpose the video on an actual outside scene outside the moving body,
the image data including a first display object and a second display object,
the first display object including a lower part object,
the lower part object having:
a lower part disposed in the image;
an upper right part disposed at a position on an upper and right side of the lower part in the image; and
an upper left part disposed at a position on an upper and left side of the lower part in the image,
a length of the lower part along a first normal line direction being longer than a length of the upper right part along a second normal line direction and a length of the upper left part along a third normal line direction, the first normal direction being perpendicular to a first extending direction of the lower part object at a position of the lower part, the second normal direction being perpendicular to a second extending direction of the lower part object at a position of the upper right part, the third normal direction being perpendicular to a third extending direction of the lower part object at a position of the upper left part,
the second display object being disposed in the image with reference to a display position of the first display object in the image, the second display object including information on the moving body.

2. The device according to claim 1, wherein
the second display object has a portion on an upper side of the first display object in the image.

3. The device according to claim 1, wherein:
the first display object further includes an upper part object;
the upper part object is disposed on an upper side of the lower part object; and
the upper part object is separated from the lower part object.

4. The device according to claim 3, wherein
the first display object further includes a partition line provided between the lower part object and the upper part object.

5. The device according to claim 3, wherein
the lower part object has at least one of a color different from a color of the upper part object and a brightness different from a brightness of the upper part object.

6. The device according to claim 3, wherein
an outer edge of the upper part object has a curved shape.

7. The device according to claim 3, wherein
a width of the upper part object in a lateral direction in the image is same as a width of the lower part object in the lateral direction in the image.

8. The device according to claim 3, wherein
a portion on a lower side of a boundary line of the upper part object has a projecting shape toward the lower side in the image, and
a portion on an upper side of a boundary line of the lower part object has a projecting shape toward the lower side in the image.

9. The device according to claim 3, wherein
the upper part object has a bilaterally symmetric shape with respect to a vertical direction in the image as a center axis, and
the lower part object has a bilaterally symmetric shape with respect to the vertical direction as the center axis.

10. The device according to claim 3, wherein
the first display object has a three-dimensional shape,
the upper part object includes a top surface of the three-dimensional shape, and
The lower part object includes at least one of a said surface and a bottom surface on a lower said of the top surface of the three-dimensional shape.

11. The device according to claim 1, wherein
the first display object has a shape of a lower side portion of a sphere horizontally cut as seen in a diagonal direction.

12. The device according to claim 1, wherein
the second display object includes:
a first type object disposed in the image with reference to the display position of the first display object in the image, the first type object including symbolic information; and
a second type object disposed in the image with reference to the display position of the first display object in the image, the second type object including graphic pattern information different from the first type object.

13. The device according to claim 12, wherein
the symbolic information includes at least one of a numeral and a character.

14. The device according to claim 12, wherein
the graphic pattern information relatively displays information by at least one of a shape, a size, a number, a position, a color, and a brightness of a graphic.

15. The device according to claim 1, wherein
the second display object displays information including a velocity of the moving body.

16. The device according to claim 1, wherein
the second display object includes a third type object disposed in the image with reference to the display position of the first display object in the image,
the third type object includes:
   a first state object corresponding to the moving body in a first state; and
   a second state object corresponding to the moving body in a second state in which a predetermined characteristic value is different from a characteristic value of the first state, the second state object being different from the first state object, and
   a change with time in at least one of a shape, a size, a number, a color, a brightness, a position, and a track of the first state object is different from a change with time in the second state object.

17. The device according to claim 16, wherein
the third type object displays information on a state of the moving body by at least one of a shape, a color, and a motion of a graphic pattern.

18. An image data generating device to generate image data on an image of a display video configured to be presented to an image viewer on a moving body and to be superimposed on an actual outside scene outside the moving body,
   the device configured to generate a first display object, the first display object having a lower part object,
      the lower part object having:
         a lower part disposed in the image;
         an upper right part disposed at a position on an upper and right side of the lower part in the image; and
         an upper left part disposed at apposition on an upper and left side of the lower part in the image,
         a length of the lower part along a first normal line direction being longer than a length of the upper right part along a second normal line direction and a length of the upper left part along a third normal line direction, the first normal direction being perpendicular to a first extending direction of the lower part object at a position of the lower part, the second normal direction being perpendicular to a second extending direction of the lower part object at a position of the upper right part, the third normal direction being perpendicular to a third extending direction of the lower part object at a position of the upper left part,
   the device being configured to generate a second display object, the second display object being disposed in the image with reference to a display position of the first display object in the image, the second display object including information on the moving body, and
   the device being configured to generate the image data based on the first display object and the second display object.

19. An image data generating program stored on a non-transitory computer readable medium and configured to cause a computer to generate image data on an image of a display video configured to be presented to an image viewer on a moving body and to be superimposed on an actual outside scene outside the moving body,
   the program comprising:
   causing the computer to generate a first display object, the first display object including a lower part object,
      the lower part object having:
         a lower part disposed in an image;
         an upper right part disposed at a position on an upper and right side of the lower part in the image; and
         an upper left part disposed at a position on an upper and left side of the lower part in the image,
         a length of the lower part along a first normal line direction being longer than a length of the upper right part along a second normal line direction and a length of the upper left part along a third normal line direction, the first normal direction being perpendicular to a first extending direction of the lower part object at a position of the lower part, the second normal direction being perpendicular to a second extending direction of the lower part object at a position of the upper right part, the third normal direction being perpendicular to a third extending direction of the lower part object at a position of the upper left part,
   causing the computer to generate a second display object, the second display object being disposed in the image with reference to a display position of the first display object in the image, the second display object including information on the moving body; and
   causing the computer to generate the image data based on the first display object and the second display object.

20. A display method comprising:
generating image data on an image, the image data including:
   a first display object; and
   a second display object,
   the first display object including a lower part object, the lower part object having:
      a lower part disposed in the image;
      an upper right part disposed at a position on an upper and right side of the lower part in the image; and
      an upper left part disposed at apposition on an upper and left side of the lower part in the image,
      a length of the lower part along a first normal line direction being longer than a length of the upper right part along a second normal line direction and a length of the upper left part along a third normal line direction, the first normal direction being perpendicular to a first extending direction of the lower part object at a position of the lower part, the second normal direction being perpendicular to a second extending direction of the lower part object at a position of the upper right part, the third normal direction being perpendicular to a third extending direction of the lower part object at a position of the upper left part,
   the second display object being disposed in the image with reference to a display position of the first display object in the image, the second display object including information on a moving body; and
presenting the display video based on the image data to an image viewer on a moving body to superimpose a display video on an actual outside scene outside the moving body.

* * * * *